US00RE34481E

United States Patent [19]

Ishibashi, deceased

[11] E Patent Number: Re. 34,481

[45] Reissued Date of Patent: Dec. 21, 1993

[54] ELECTRONIC MUSICAL INSTRUMENT

[75] Inventor: Masanori Ishibashi, deceased, late of Oume, Japan, by Masayuki Ishibashi, legal representative

[73] Assignee: Casio Computer Co., Ltd., Tokyo, Japan

[21] Appl. No.: 641,604

[22] Filed: Jan. 15, 1991

Related U.S. Patent Documents

Reissue of:

[64] Patent No.: 4,658,691
Issued: Apr. 21, 1987
Appl. No.: 788,669
Filed: Oct. 17, 1985

U.S. Applications:

[63] Continuation of Ser. No. 561,180, Dec. 14, 1983, abandoned.

[30] Foreign Application Priority Data

Dec. 17, 1982 [JP] Japan ..... 57-221266
Dec. 17, 1982 [JP] Japan ..... 57-225582

[51] Int. Cl.[5] ..... G10H 1/02

[52] U.S. Cl. ..... 84/605; 84/623; 84/624

[58] Field of Search ..... 84/605, 623, 624

[56] References Cited

U.S. PATENT DOCUMENTS

| | | | |
|---|---|---|---|
| 4,175,464 | 11/1979 | Deutsch | 84/623 |
| 4,183,275 | 1/1980 | Niimi et al. | 84/606 |
| 4,223,582 | 9/1980 | Kato et al. | 84/605 |
| 4,249,447 | 2/1981 | Tomisawa | 84/605 |

FOREIGN PATENT DOCUMENTS

| | | |
|---|---|---|
| A10015424 | 9/1980 | European Pat. Off. . |
| 1404559 | 9/1975 | United Kingdom . |
| 2027250A | 2/1980 | United Kingdom . |
| A2032159 | 4/1980 | United Kingdom . |
| A2087621 | 5/1982 | United Kingdom . |
| WO8103236 | 11/1981 | World Int. Prop. O. . |

*Primary Examiner*—Forester W. Isen
*Attorney, Agent, or Firm*—Frishauf, Holtz, Goodman & Woodward

[57] ABSTRACT

An electronic musical instrument includes circuitry for modifying an ordinary address signal which changes at a uniform rate over one cycle of a waveform, into a modified address signal whose rate varies in one cycle of the waveform by the use of a modification signal.

The modified address signal accesses a storage device such as a ROM in which waveform data is stored, thereby producing the modified waveform data from the storage device. The modification signal is obtained from the ordinary address signal through a predetermined logic circuit.

58 Claims, 41 Drawing Sheets

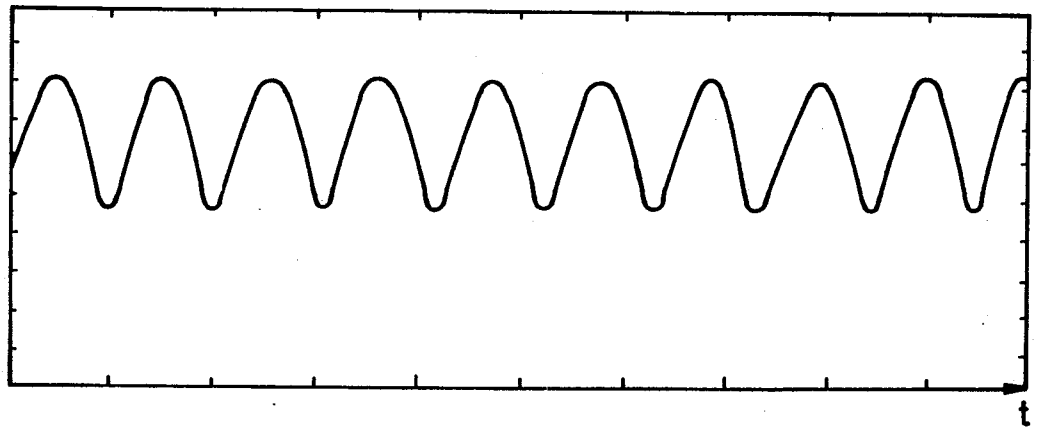
Fig. 26 ( A 1 )
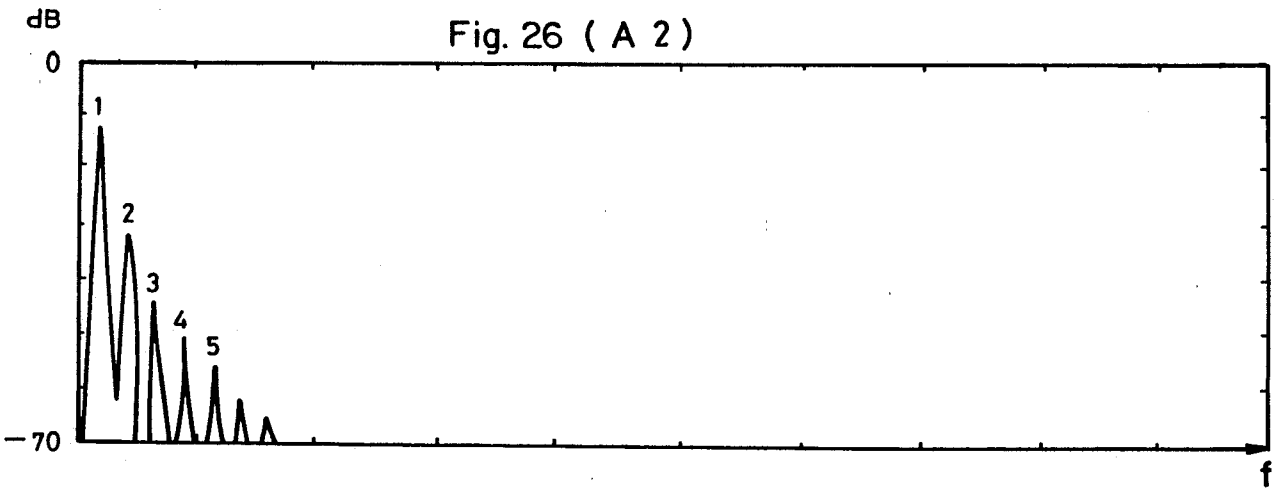
Fig. 26 ( A 2 )

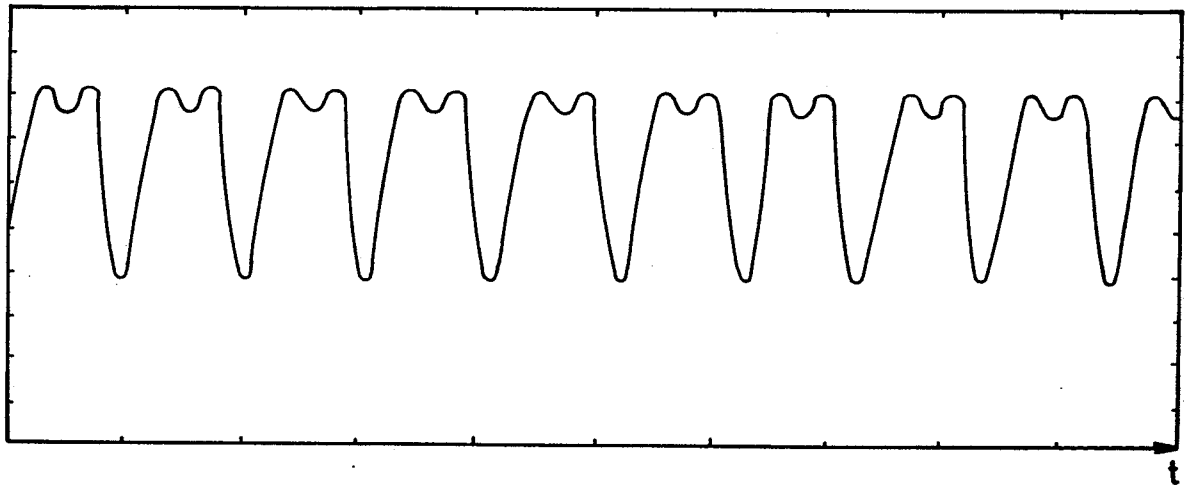
Fig. 26 ( B 1 )
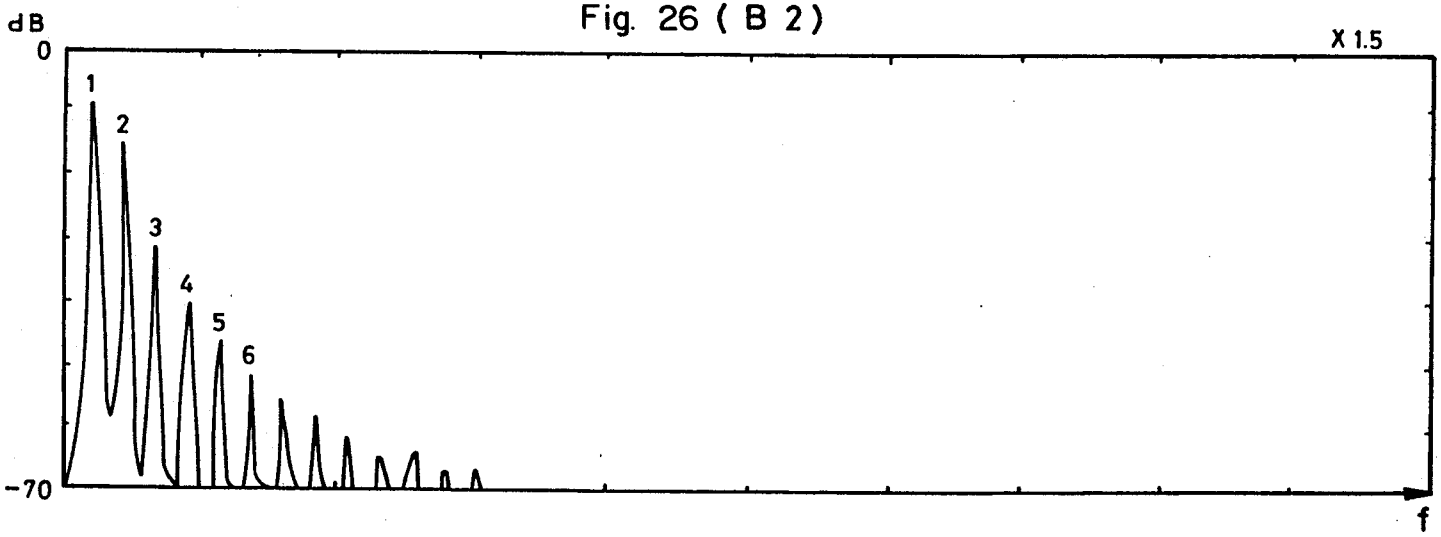
Fig. 26 ( B 2 )

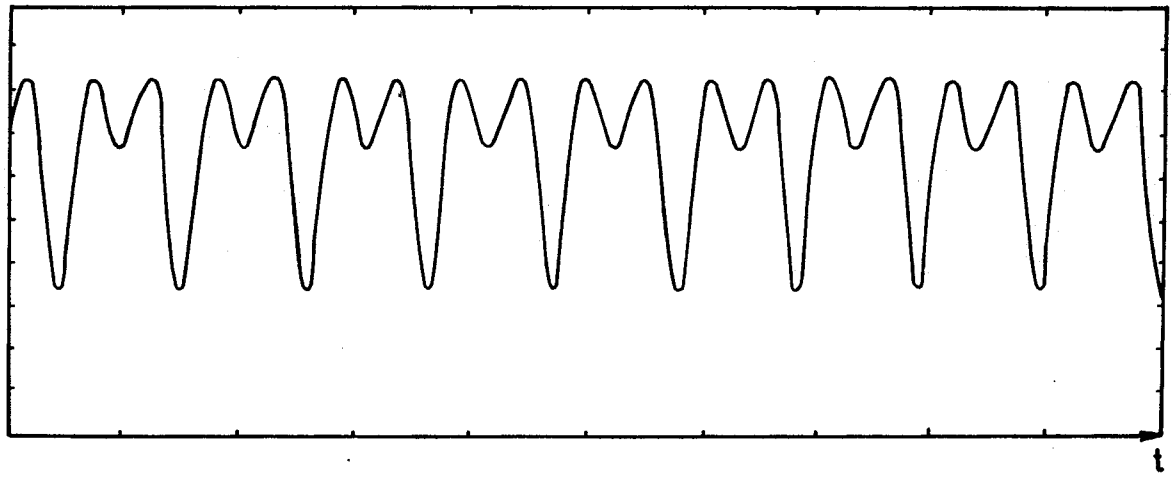
Fig. 26 ( C 1 )
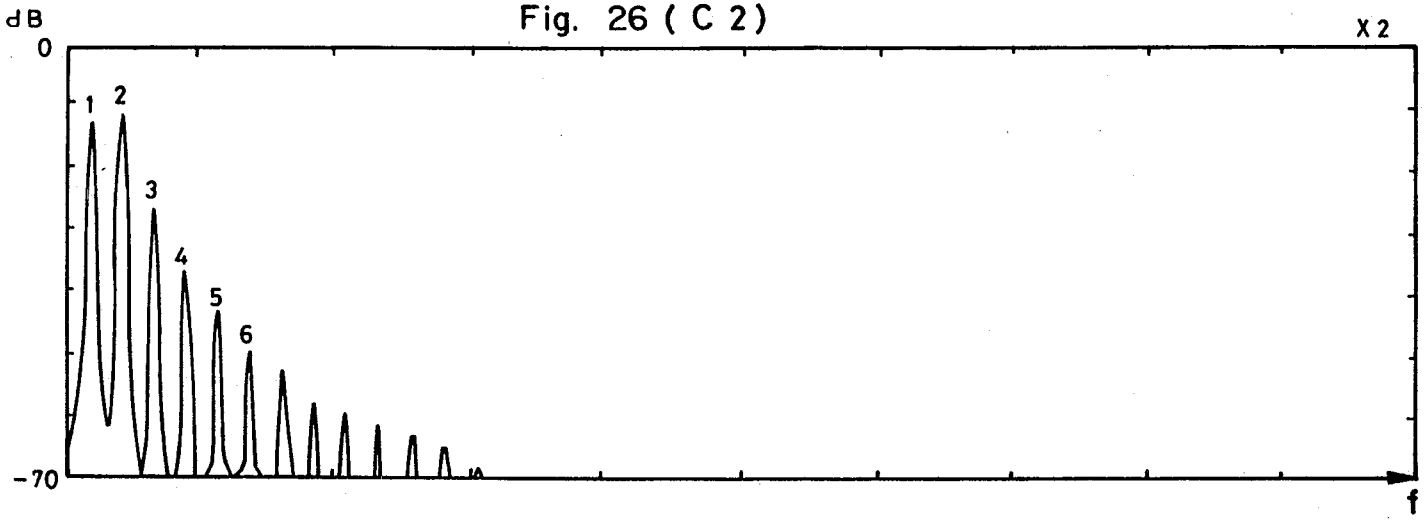
Fig. 26 ( C 2 )

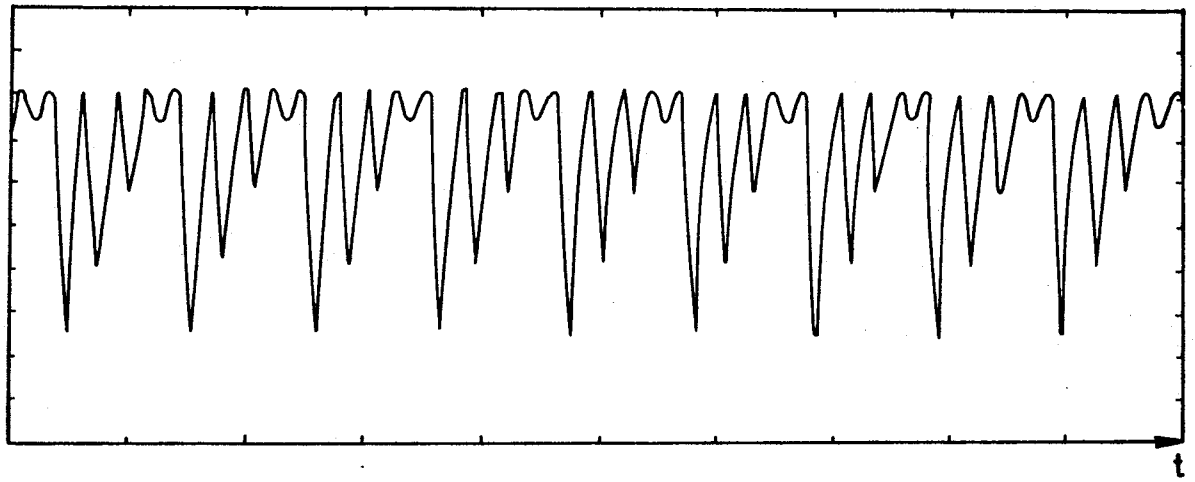
Fig. 26 ( D 1 )
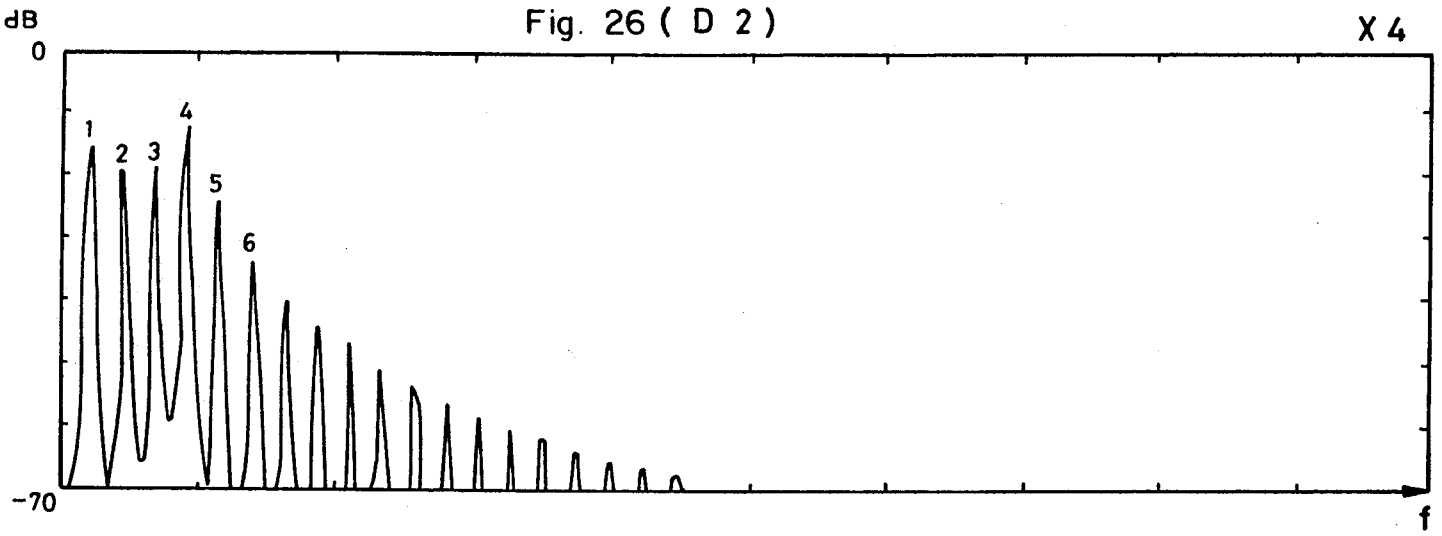
Fig. 26 ( D 2 )

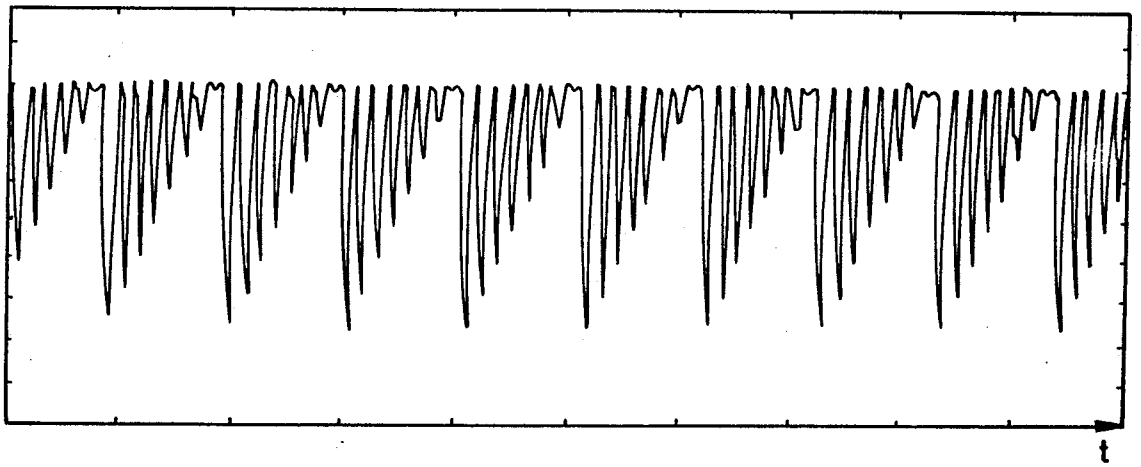
Fig. 26 ( E 1 )
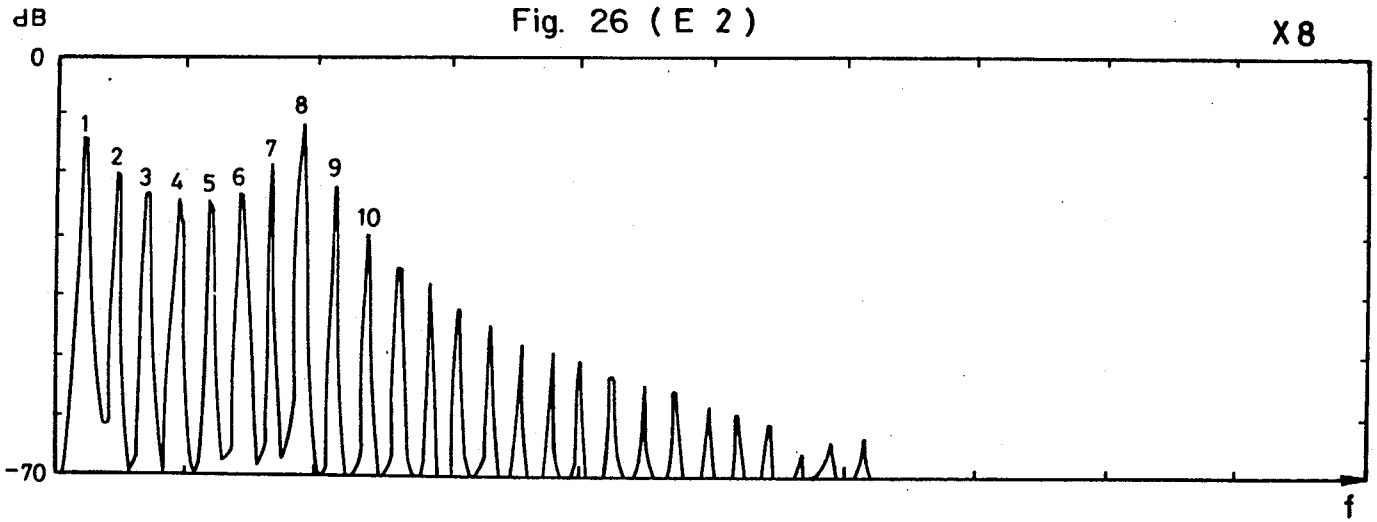
Fig. 26 ( E 2 )

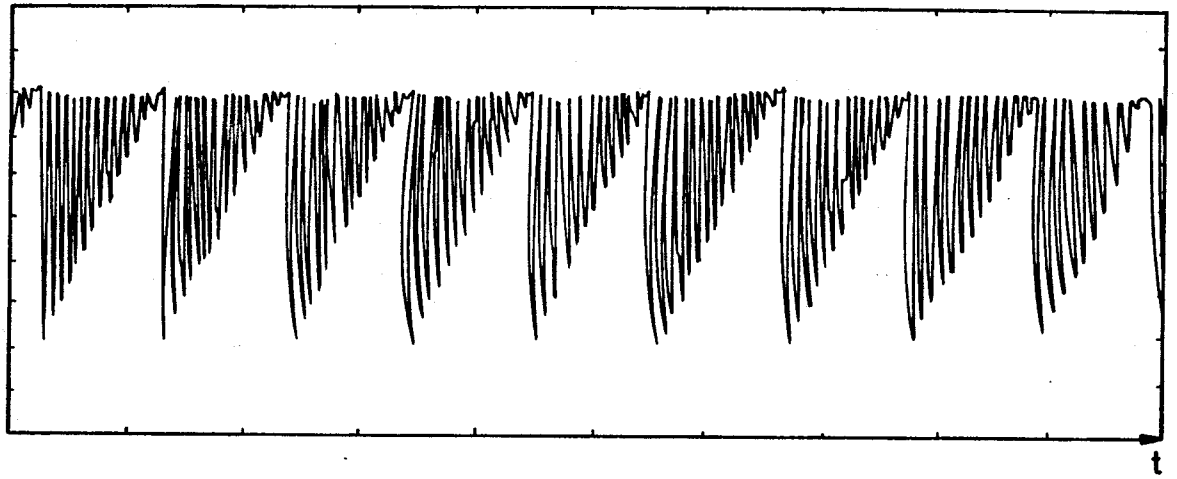
Fig. 26 ( F 1 )
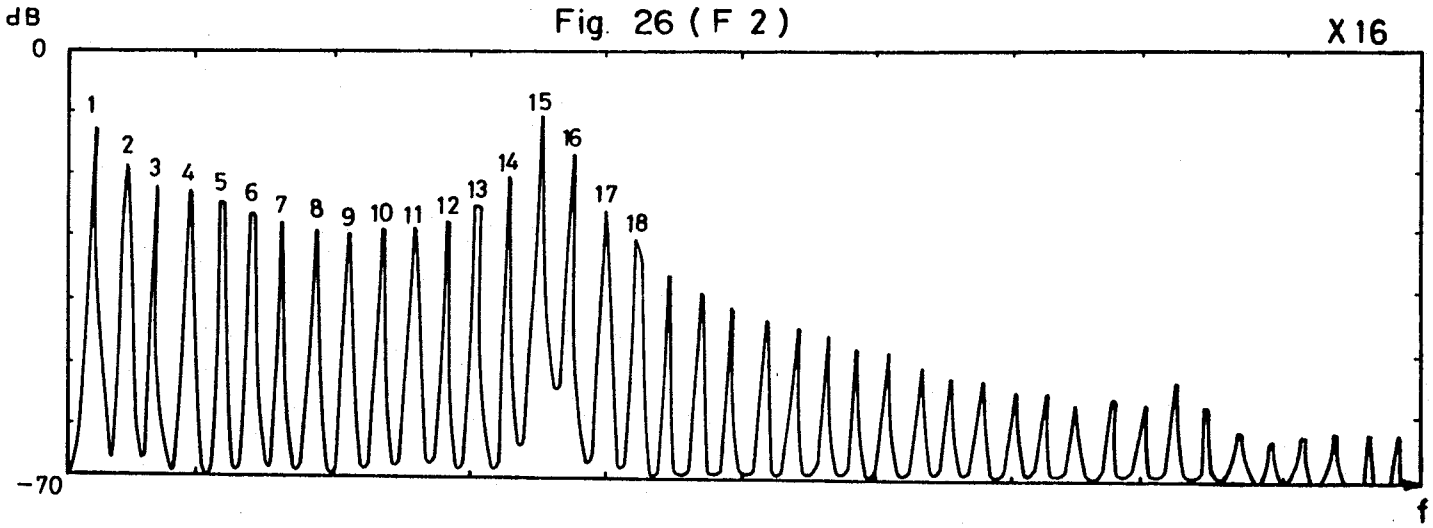
Fig. 26 ( F 2 )

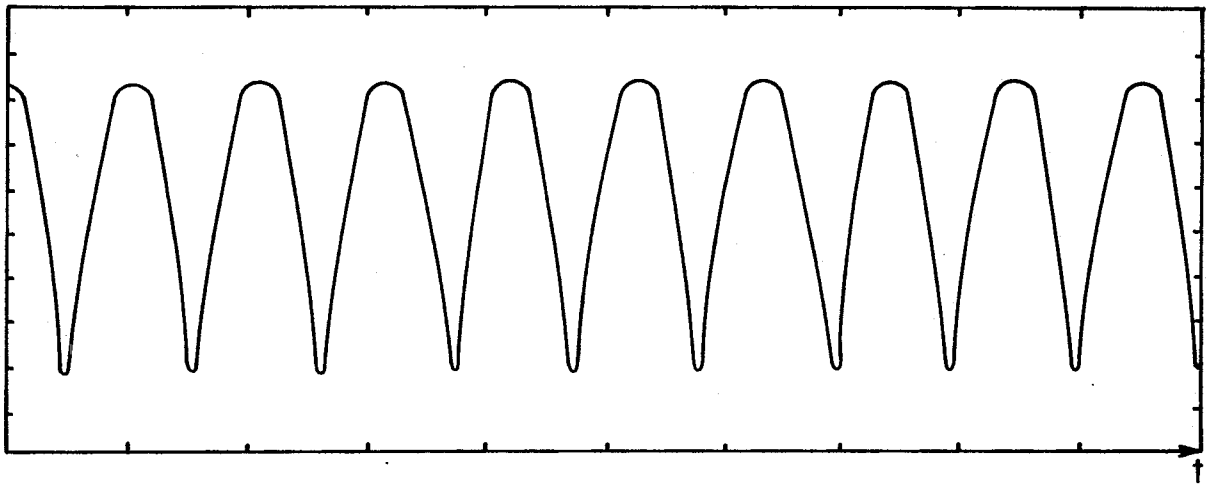
Fig. 27 (A 1)
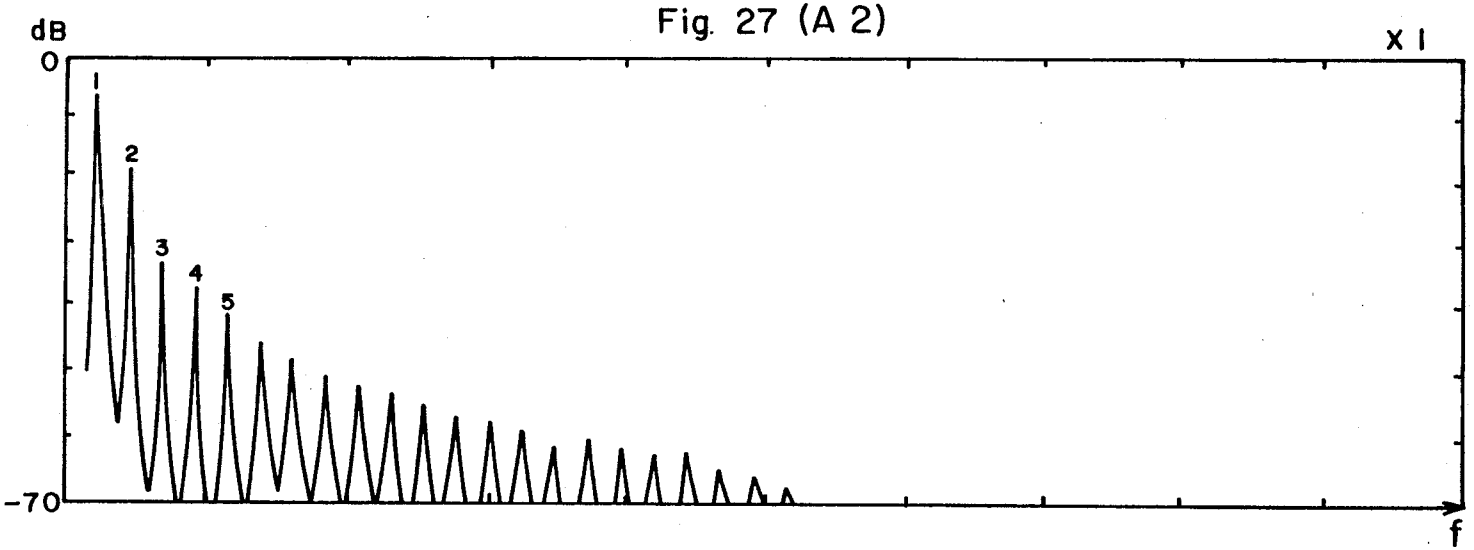
Fig. 27 (A 2)

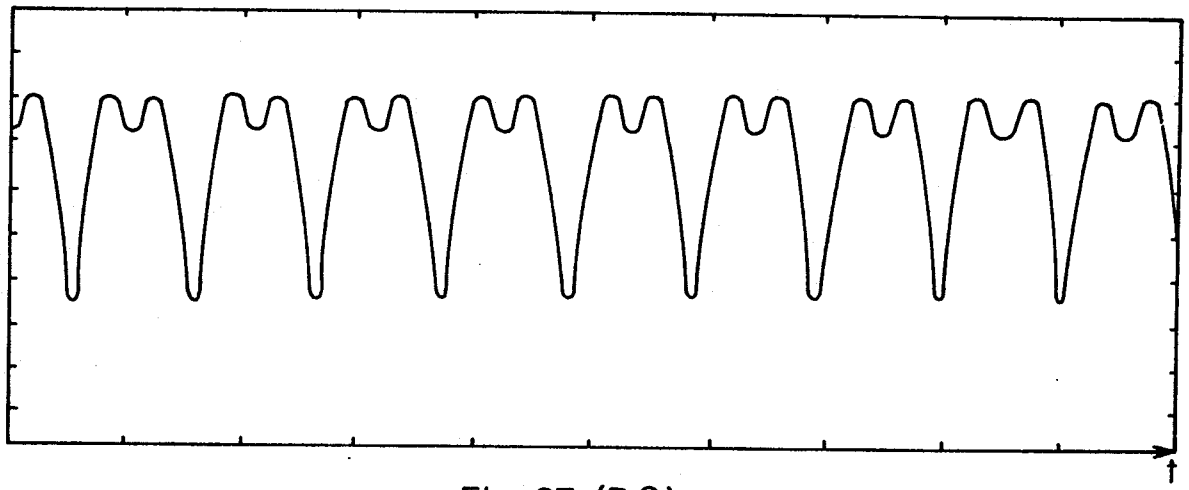
Fig. 27 (B 1)
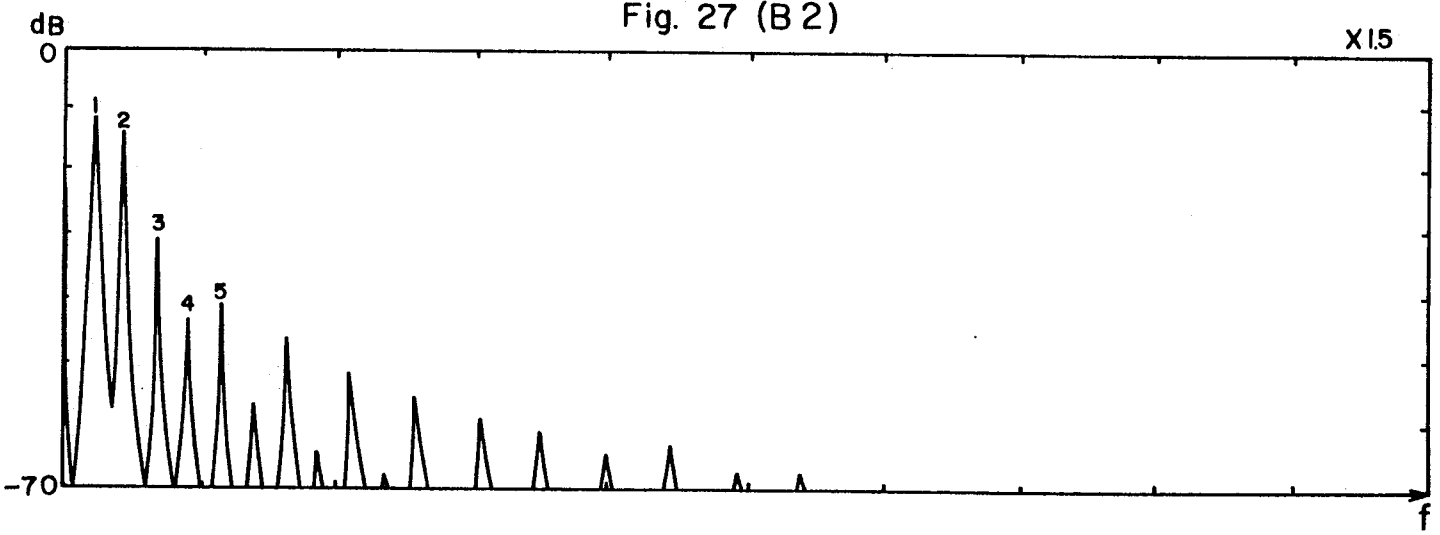
Fig. 27 (B 2)

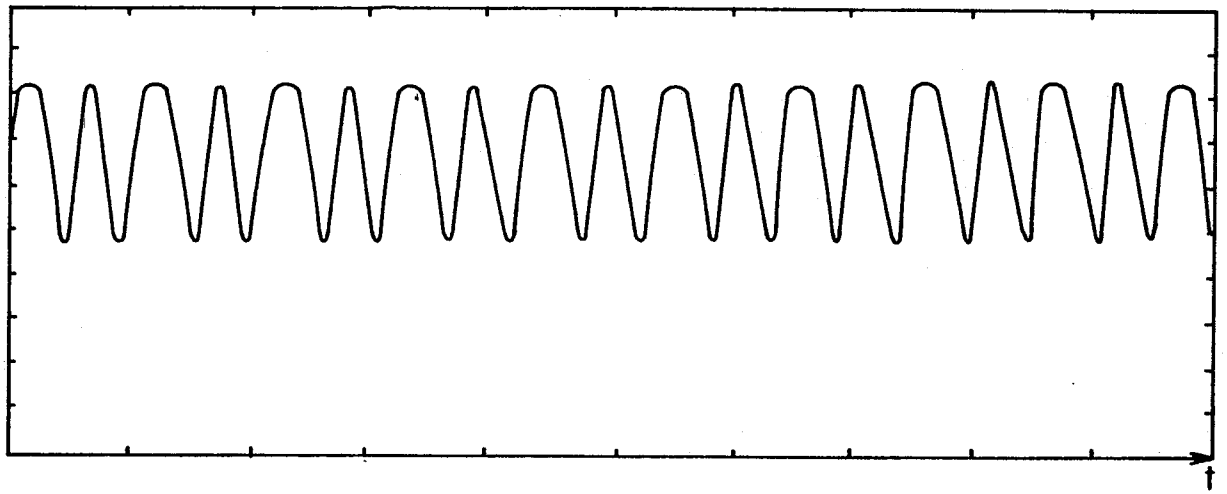
Fig. 27 (C 1)
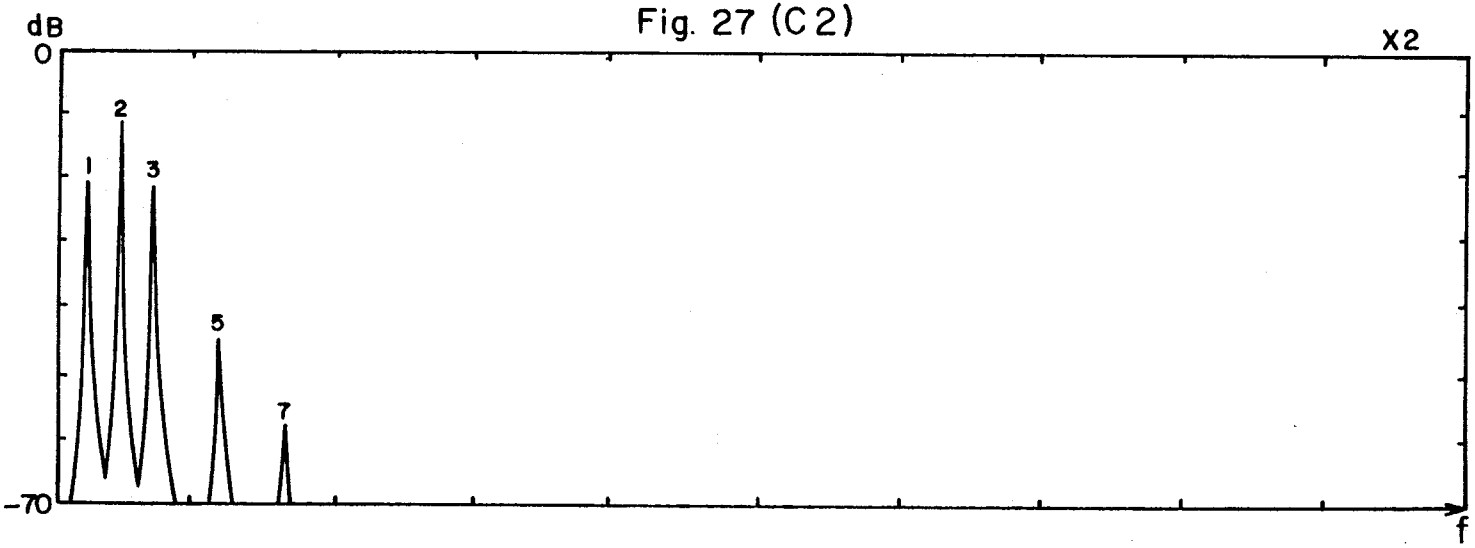
Fig. 27 (C 2)

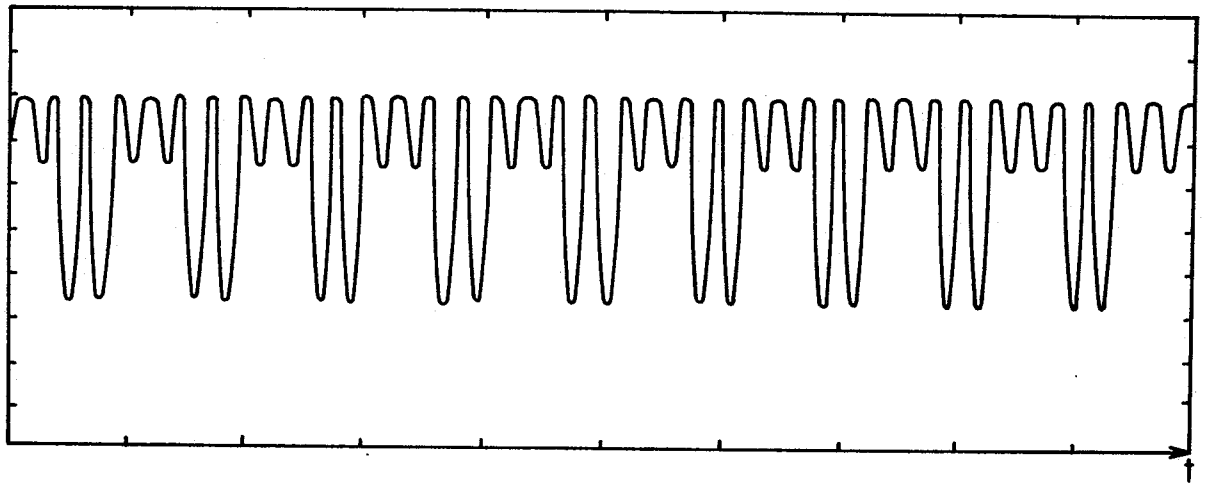
Fig. 27 (D 1)
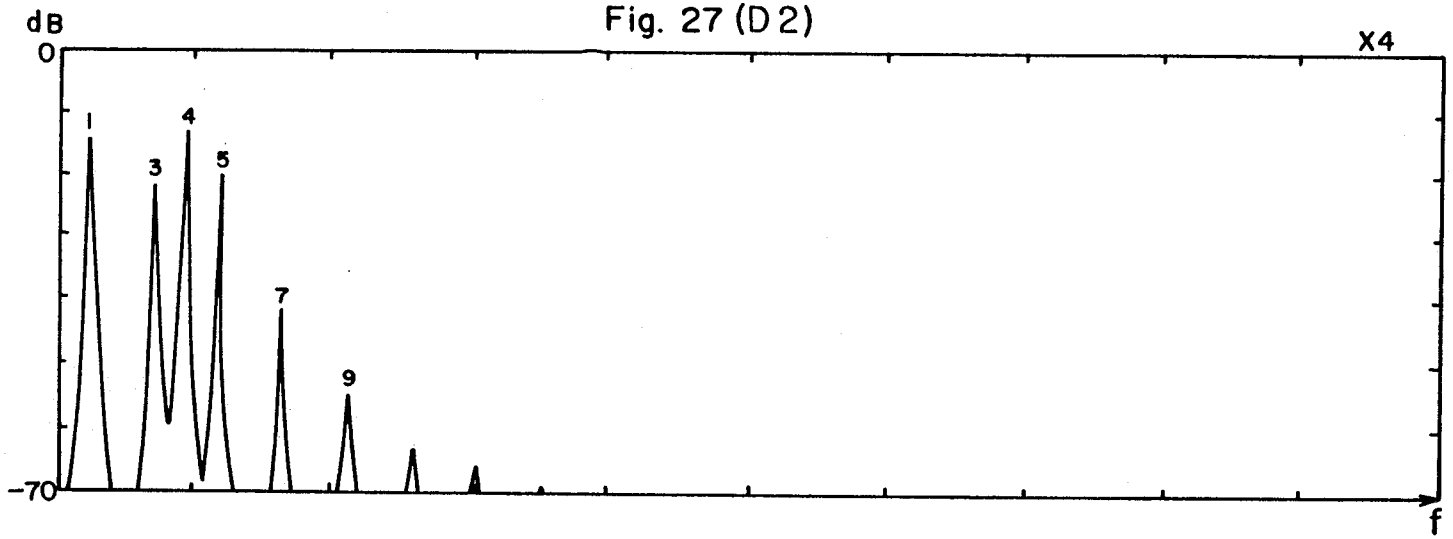
Fig. 27 (D 2)

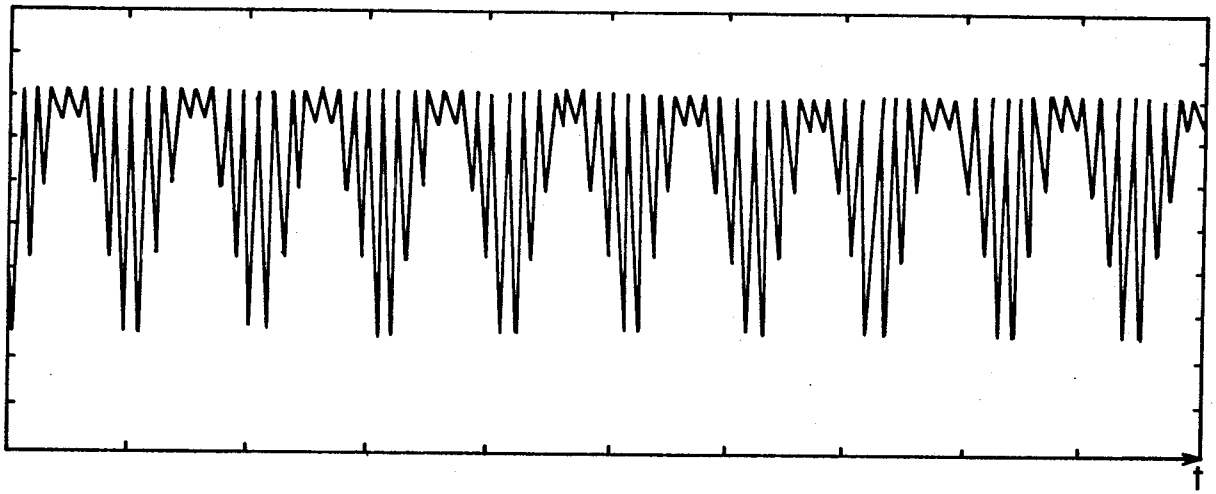
Fig. 27 (E 1)
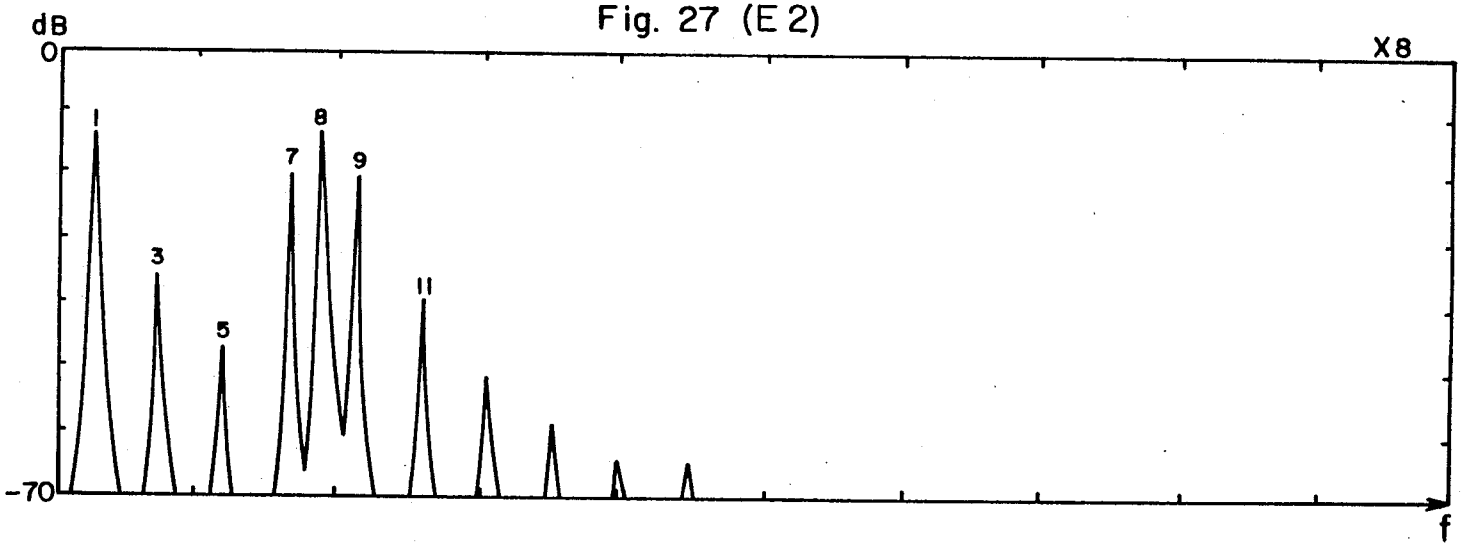
Fig. 27 (E 2)

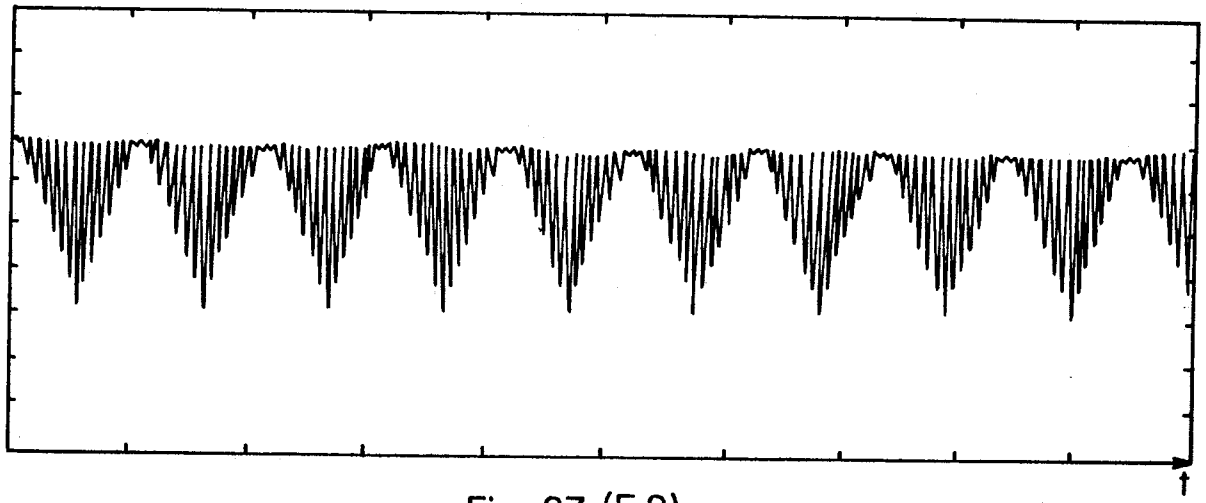
Fig. 27 (F 1)
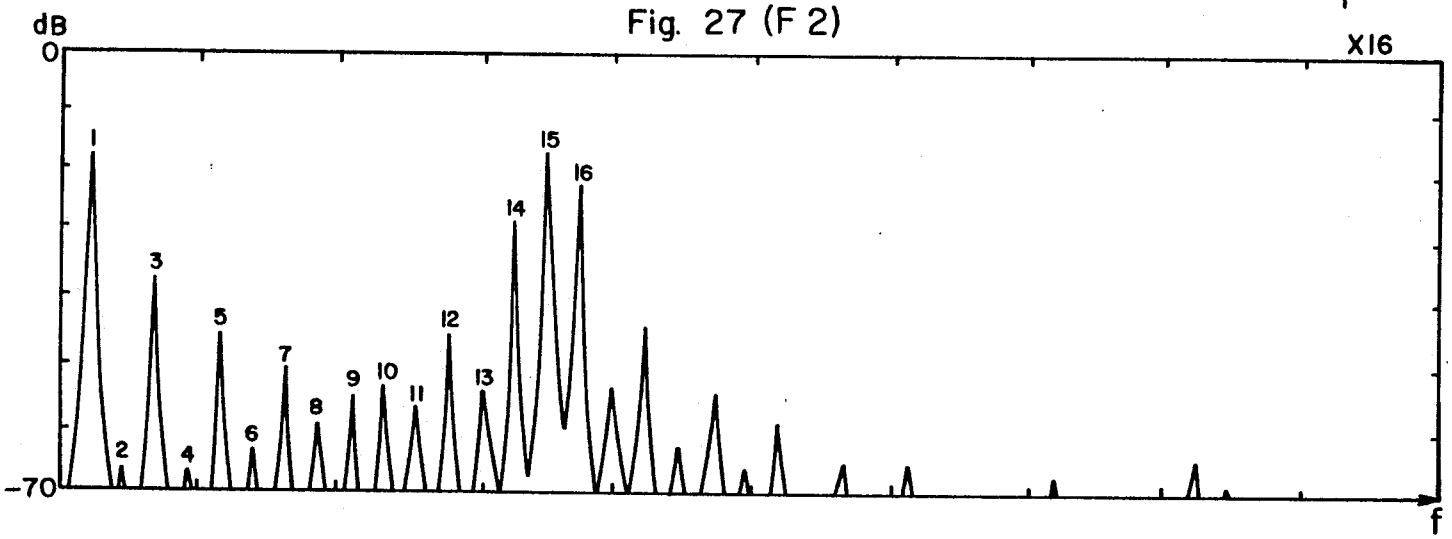
Fig. 27 (F 2)

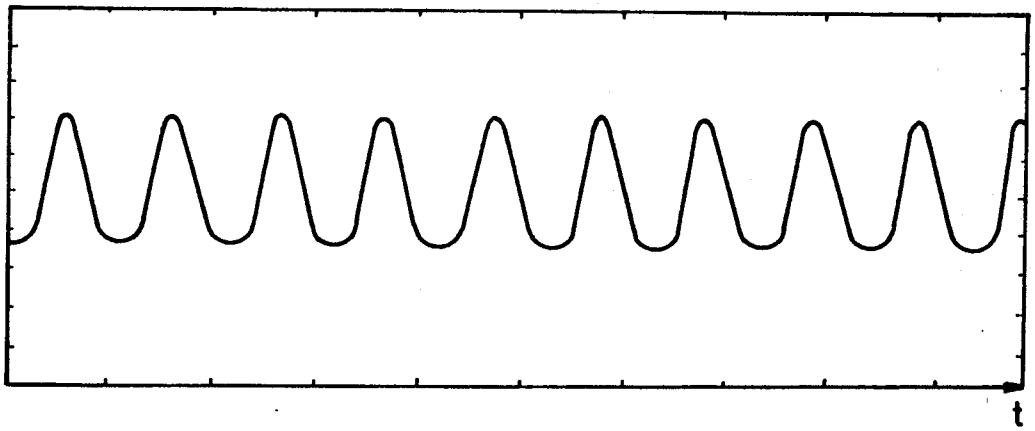
Fig. 28 (A 1)
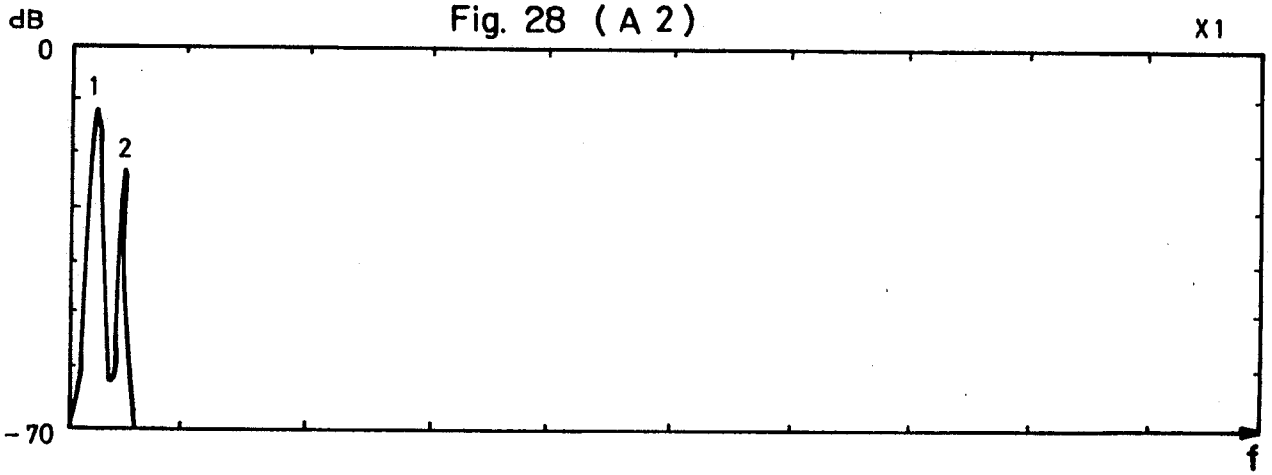
Fig. 28 (A 2)

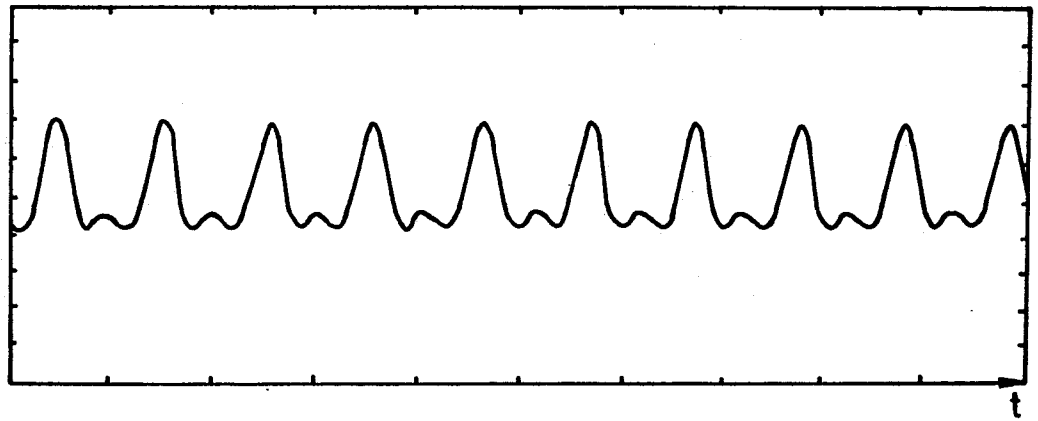
Fig. 28 ( B 1 )
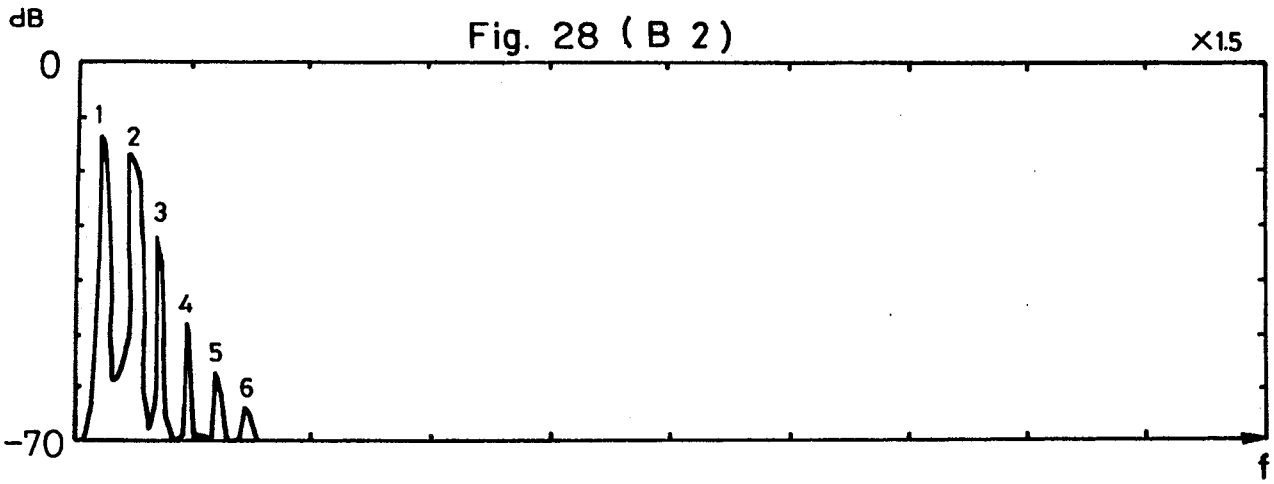
Fig. 28 ( B 2 )

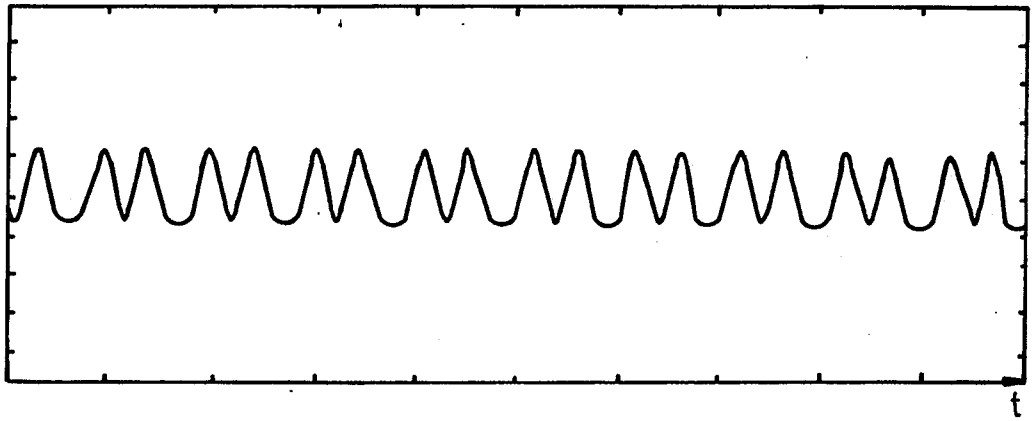
Fig. 28 (C 1)
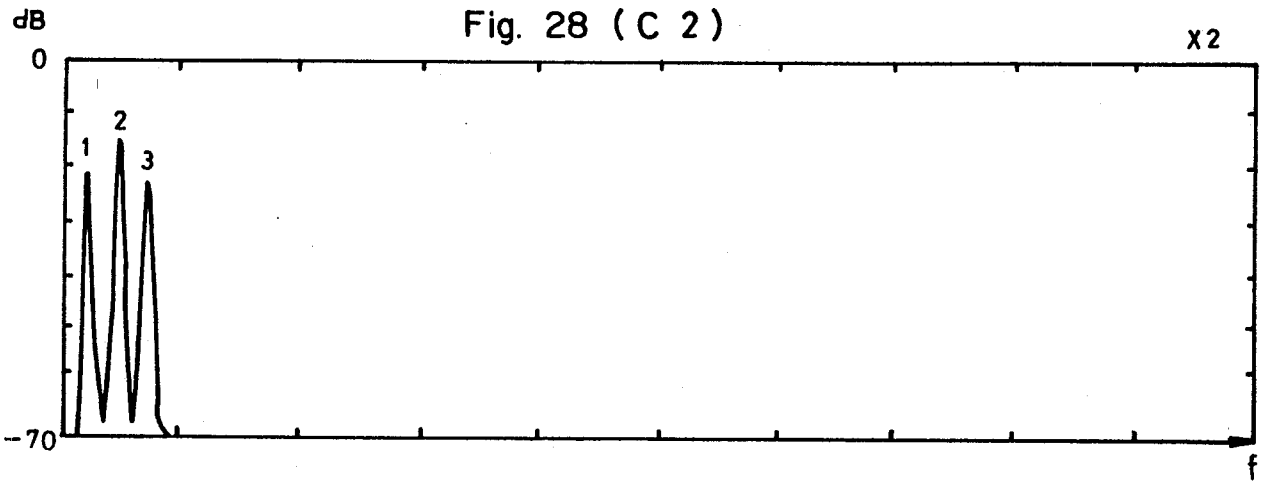
Fig. 28 (C 2)

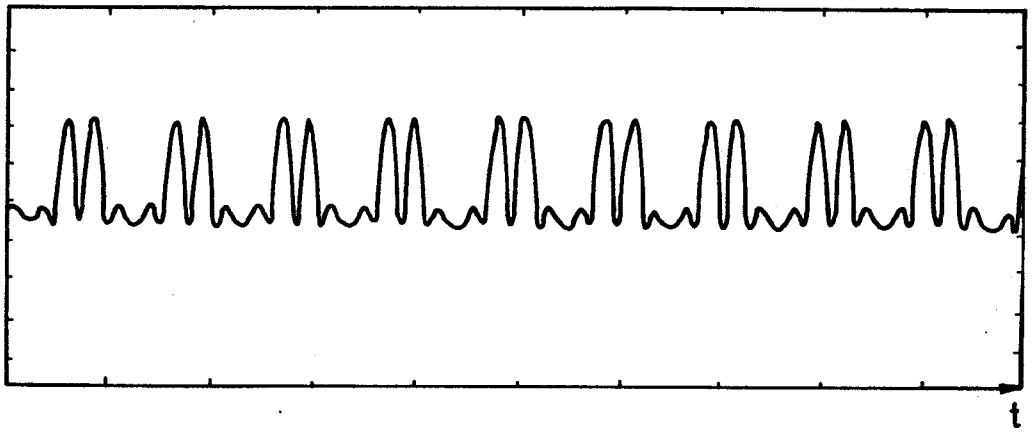
Fig. 28 ( D 1 )
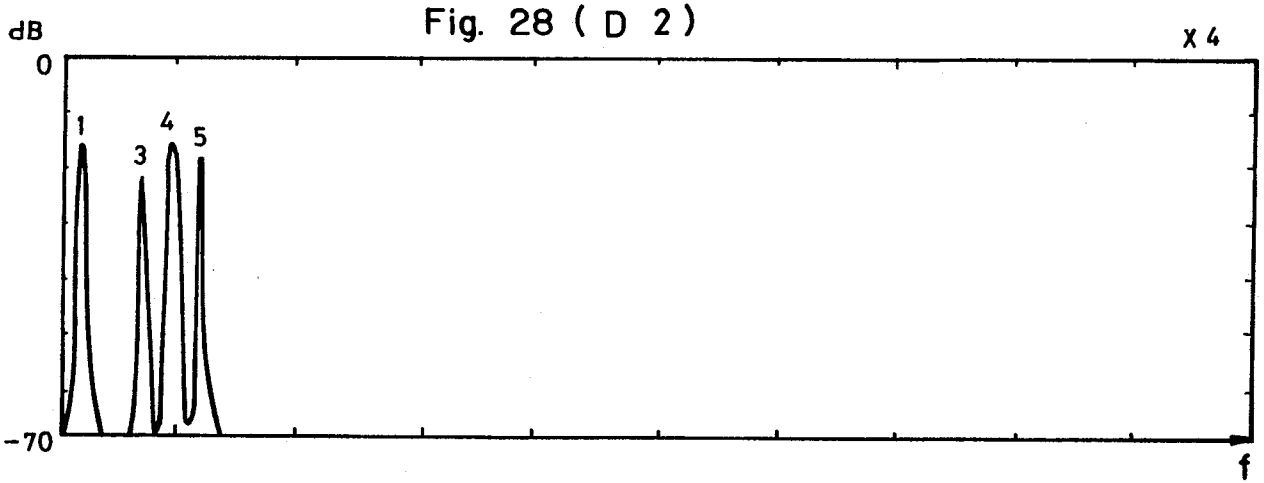
Fig. 28 ( D 2 )

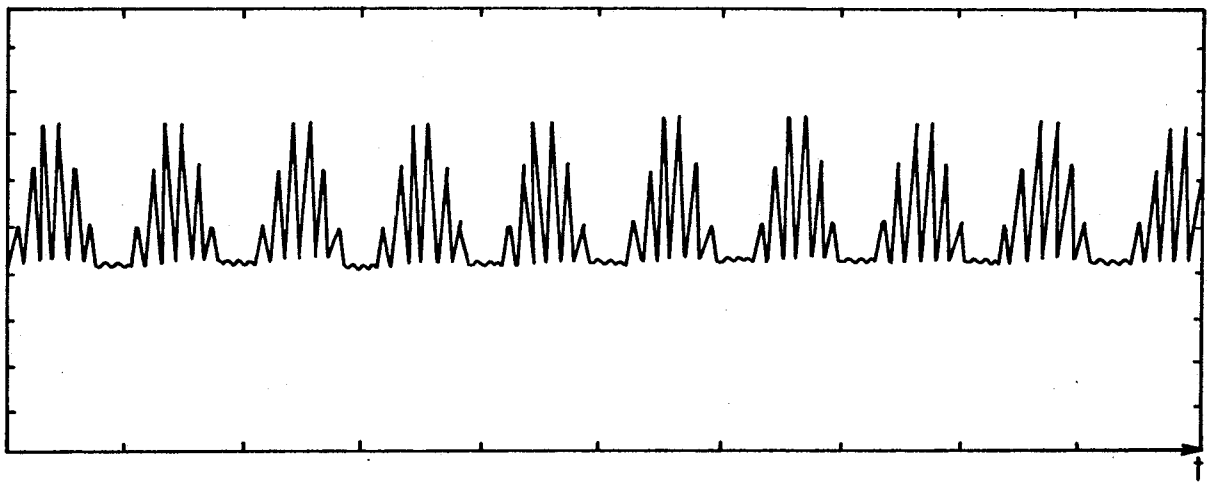
Fig. 28 (E 1)
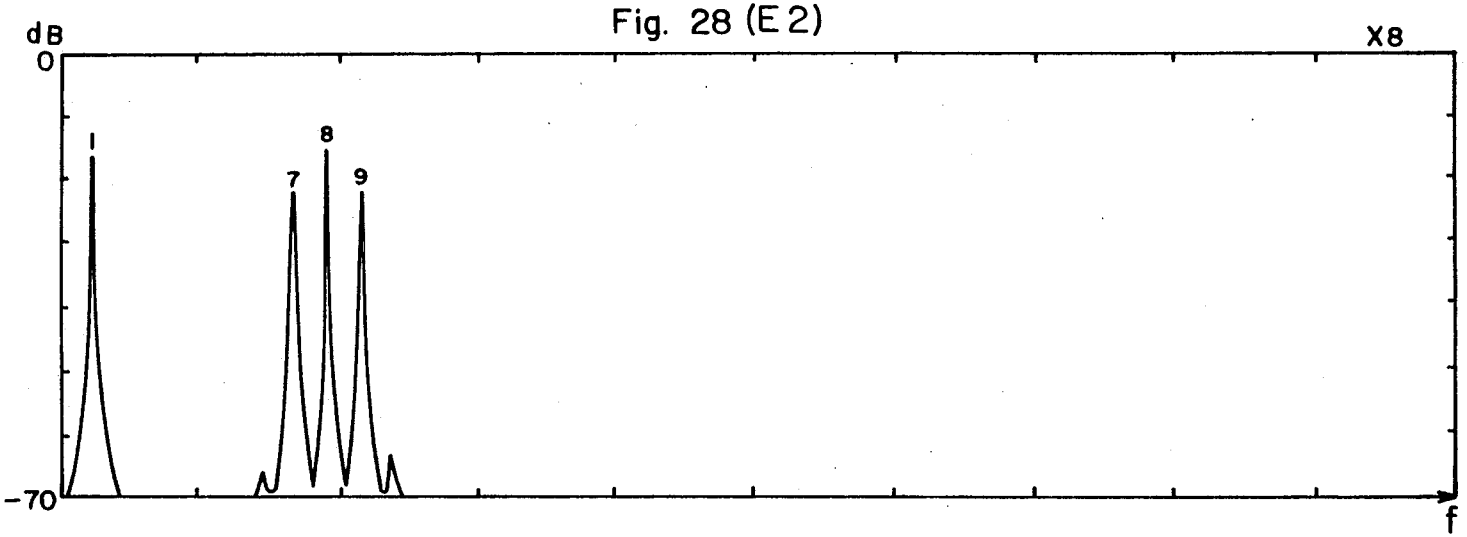
Fig. 28 (E 2)

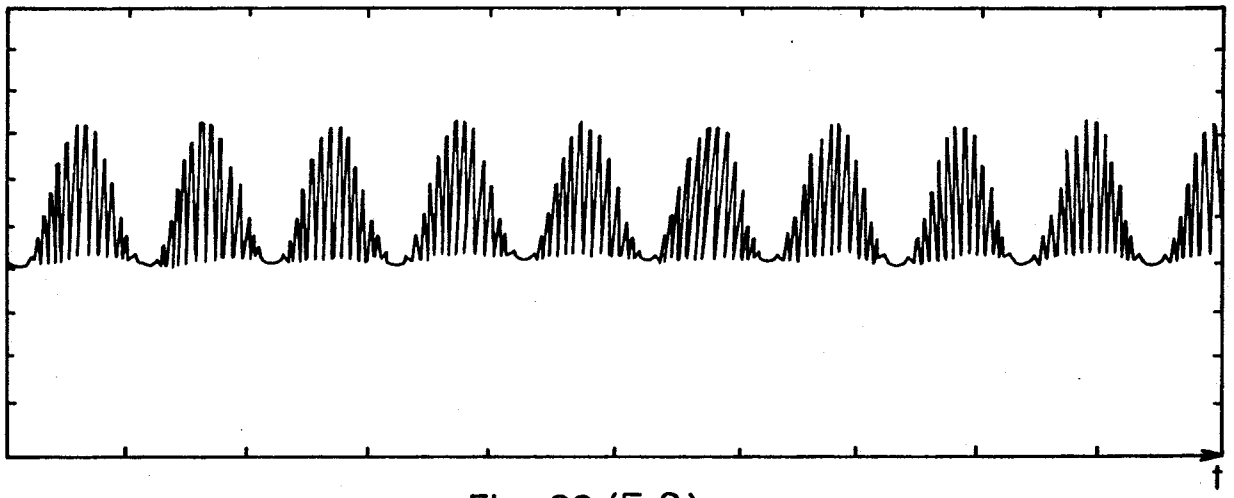
Fig. 28 (F 1)
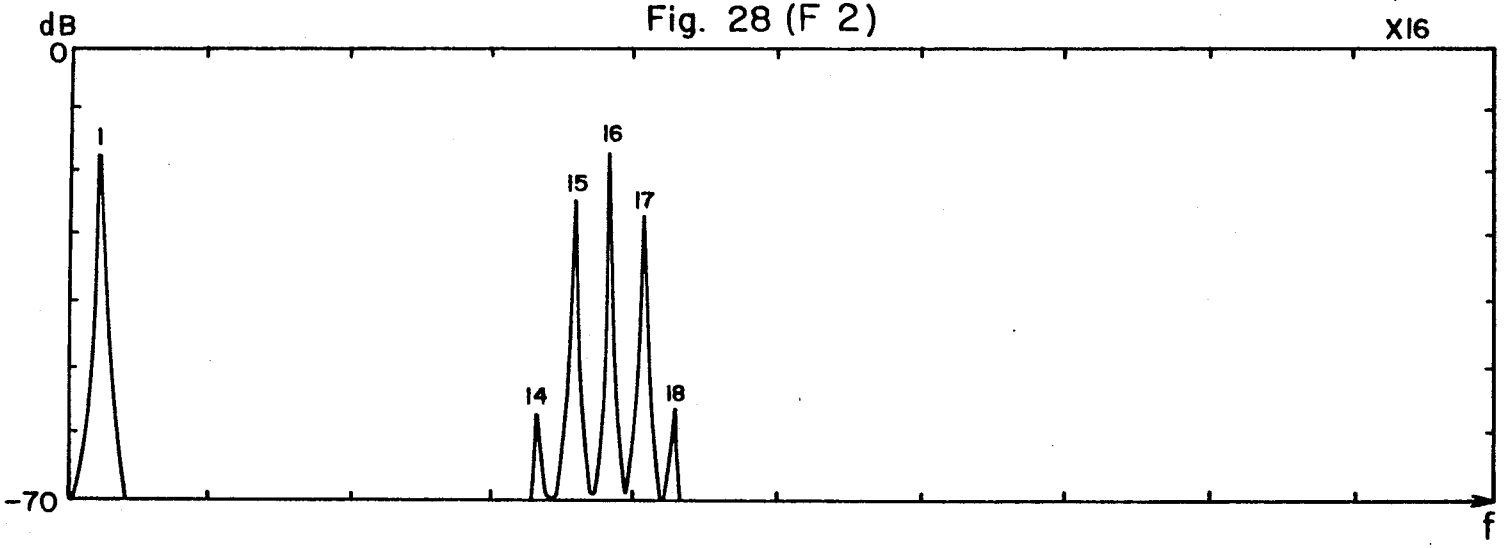
Fig. 28 (F 2)

ELECTRONIC MUSICAL INSTRUMENT

Matter enclosed in heavy brackets [ ] appears in the original patent but forms no part of this reissue specification; matter printed in italics indicates the additions made by reissue.

This application is a continuation of application Ser. No. 561,180, filed Dec. 14, 1983, now abandoned.

2. BACKGROUND OF THE INVENTION

The present invention relates to a waveform generator circuit which generates a waveform with digital circuitry, and more particularly to an electronic musical instrument in which the rate of accessing a waveform changes in one cycle of the waveform.

With the progress of digital technology, it has become possible to generate waveform data by means of digital circuitry and to convert the digital waveform data into an analog signal by means of a digital-to-analog converter, thereby to produce an analog signal waveform. Such waveform generation by digital circuitry is also applied to electronic musical instruments, and the products of electronic musical instruments capable of generating waveforms of various tone colors are implemented.

Until now, the musical sound generating systems of the electronic musical instruments based on digital circuitry as stated above have included (i) a sinusoidal wave synthesis system, (ii) a variable filter system, (iii) a waveform memory readout system, (iv) a frequency modulation system, etc.

The sinusoidal wave synthesis system (i) is a system wherein the sinusoidal wave signals of a fundamental wave and higher harmonics are generated by a digital circuit, and these digital waveform signals are synthesized to produce a musical sound of desired tone color. In case of producing musical sounds in desired harmonic overtone forms, this system needs computing channels which are equal in number to the sorts of required harmonic overtones. Further, in case of changing a spectrum with time, higher harmonics control signals equal in number to the sorts of harmonic overtones are needed, for varying amplitude levels for the respective harmonic overtones. This system has the problems that the generator circuit becomes large in size because the aforementioned computing channels and higher harmonics control signals necessitate circuits equal in number to the sorts of harmonic overtones, and that the generation control of the higher harmonic control signals becomes complicated.

The variable filter system (ii) is a system wherein a digital filter is used, and the frequency characteristic of the filter is changed by a variable signal. This system has the problem that the circuit of the digital filter becomes large in size. Further, in a case where a waveform is generated at a fixed sampling rate, that is, where the fundamental tone to be inputted to the digital filter is generated at a fixed sampling rate, a waveform having a large number of higher harmonics is difficult to obtain, resulting in the problem that the effect of the digital filter in a higher harmonics region decreases to half. This system also has the problem that folded distortion arises.

The waveform memory readout system (iii) is a system wherein waveform data stored in a memory or the like in advance is sequentially read out in correspondence with a phase angle, thereby to generate a waveform. Since the aforementioned waveform data stored in the waveform memory is the data of a musical sound waveform to be produced as a musical sound, the spectrum of the waveform has been fixed. In order to change the spectrum, therefore, waveform data corresponding to the change of the spectrum must be stored in the memory, and moreover, a control circuit for reading out the data successively in correspondence with the change of the spectrum is needed. This system accordingly has the problems that the capacity of the memory is large and that the control circuit is complicated.

The system (iv) is an application of frequency modulation, and is a system wherein, using the two sinusoidal waves of a carrier wave and a modulating wave, the frequency ratio and the modulation depth are changed thereby to change a harmonic overtone. This system can control the harmonic overtone to some extent. Since, however, each harmonic overtone changes according to a Bessel function, it has been difficult to obtain a musical sound whose spectrum has a smoothly changing envelope, for example, whose amplitude value decreases as the waveform changes from the fundamental wave toward the higher harmonics.

Further, there is a system wherein a peak (hereinbelow, termed the "formant peak") is possessed in the higher frequency region of the spectrum of a musical sound waveform, and the formant peak frequency is changed with time, thereby to bestow a change on a musical sound. An example is to utilize the resonance effect of a voltage control filter VCF in an analog synthesizer. Methods of generating the aforementioned formant peak by means of a digital circuit include (a) a method wherein the coefficient of a harmonic overtone synthesized by adding sinusoidal waves is changed with time so as to give rise to a filter effect, and to generate a peak value in the amplitude values of higher harmonics of higher orders, and (b) a method wherein a resonance effect as attained with an analog filter is produced by a digital low-pass filter. The method (a) is the same as the foregoing system (i). It requires computing channels corresponding to the higher-order frequencies in order to generate the higher harmonics, and besides, it needs to set amplitudes for the respective higher harmonics, namely, harmonic overtones, so that a complicated circuit is necessitated and has been difficult to fabricate. With the method (b), the circuit of the digital filter becomes larger in size and has similarly been difficult in realization.

3. SUMMARY OF THE INVENTION

The present invention has been made in order to solve the problems of the prior art, and has for its first object to provide a waveform generating system which permits the spectrum of a waveform to change smoothly.

A second object of the present invention is to provide a waveform generating system which generates the waveforms of a rectangular wave, a sawtooth wave, etc. free from the higher frequency components of the signals thereof.

A third object of the present invention is to provide a musical sound generating system for an electronic musical instrument in which the spectrum of a waveform is changed by a digital circuit.

A fourth object of the present invention is to provide a musical sound generating system for an electronic musical instrument which generates a musical sound having a peak value in the higher frequency region of a spectrum, namely, in harmonic overtones.

According to the present invention, there is provided an electronic musical instrument comprising storage means to store waveform information; address signal production means to produce an address signal which changes at a uniform rate over one cycle of a waveform, in order to read out the waveform information stored in said storage means; modification means to modify the address signal produced from said address signal production means, into a modified address signal whose changing rate varies in one cycle of the waveform; and means to access said storage means by the use of the modified address signal delivered from said modification means.

Another feature of the present invention is to provide an electronic musical instrument comprising storage means to store waveform information; address signal production means to successively produce address signals for reading out the waveform information stored in said storage means; modification means to modify each of the address signals into a modified address signal which appoints an address of more than one cycle of a waveform while said each address signal appoints an address of one cycle of the waveform; and means to access said storage means by the use of the modified address signal delivered from said modification means.

4. BRIEF DESCRIPTION OF THE DRAWINGS

Figure 1:
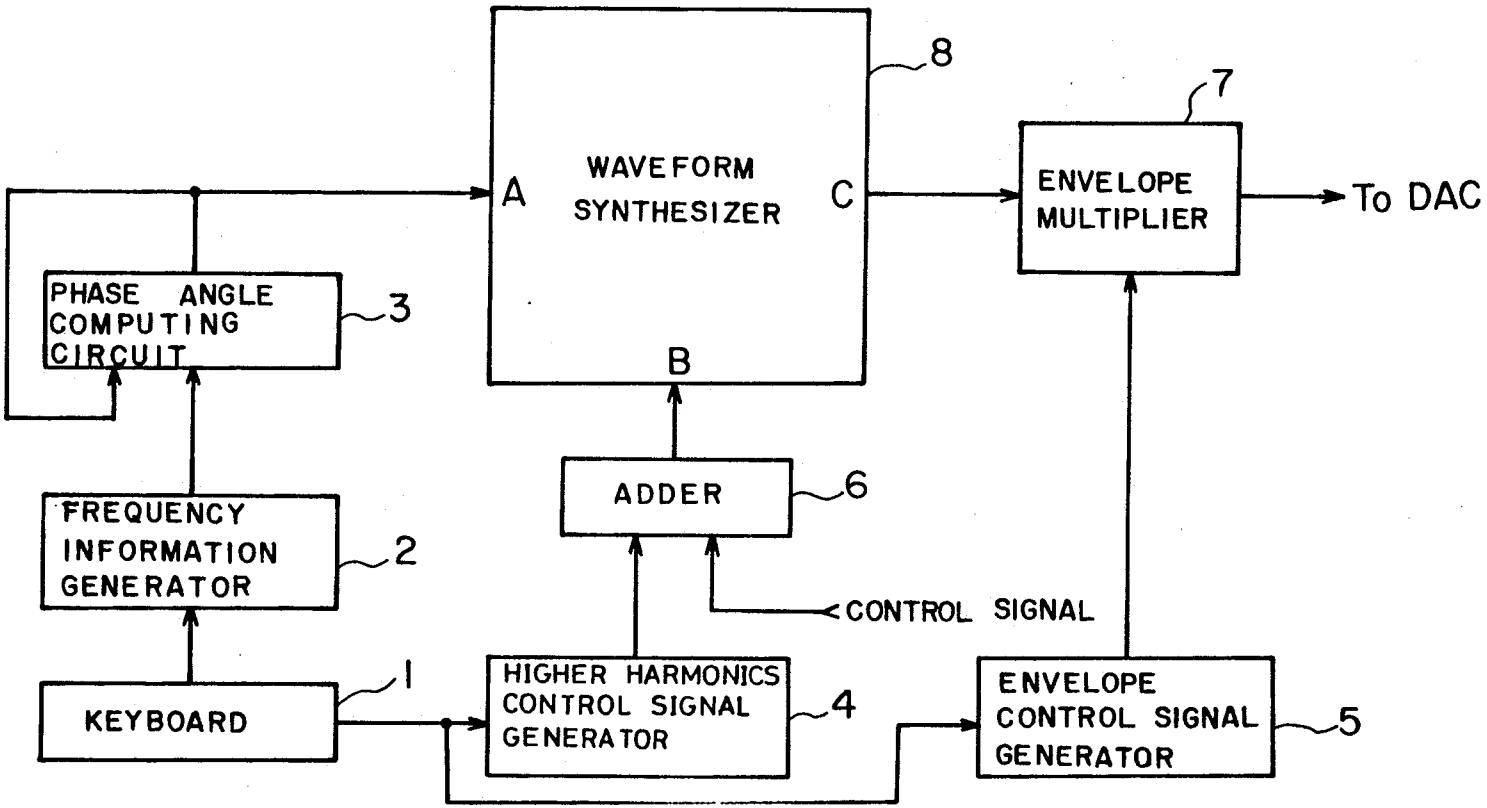
FIG. 1 is a block diagram showing an embodiment of the present invention.
Figures 3, 4A, 4B, 4C, 4D:
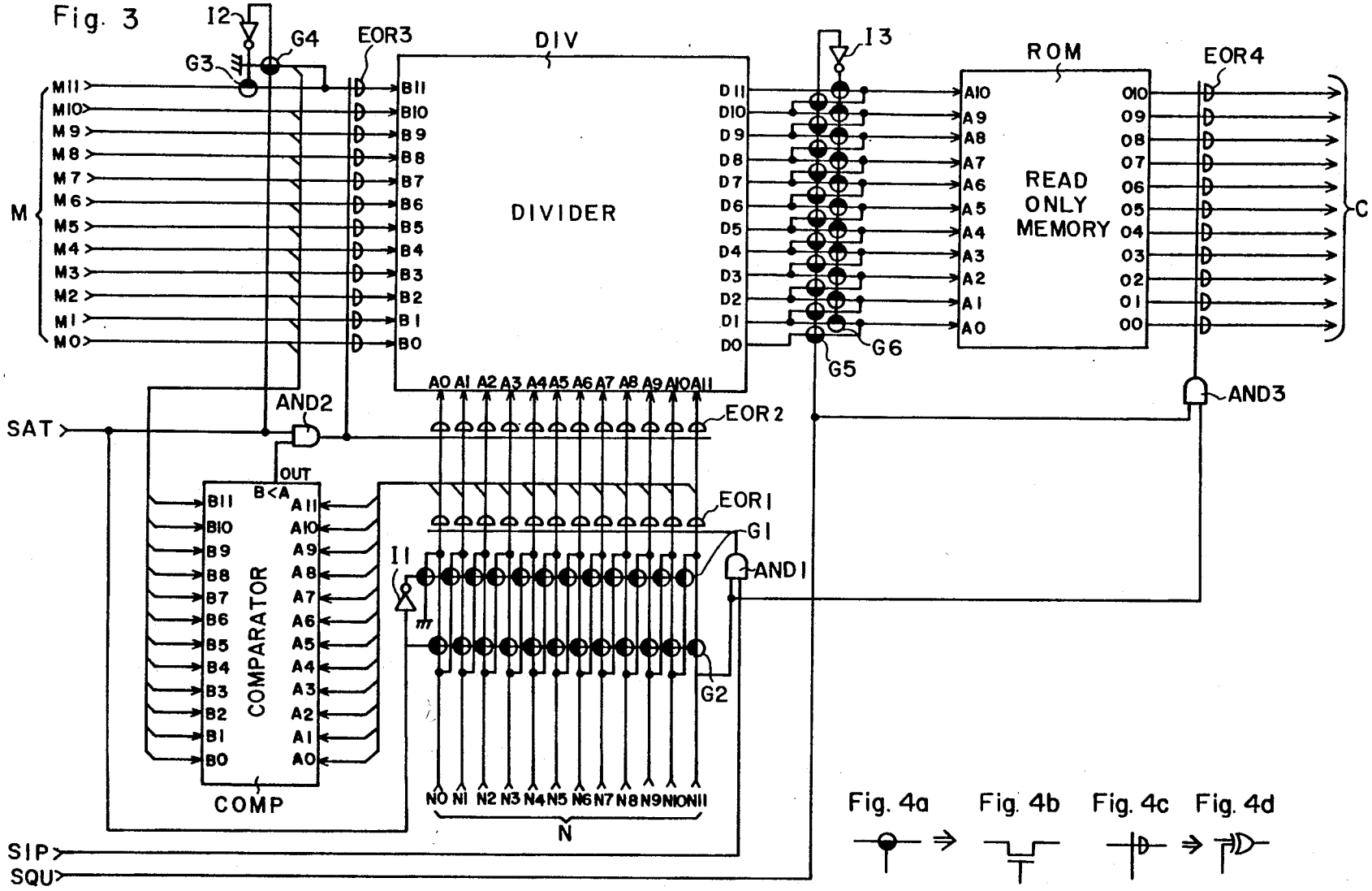
FIGS. 3 and 12 are circuit diagrams each showing the arrangement of FIG. 2 more in detail.
Figure 15:
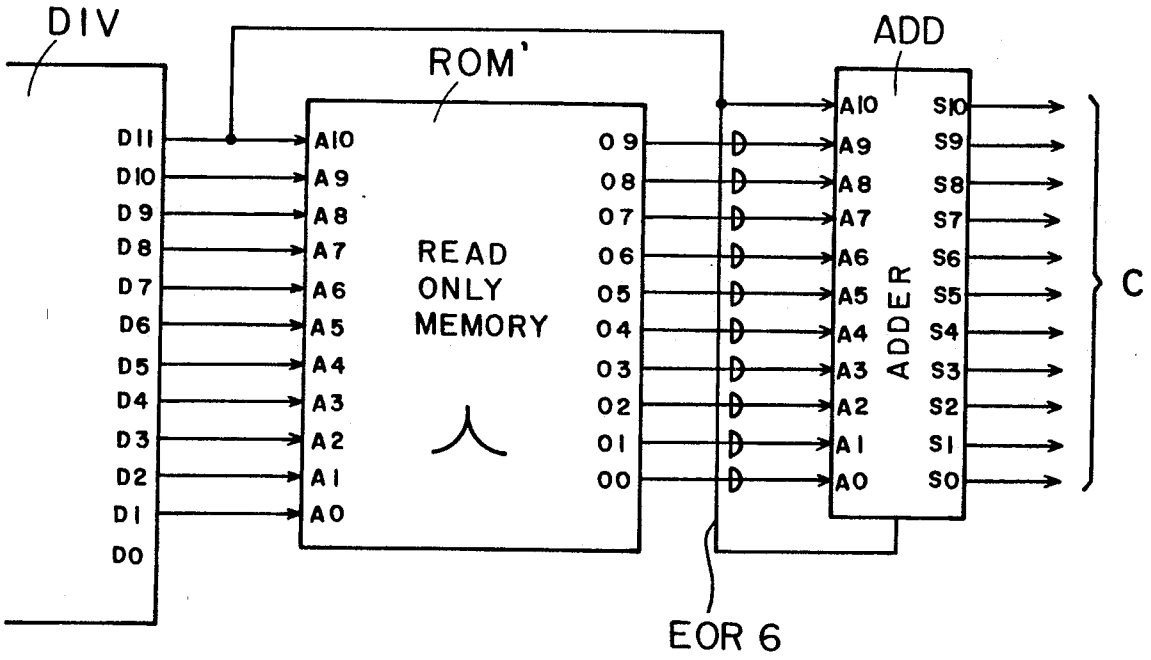
Figure 16:
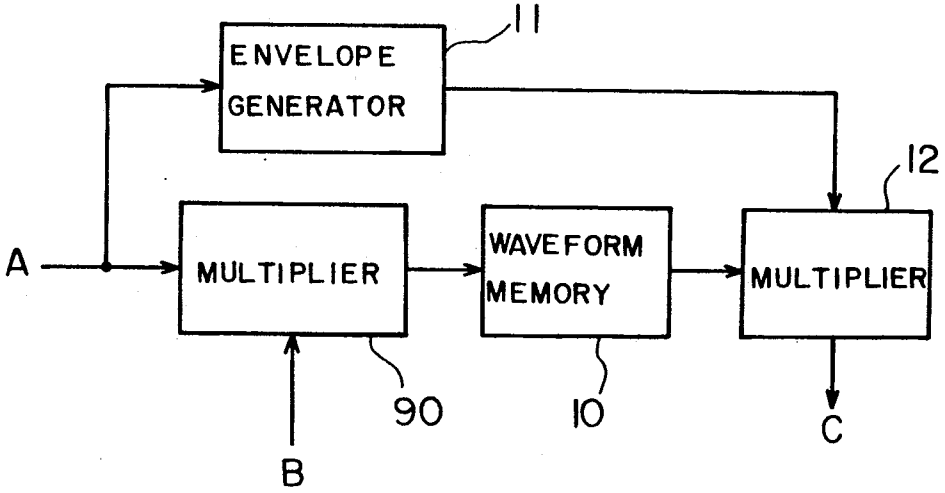
Figure 17:
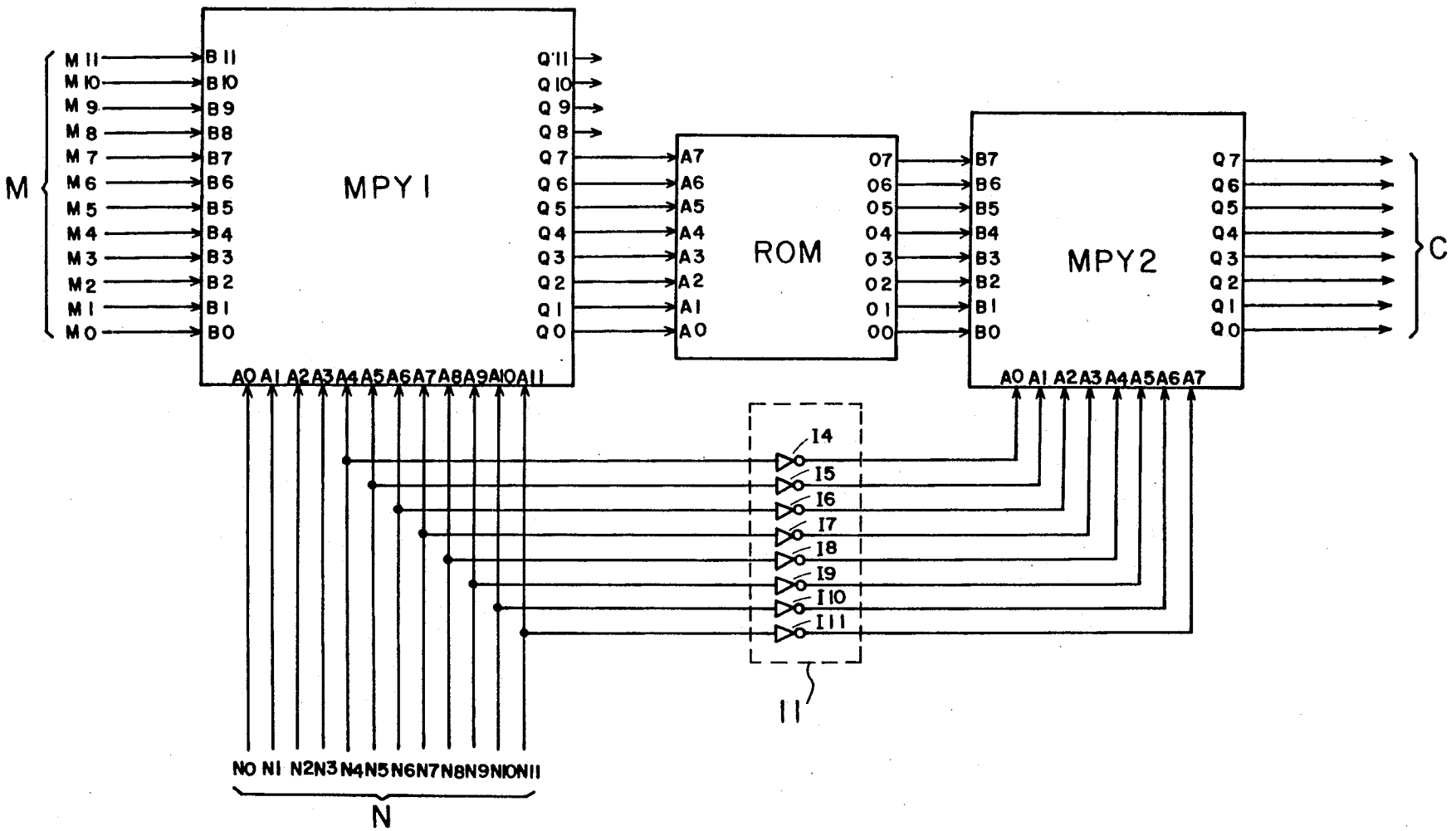
Figure 22:
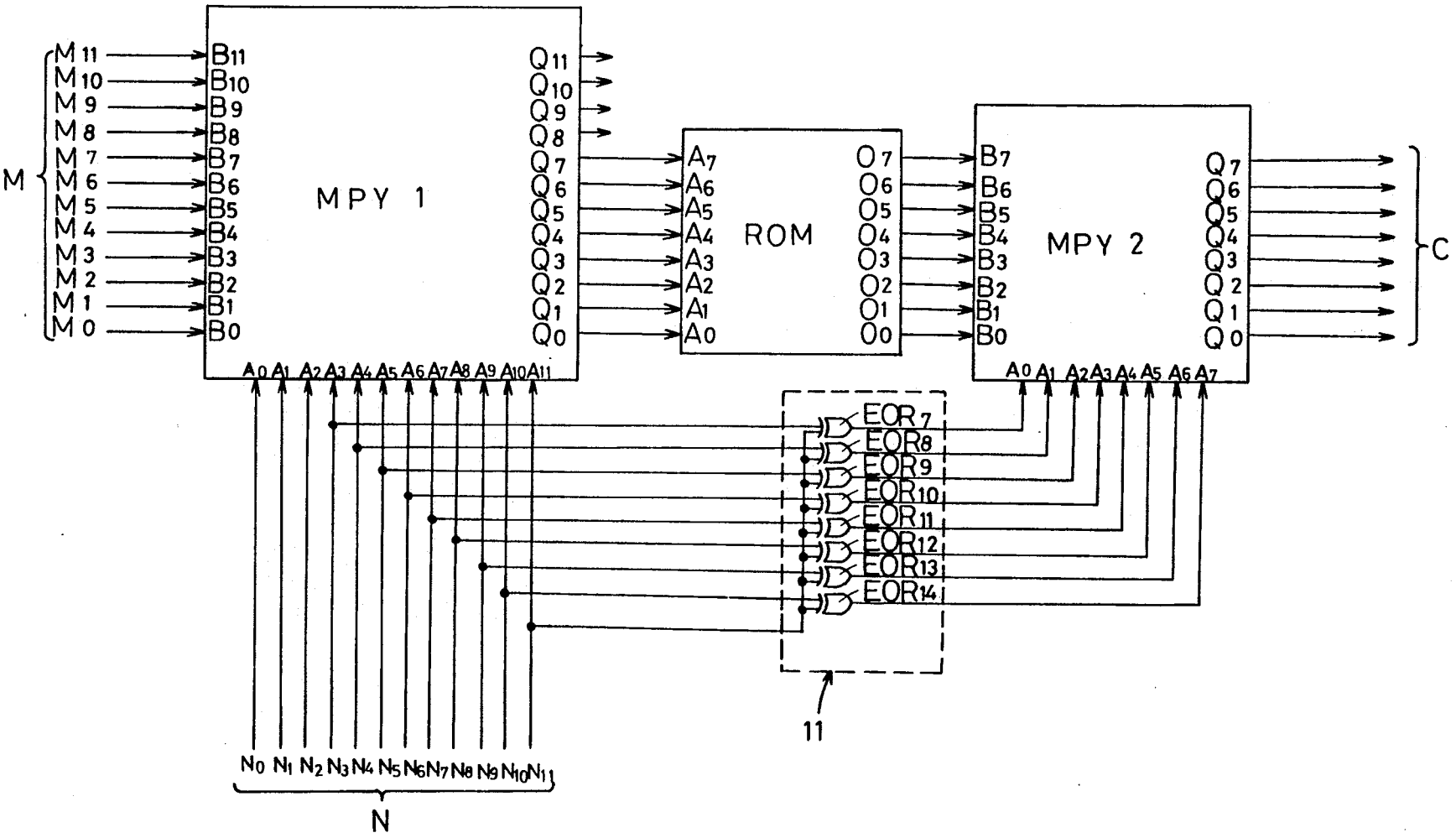
Figure 24:
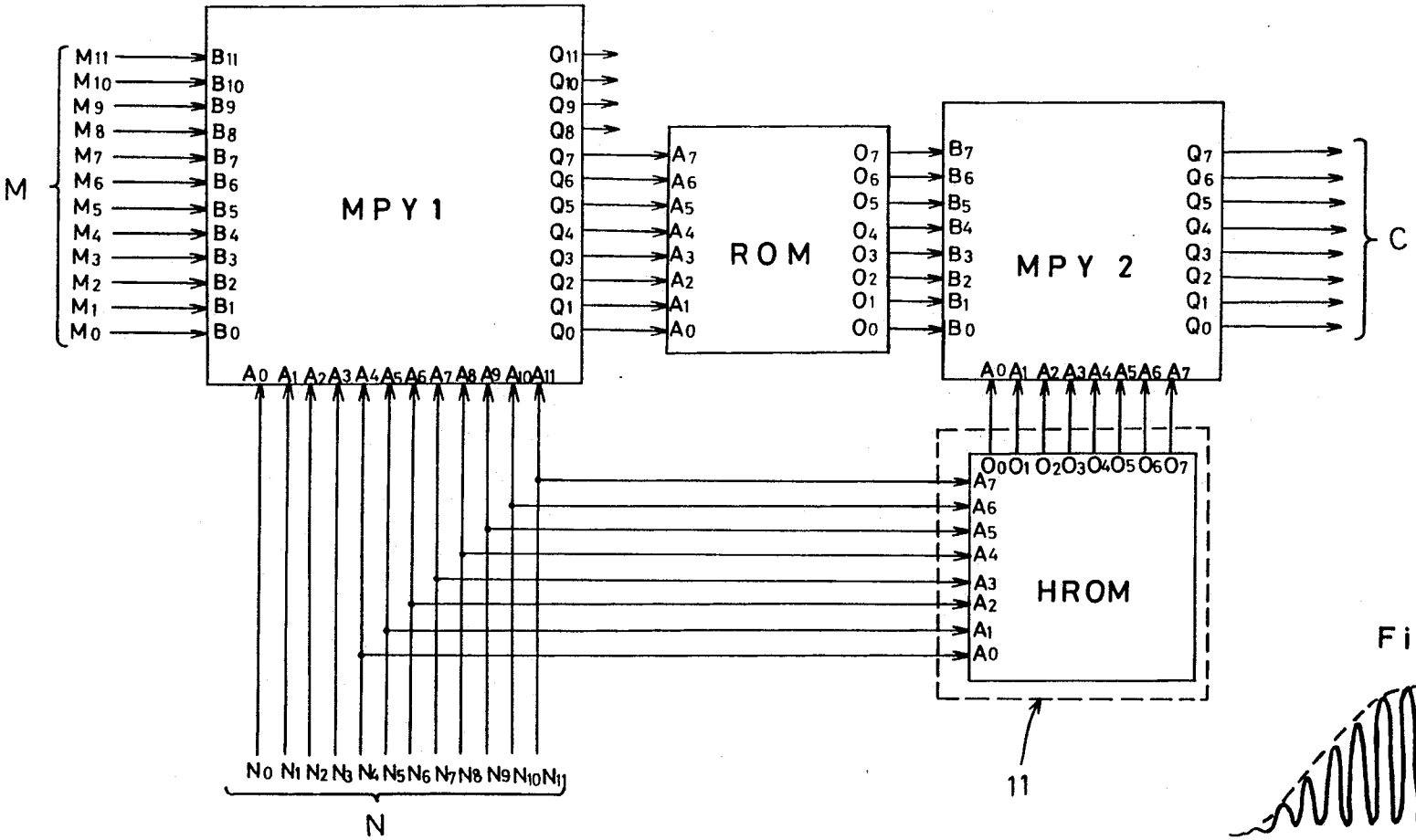

FIGS. 4(a)–4(d) are diagrams for explaining symbols used in FIG. 3;

FIGS. 5, 8, 10, 13, 14, 18, 19, 20, 21, 23 and 25 are waveform diagrams for explaining the formation of waveforms in the present invention;

FIGS. 6(A), 7(A), 9(A) and 11(A) show output waveforms in an embodiment of the present invention, while FIGS. 6(B), 7(B), 9(B) and 11(B) show corresponding spectra;

FIG. 15 is a circuit diagram of a read only memory and peripheral circuits thereof showing a modified embodiment of the present invention;

FIG. 16 is a block diagram showing the second arrangement of the waveform synthesizer circuit in FIG. 1;

FIGS. 17, 22 and 24 are circuit diagrams each showing the arrangement of FIG. 16 more in detail; and FIGS. 26(A1), 26(B1), . . . 26(F1), FIGS. 27(A1), 27(B1), . . . 27(F1) and FIGS. 28(A1), 28(B1), . . . 28(F1) show waveforms generated by the respective embodiments of the present invention in FIGS. 17, 22 and 24, while FIGS. 26(A2), 26(B2), . . . 27(F2), FIGS. 27(A2), 27(B2), . . . 27(F2) and FIGS. 28(A2), 28(B2), . . . 28(F2) show corresponding spectra.

5. PREFERRED EMBODIMENTS OF THE INVENTION

FIG. 1 is a circuit block diagram showing an embodiment of the present invention. In the illustrated embodiment of FIG. 1, the present invention is applied to an electronic musical instrument.

The first output of keyboard 1 is applied to a frequency information generator circuit 2, while the second output is applied to a higher harmonics control signal generator circuit 4 as well as an envelope control signal generator circuit 5. The output of the frequency information generator circuit 2 enters the first input terminal of a phase angle computing circuit 3. The output terminal of the phase angle computing circuit 3 is connected to the second input terminal thereof and the input terminal A of a waveform synthesizer circuit 8. The output terminal of the higher harmonics control signal generator circuit 4 is connected to the first input terminal of an adder circuit 6. The second input terminal of the adder circuit 6 is supplied with a control signal from another circuit (not shown). The output of the adder circuit 6 enters the input terminal B of the waveform synthesizer circuit 8. The output terminal C of the waveform synthesizer circuit 8 is connected to the first input terminal of an envelope multiplier circuit 7, the second input terminal of which has the output terminal of the envelope control signal generator circuit 5 connected thereto. The output terminal of the envelope multiplier circuit 7 is connected to a digital-to-analog converter circuit DAC (not shown). The keyboard 1 is a circuit which generates the positional information of a depressed key and the timing signal of the key. The positional information of the key is applied to the frequency information generator circuit 2, and the timing signal of the key to the higher harmonics control signal generator circuit 4 and the envelope control signal generator circuit 5. The frequency information generator circuit 2 is a circuit which generates frequency information, namely, phase angle information corresponding to the depressed key on the basis of the aforementioned positional information of the key. By way of example, it delivers the phase angle information in succession in accordance with specified clock pulses. The phase angle computing circuit 3 adds the information applied to the first and second input terminals thereof, and delivers the result. Since the output of the phase angle computing circuit 3 enters the second input terminal thereof, the phase angle information items produced from the frequency information generator circuit 2 are successively added to the contents of the phase angle computing circuit 3 in accordance with the specified clock pulses. That is, the phase angle information items produced from the frequency information generator circuit 2 are accumulated by the phase angle computing circuit 3. The cumulation is executed in single-cycle units, and when a phase angle of above one cycle has been reached, the phase of one cycle is subtracted. In the embodiment of FIG. 1, the phase angle of one cycle (corresponding to $2\pi$) is set at, e.g., $2^{12}$. When this value has been exceeded, a carry ought to be provided. Since, however, no carry is used, the operation of the embodiment results in the subtraction of the phase angle corresponding to one cycle. The output of the phase angle computing circuit 3 is applied to the input terminal A of the waveform synthesizer circuit 8. The higher harmonics control signal generator circuit 4 is supplied with the timing signal, and converts it into, e.g., a tone color control signal for changing a higher harmonic component with time. The resulting output of the tone color control signal is added in the adder circuit 6 with the external control signal, for example, a control signal for changing a tone color by means of an actuator disposed outside. The adder circuit 6 can be omitted in a case where the control signal is not externally applied. The output of the adder circuit 6 is applied to the input terminal B of the waveform synthesizer circuit 8. The waveform synthesizer circuit 8 is a circuit for accessing a waveform after the phase angle or address signal changing at a uniform rate as received from the input terminal A is converted into a modified address signal whose one cycle is equal to one cycle of the received address signal, but in which the first half of such one cycle has a higher rate and the latter half a lower rate by way of example, or into a modified address signal which addresses more than one cycle while the received address signal appoints one cycle. The extent of the modification changes, depending upon the control signal received from the input terminal B.

The timing signal of the keyboard 1 is further applied to the envelope control signal generator circuit 5. The envelope control signal generator circuit 5 generates control data for changing the amplitude of a musical sound to-be-produced in correspondence with the depressed key. The output or envelope signal of the circuit 5 enters the envelope multiplier circuit 7. On the other hand, waveform data delivered from the output terminal C of the waveform synthesizer circuit 8 enters the envelope multiplier circuit 7. The envelope multiplier circuit 7 multiplies the waveform data and the envelope signal, and delivers the result. The output of the envelope multiplier circuit 7 is applied to the digital-to-analog converter circuit DAC (not shown), by which it is converted into an analog signal.

Figure 2:
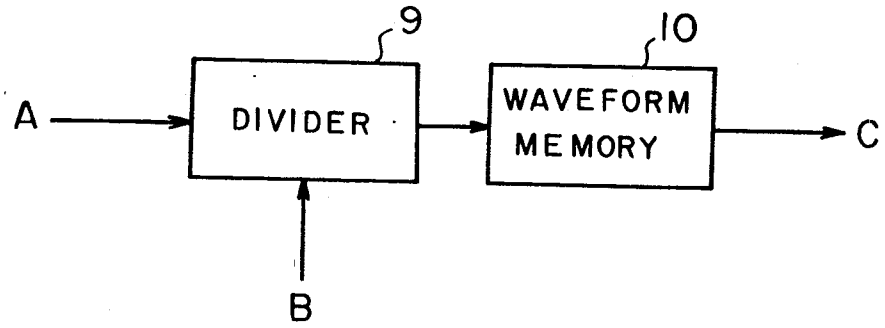
FIG. 2 is a block diagram showing the first arrangement of a waveform synthesizer circuit in FIG. 1.

By way of example, the waveform synthesizer circuit 8 is composed of a divider circuit 9 and a waveform memory 10 as shown in FIG. 2. The divider circuit 9 executes an operation in which the phase angle received from the input terminal A is divided by the tone color control signal, namely, higher harmonics control signal received from the input terminal B, in a specified phase angle range and is further divided by a different value in another specified range. That is, in the waveform synthesizer circuit 8, the advancing way of the phase angle is not held constant over one cycle, but is changed. The divided result accesses the waveform memory 10 within the waveform synthesizer circuit 8, and waveform data is delivered from the output terminal C. The access to the memory at this time is not fixed over one cycle, but is changed within one cycle, so that the waveform data obtained by distorting the phase of a waveform stored in the waveform memory 10 is provided from the output terminal C.

FIG. 3 is a detailed circuit diagram illustrative of the first arrangement of the waveform synthesizer circuit 8 corresponding to the embodiment of the present invention shown in FIG. 2. Symbols in FIG. 3 are informal, and the respective symbols (a) and (c) denote setups depicted at (b) and (d) in FIGS. 4(a)–4(d). As seen from FIGS. 4(a)–4(d), FIG. 4(a) expresses the gate circuit (FIG. 4(b)) of a FET, the source and drain of which correspond to the input and output of the gate circuit and the gate of which corresponds to the control input terminal of the gate circuit. FIG. 4(a) shows the exclusive logic OR gate (FIG. 4(d)) for an input. A group of input terminals N is connected to a group of gates G1 and a group of gates G2. The ends of the groups of gates G1, G2 remote from the input terminals N are connected to a group of exclusive logic OR gates EOR1, the output signals of which are applied to the inputs A0–A11 of a divider DIV through a group of exclusive logic OR gates EOR2. The group of gates G1 are connected so that the respective bit positions N0–N11 of the input terminals N may be shifted by one bit toward the upper bits, and the least significant bit thereof is connected so that a low level (ground level) may be received. A control terminal SAT is directly connected to the control input terminals of the group of gates G2, and it is connected to the control input terminals of the group of gates G1 through an inverter I1. The first input of an AND gate AND1 has a control terminal SIP connected thereto, the second input thereof has the bit N11 of the input terminals N connected thereto, and the output thereof is connected to the second inputs of the exclusive logic OR gates EOR1 in common.

The bits M0–M10 and bit M11 of a group of input terminals M are connected to the inputs B0–B11 of the divider DIV through a group of exclusive logic OR gates EOR3 and through a gate G3 as well as the exclusive logic OR gate EOR3, respectively. The input of the exclusive logic OR gate EOR3 corresponding to the bit M11 has a gate G4 connected thereto. The end of the gate G4 remote from the exclusive logic OR gate EOR 3 is grounded, and the control input terminal thereof has the control terminal SAT connected thereto. Meanwhile, the control input terminal of the gate G3 has the control terminal SAT connected thereto through an inverter I2. The first inputs A11–A0 of a comparator COMP are supplied with the outputs of the group of exclusive logic OR gates EOR1, while the second inputs B11–B0 are supplied with the same signals as those entering the group of exclusive logic OR gates EOR 3. The comparison output of the comparator COMP is connected to the first input of an AND gate AND2. The control terminal SAT is connected to the second input of the AND gate AND2, the output of which enters the second inputs of the respective groups of exclusive logic OR gates EOR2 and EOR 3 in common.

The operated outputs D0–D11 of the divider DIV enter the address inputs of a read only memory ROM through groups of gates G5, G6. The waveform amplitude values of the half wavelength components of cosine waves are stored in the read only memory ROM. It corresponds to $-1$ when all the outputs are at a low level, and to $+1$ that they are at a high level. A control terminal SQU is directly connected to the control input terminals of the group of gates G5, and it is connected to the control input terminals of the group of gates G6 through an inverter I3. The outputs O0–O10 of the read only memory ROM are delivered through a group of exclusive logic OR gates EOR4. The control terminal SQU and the bit N11 are respectively connected to the inputs of an AND gate AND3, the output of which enters the inputs of the group of exclusive logic OR gates EOR4 in common.

In the embodiment of the present invention shown in FIG. 3, the input terminals N and M correspond to the inputs A and B of the waveform synthesizer circuit 8 in FIG. 1, respectively. The input terminal N is supplied with the output or phase angle data N0–N11 of, e.g., 12 bits from the phase angle computing circuit 3 in FIG. 1, while the input terminal M is supplied with the tone color control data or modulation depth data M0–M11 of, e.g., 12 bits from the adder circuit 6 in FIG. 1.

This circuit includes the three control terminals SAT, SIP and SQU as stated above. By selecting any of the aforementioned control terminals, that is, by applying a high level to one of them, a waveform changes variously depending upon the signals received from the input terminal M.

First, when the high level signal is applied to the control terminal SAT and low level signals are applied to the control terminals SIP, SQU, a sawtooth wave is generated. When the control terminals SIP, SQU are supplied with the low level signals, the outputs of the AND gates AND1 and AND3 become low level signals, and the groups of exclusive logic OR gates EOR1 and EOR4 operate as buffers. In addition, since the control input terminals of the group of gates G5 are supplied with the low level signal, these gates G5 turn "off". Further, since the inverter I3 is supplied with the low level signal, its output becomes the high level, which enters the control input terminals of the group of gates G6 to turn "on" these gates G6. That is, the outputs D1–D11 of the divider DIV are respectively applied to the addresses A0–A10 of the read only memory ROM.

Also, the high level signal is applied to the control terminal SAT, so that the group of gates G2 turn "on". This high level signal is inverted by the inverter I1 into a low level signal, which is applied to the control input terminals of the group of gates G1, so that these gates G1 turn "off". That is, the respective bits N0–N11 of the input N enter the inputs A0–A11 of the divider DIV through the group of exclusive logic OR gates EOR2. In addition, when the high level signal is applied to the control terminal SAT, the gate G4 turns "on" and the gate G3 "off", and the input of the exclusive logic OR gate EOR3 corresponding to the input B11 of the divider DIV becomes the low level.

The value applied to the input terminal N and the value applied to the input terminal M are compared by the comparator COMP. When the value of the input terminal N is smaller than that of the input value M, a low level signal is delivered from the comparison output OUT, and it is applied to the groups of exclusive logic OR gates EOR2 and EOR3 through the AND gate AND2. As a result, the groups of exclusive logic OR gates EOR2 and EOR3 operate as buffers. When the phase angle advances gradually until the value applied to the input terminal N becomes larger than the value applied to the input terminal M, a high level signal is delivered from the comparison output OUT of the comparator COMP. Thus, the output of the AND gate AND becomes the high level. Since the high level output enters the groups of exclusive logic OR gates EOR2 and EOR3, these groups of exclusive logic OR gates EOR2 and EOR3 execute inverter operations.

Figure 5:
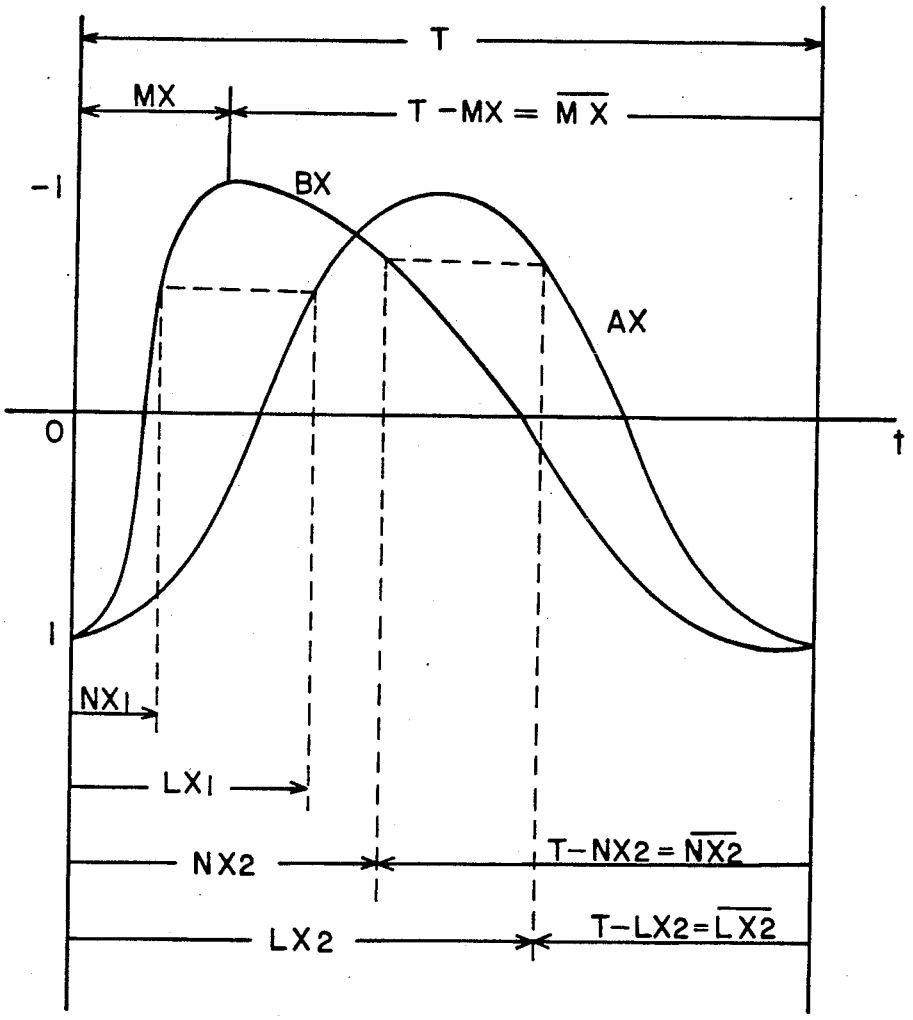

That is, when the high level signal is applied to the control terminal SAT and the low level signals are applied to the control terminals SIP and SQU, the value generated by the phase angle computing circuit 3 and entering the input terminal N, namely, the phase angle address value NX is subjected to a calculation so as to distort the value, and a waveform stored in the read only memory ROM is read out by the use of the new or calculated phase angle address value LX, so as to change the waveform. FIG. 5 shows a waveform diagram corresponding thereto. The axis of abscissas represents the time t, while the axis of ordinates represents the normalized value of the amplitude. A waveform AX corresponds to a case where the modulation depth information MX is $MX=T/2$, and a waveform BX corresponds to a case where $MX<T/2$. Here, T expresses one cycle of the waveform. Since, in this operation, the value entering the divider DIV changes depending upon the comparison result of the comparator COMP, one cycle will be described as to two separate conditions. When $NX \leqq MX$ holds, the embodiment operates so that the length of ½ cycle of a cosine wave stored in the read only memory ROM may become the modulation depth information. Regarding the magnitude NX1 of the phase angle address value under this condition, LX1 at this time becomes:

$$LX1=NX1/MX\cdot T/2 \quad (1)$$

The divider DIV executes the binary operation, and the cycle has a value of the power of 2. In the embodiment of the present invention shown in FIG. 3, therefore, T/2 on the right-hand side of Equation (1) is not especially multiplied. In this regard, however, T/2 is equivalently multiplied as stated below. The outputs of the divider DIV provide successive values below a decimal point in such a manner that the output D11 is the first decimal place of a binary number and that the output D10 is the second decimal place thereof. Such values are shifted to the lower places by one bit, into the address of the read only memory ROM.

When $NX>MX$ holds, the embodiment operates so that the remaining ½ cycle of the cosine wave stored in the read only memory ROM may become $(T-MX)$. Regarding the value NX2 of MX under this condition, the calculated phase angle address value LX2 at this time satisfies:

$$T-LX2=(T-NX2)/T-MX)\cdot T/2 \quad (2)$$

Here, since the cycle T is the power of 2, $$T-\overline{MX}=\overline{MX};$$

$$T-\overline{NX2}=\overline{NX2},$$

and $$T-\overline{LX2}=\overline{LX2}$$

hold, and the calculated phase angle address value LX2 is expressed by:

$$LX2=\overline{NX2}/\overline{MX}\cdot\overline{T/2} \quad (3)$$

Here, — over the symbols indicate the corresponding inverted signals. In the circuit of FIG. 3, when this condition of $NX>MX$ has held, the output of the comparator COMP becomes the high level, and the high level signal enters the groups of exclusive logic OR gates EOR2, EOR3 through the AND gate AND2. Therefore, the groups of exclusive logic OR gates EOR2 and EOR3 execute inverter operations to apply $\overline{MX}$ and $\overline{NX}$ to the divider DIV respectively. The resulting output or LX2 is not inverted. Since, however, the waveform stored in the read only memory ROM is a cosine wave of ½ wavelength, inputting LX causes no change from inputting $\overline{LX}$. The output LX2 enters the read only memory ROM as the address thereof in that state without being inverted. That is, in order to simplify the circuit arrangement, the embodiment of the present invention has omitted the inverting function, particularly the insertion of a group of exclusive logic OR gates connected to the output of the AND gate AND2, between the divider DIV and the read only memory ROM. It is of course possible to insert this group of exclusive logic OR gates. On the basis of the inputted address value mentioned above, the waveform data of the read only memory ROM is outputted. The output value corresponds to the waveform BX in FIG. 5. Thus, the read only memory ROM is only required to store the half wavelength of the cosine wave, and the storage capacity may be half. The readout of the waveform from the read only memory ROM is done by the half wavelength in the range of $0<NX\leqq MX$, and by the half wavelength in the remaining $MX<NX<T$. As a result, in a case where MX is smaller than T/2, the waveform becomes a sawtooth wave.

Figure 6A:
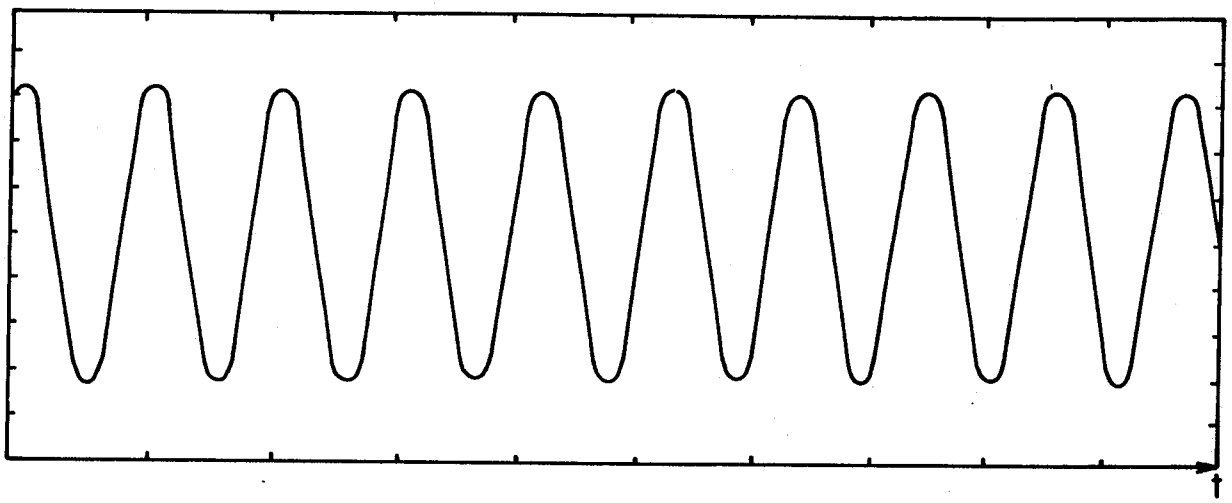
Figure 6B:
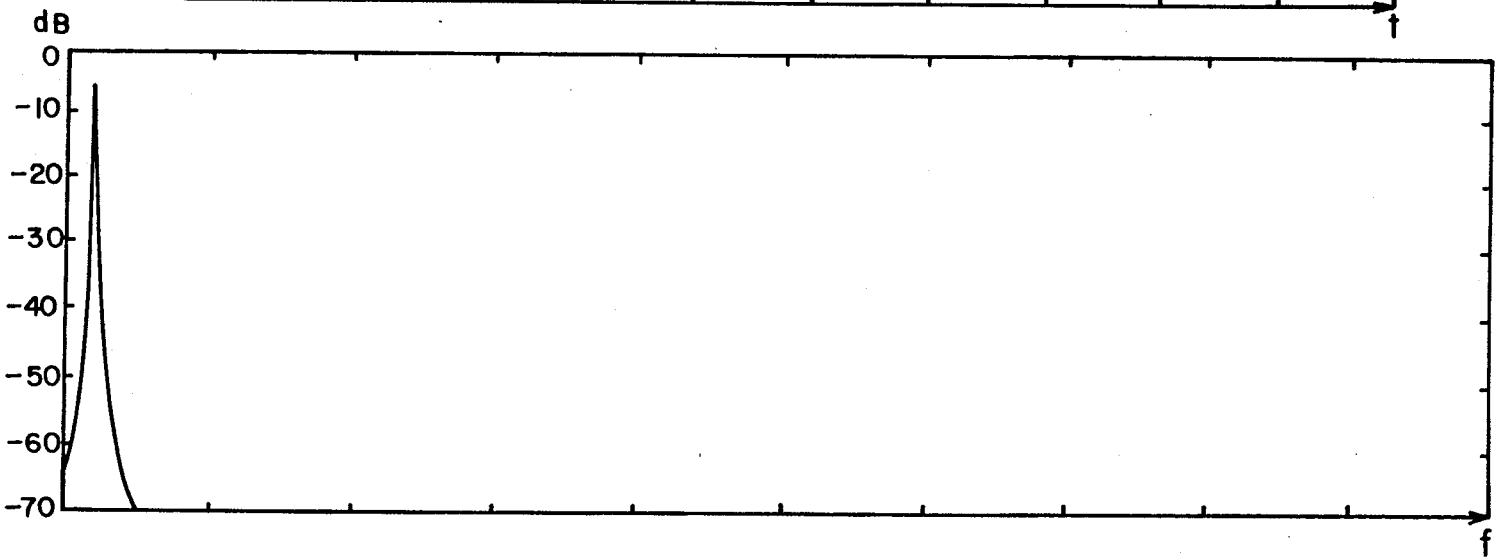
Figure 7A:
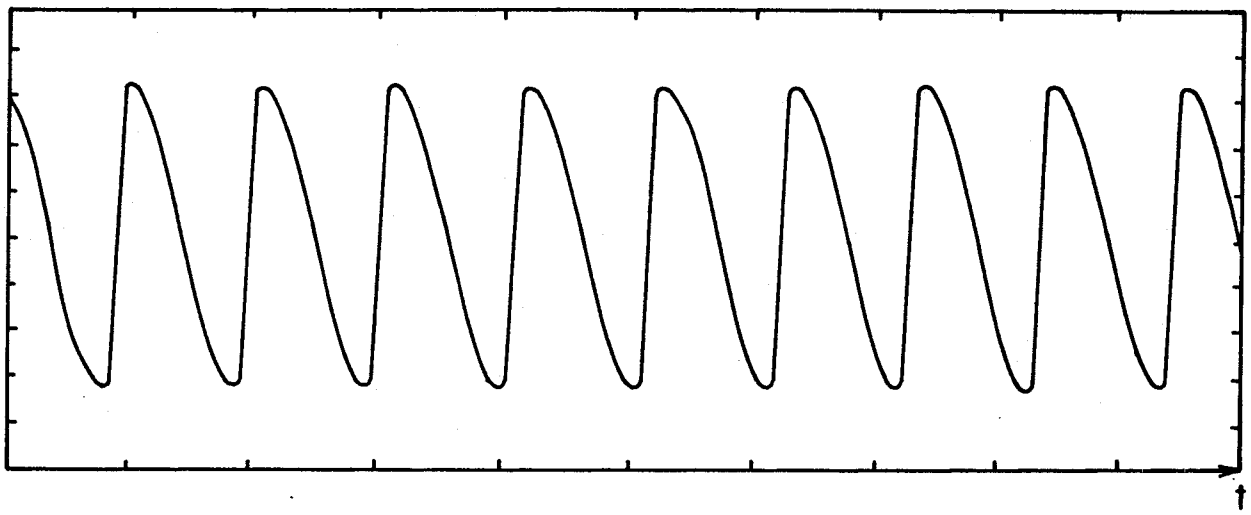
Figure 7B:
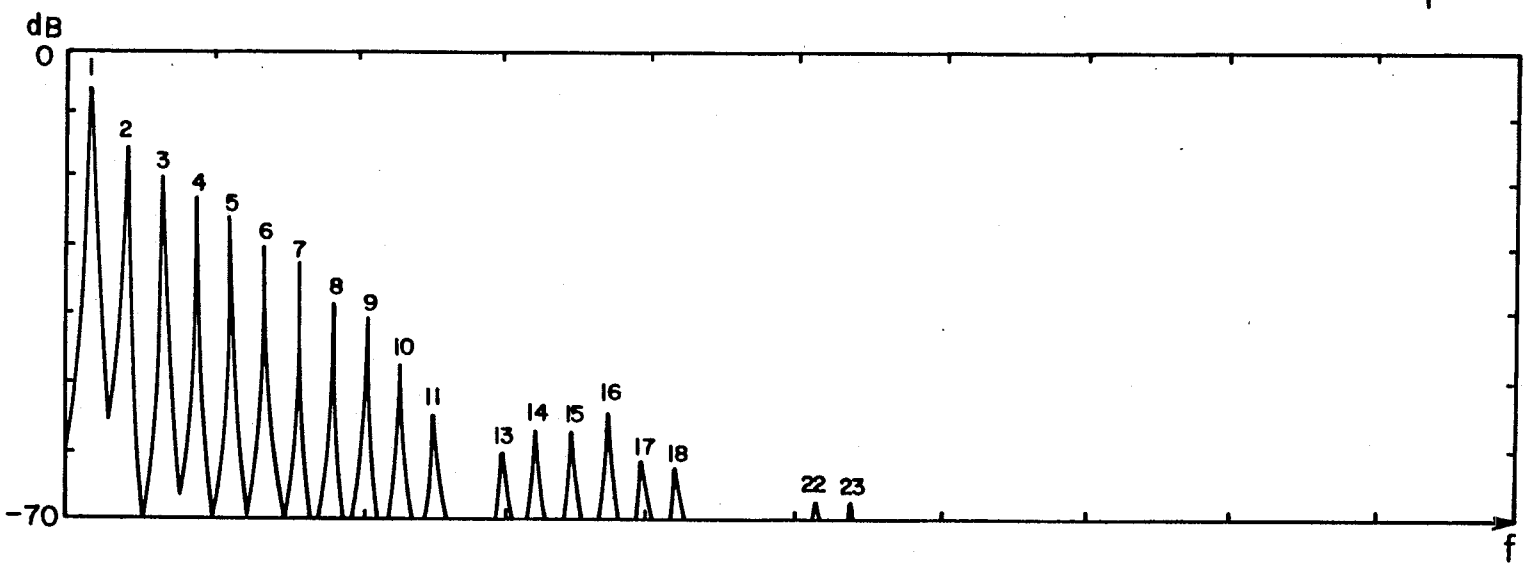

The tone color, in other words, spectrum of the waveform of the sawtooth wave changes depending upon MX. FIGS. 6(A) and 7(A) and FIGS. 6(B) and 7(B) show the output waveforms and their spectra in the foregoing operations in the embodiment of the present invention, respectively. FIGS. 6(A) and 6(B) correspond to the case of $MX=T/2$, and the modulation depth at this time is assumed 100%. FIGS. 7(A) and 7(B) correspond to a case of $MX=T/8$, and the modulation depth is 25%. In FIGS. 6(A) and 7(A), the axis of abscissas indicates the time t, while the axis of ordinates indicates the amplitude. In FIGS. 6(B) and 7(B), the axis of abscissas indicates the frequency f, while the axis of ordinates indicates the amplitude at the corresponding frequency. At the MX value of 100% in FIGS. 6(A) and 6(B), the cosine wave stored in the read only memory ROM is successively and repeatedly read out at equal time intervals. Therefore, the output waveform includes no higher harmonic component and consists only of the fundamental wave. At the MX value of 25% in FIGS. 7(A) and 7(B), time intervals at which the half-wavelength components of the cosine wave stored in the read only memory ROM are read out, are unequal. Therefore, the output waveform becomes a sawtooth wave, and its spectrum includes the fundamental wave and higher harmonics of orders 2, 3, .... Although only the case of the MX value of 25% has been referred to, the higher harmonics of the orders change depending upon the value of the modulating depth MX.

In the next place, when the high level signal is applied to the control terminal SQU and the low level signals are applied to the control terminals SAT and SIP in the embodiment of FIG. 3, a rectangular wave is generated.

When the low level signal is applied to the control terminal SAT, the gate G4 turns "off", and the control terminal of the gate G3 is supplied with a high level through the inverter I2, so that the gate G3 turns "on". Since the AND gate AND2 is also supplied with the low level signal, its output becomes the low level, and the groups of exclusive logic OR gates EOR2, EOR3 operate as buffers. At this time, the comparator COMP operates, but it has no influence on the operation of the whole circuit because its output enters the AND gate AND2. Thus, a signal received from the input terminal M enters the divider DIV without any change in such a manner that the respective bits M0–M11 correspond to the bits B0–B11. Meanwhile, since the low level signal is applied to the control terminal SIP, the group of gates G2 turn "off", and the high level signal is applied to the control terminals of the group of gates G1 through the inverter I1, so that the group of gates G1 turn "on". In addition, since the AND gate AND1 is supplied with the low level signal, the output of the AND gate AND1 becomes the low level, and the group of exclusive logic OR gates EOR1 operates as a buffer. Thus, a signal received from the input terminals N enters the divider DIV with the respective bits N0–N10 corresponding to the bits A1–A11. That is, the signal is shifted by one bit and then applied to the divider DIV. The input A0 of the divider DIV is supplied with the low level signal because the gate of the group of gates G1 corresponding to the input A0 is grounded. Since the control terminal SQU is supplied with the high level signal, the group of gates G5 turn "on", and the control terminals of the group of gates G6 are supplied with the low level signal through the inverter I3, so that these gates G6 turn "off". As a result, the outputs D0–D10 of the divider DIV are correspondingly applied to the address inputs A0–A10 of the read only memory ROM. The output D11 of the divider DIV is not used. Further, since the AND gate AND3 is supplied with the high level signal, the signal of the bit N11 of the input terminals N enters the group of exclusive logic OR gates EOR4 through the AND gate AND3. When the top bit N11 of the data received from the input terminals N is at the low level, the group of exclusive logic OR gates EOR4 operate as a buffer, and when the former is at the high level, the latter operates as an inverter.

Here, as in the foregoing, the value received from the input terminals N is denoted by NX, and further, the value before ½ cycle or T/2 is denoted by NX1, while the value after T/2 by NX2. The values NX1 and NX2 have different levels at the top bit N11, and N11 is at the low level for NX1 and at the high level for NX2.

Figure 8:
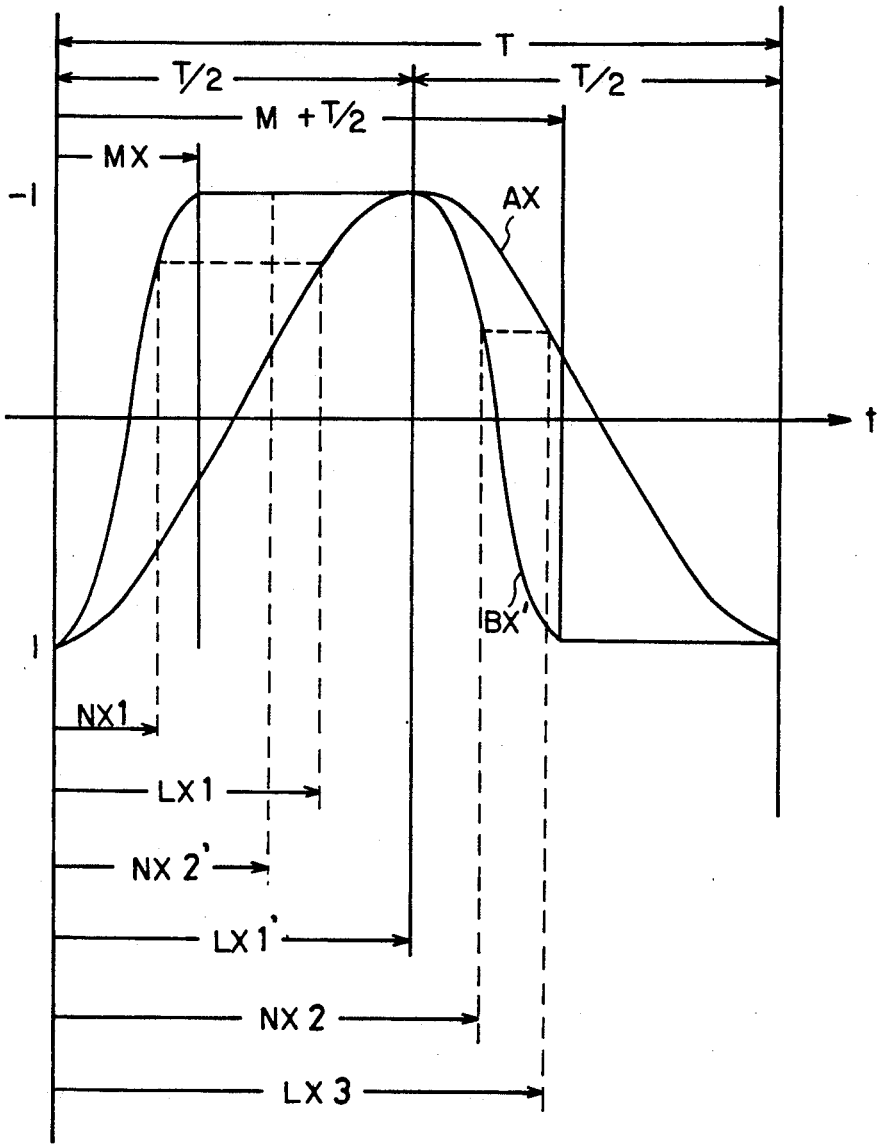

When $NX\leqq T/2$ holds, the top bit N11 becomes the low level as stated before. As a result, the output of the AND gate AND3 becomes the low level. Since this output enters the group of exclusive logic OR gates EOR4, these gates operate as a buffer. Under this status, when $NX\leqq MX$ holds, the address value or the outputs D1–D11 of the divider DIV accesses the address of the read only memory ROM which stores a waveform of ½ wavelength. Since the top bit D11 is open, all the data stored in the read only memory ROM is assigned and provided from the read only memory ROM in this range or $NX\leqq T/2$. Since, under this status, the output of the AND gate AND3 is the low level, the output of the read only memory ROM is delivered from the terminal C as it is. On the other hand, when $T/2\geqq NX>MX$ holds, all the outputs of the divider DIV become the high level. This is because the outputs of the divider DIV deliver values below the decimal point, and the circuit is so arranged that all of them become the high level for a case of at least one. That is, at $T/2\geqq NX>MX$, all the outputs are the high level, so that the outputs of the read only memory ROM become the final values of ½ wavelength stored in this ROM. When $NX>T/2$ holds, the top bit N11 becomes the high level. As a result, the output of the AND gate AND3 becomes the high level. Since this output enters the group of exclusive logic OR gates EOR4, these gates EOR4 operate as an inverter. Under this status, when the value NX' received from the input terminal N except the top bit N11 is $NX'\leqq MX$, the outputs of the divider DIV effect the same function as in the foregoing case of $NX\leqq MX$. However, the outputs of the read only memory ROM at this time are inverted by the group of exclusive logic OR gates EOR4, and the waveform stored in the read only memory ROM is of ½ wavelength of the cosine wave, so that the waveform outputted from the terminal C changes conversely to the case of $NX\leqq MX$. Since, at $NX\geqq MX$, all the outputs of the divider DIV become the high level and the group of exclusive logic OR gates EOR4 operate as the inverter, the values delivered from the terminal C become the converse to the output values of the read only memory ROM. FIG. 8 shows a waveform diagram corresponding to this.

The axis of abscissas represents the time t, while the axis of ordinates represents the normalized value of an amplitude. A waveform AX corresponds to a case where the modulation depth information MX is MX=T/2, and a waveform BX' a case where MX<T/2. As stated before, in the first half of one cycle, subject to NX≦MX, the calculated phase angle address value LX1 becomes as follows, with respect to the NX value of NX1 at this time:

$$NX1=NX1/MX\cdot T/2 \quad (4)$$

Further, subject to NX>MX, the calculated phase angle address value LX1' at this time becomes irrespective of the NX value of NX1' at this time as stated before and is expressed by:

$$LX1'=T/2 \quad (5)$$

As explained before, T/2 is not especially multiplied in the embodiment of the present invention in FIG. 3, but the divider DIV executes the binary operation and the cycle T has the value of the power of 2, so T/2 is equivalently multiplied owing to the connection of the respective bits. In the latter ½ cycle, the NX and LX values of NX2 and NX3 at this time become the same as in Equations (4) and (5) respectively. Thus, substantially the same operation as in the first ½ cycle is conducted. Since, however, the outputs of the read only memory ROM are inverted by the group of exclusive logic OR gates EOR4, a waveform having an inverted amplitude results. In this way, a rectangular wave as shown at BX' is produced, and the tone color, i.e., spectrum of the waveform of the rectangular wave changes depending upon MX.

Figure 9A:
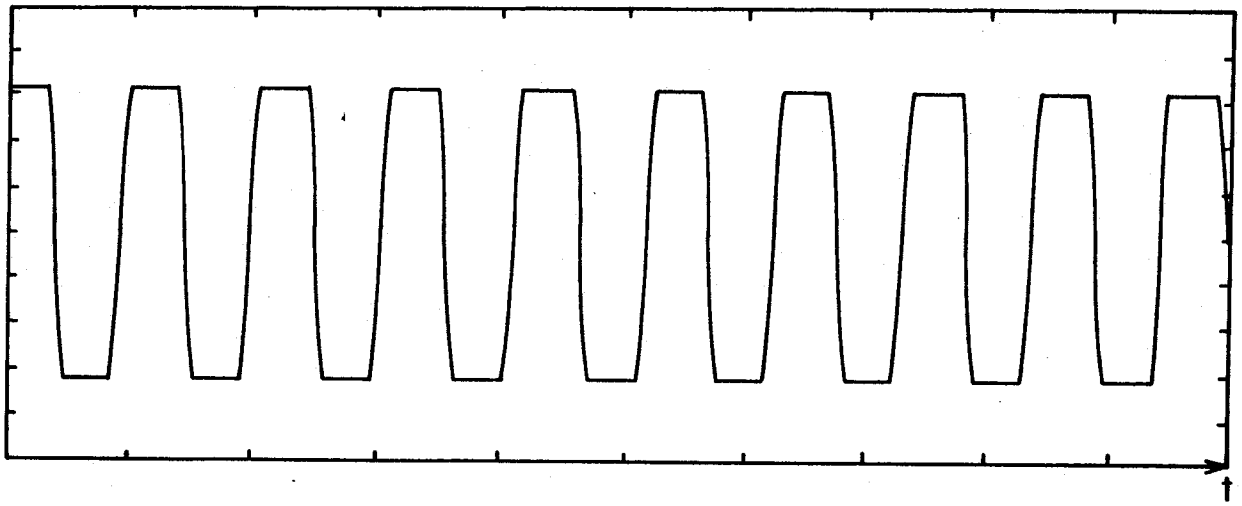
Figure 9B:
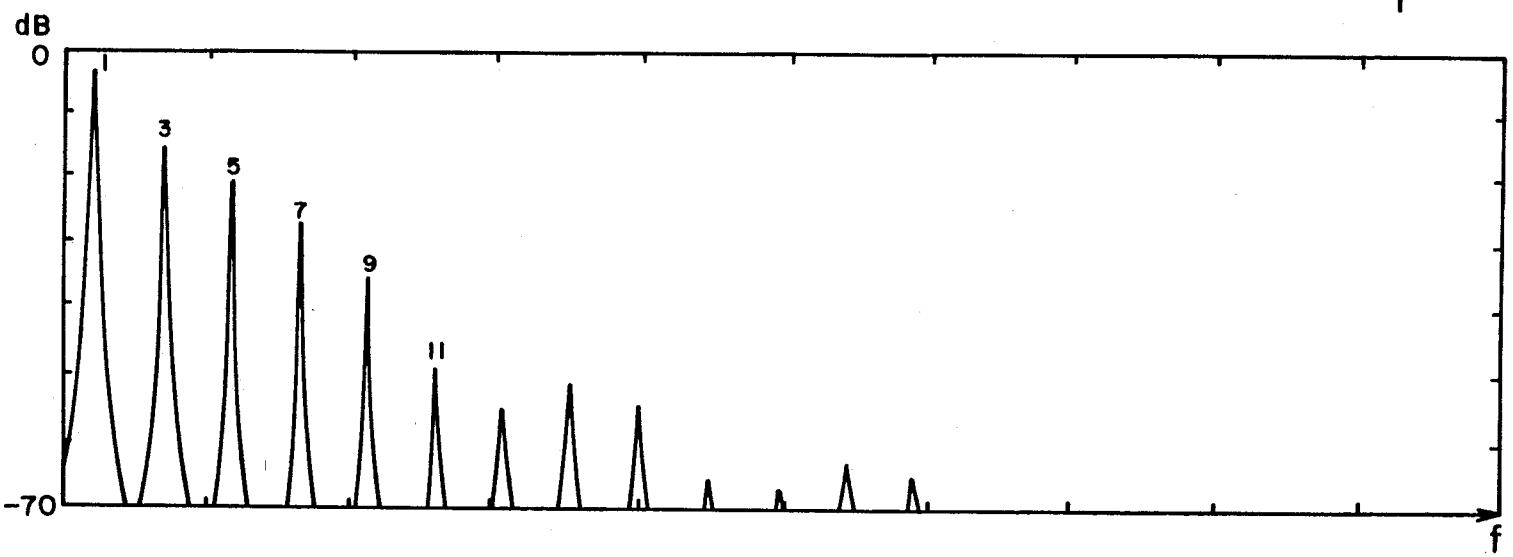

FIGS. 9(A) and 9(B) show the output waveform and the spectrum at the time at which the modulation depth of the foregoing operation in the embodiment of the present invention is 25%, respectively. As in FIGS. 6(A) and 6(B) and FIGS. 7(A) and 7(B), the axis of abscissas represents the time t and the axis of ordinates the amplitude in FIG. 9(A), and the axis of abscissas represents the frequency f and the axis of ordinates the amplitude at the corresponding frequency in FIG. 9(B). In a case where the modulation depth is 100%, that is, MX=T/2 holds, a cosine wave is provided to afford the waveform and the spectrum shown in FIGS. 6(A) and 6(B) respectively. However, when the modulation depth is less than 100% as shown in FIGS. 9(A) and 9(B), higher harmonics of orders 3, 5, 7 . . . or odd-numbered orders are produced. These higher harmonics of the odd-numbered orders change depending upon MX. In this operation, higher harmonics of even-numbered orders are not produced.

Besides, when a high level signal is applied to the control terminal SIP and low level signals are applied to the control terminals SAT and SQU, an impulse-like waveform is generated.

When the low level signal is applied to the control terminal SAT, the gate G4 turns "off", and the high level is applied to the control terminal of the gate G3 through the inverter I2, so that the gate G3 turns "on". In addition, since the low level signal is applied to the AND gate AND2, the output of this gate becomes the low level, and the groups of exclusive logic OR gates EOR2 and EOR3 operate as buffers. At this time, the comparator COMP operates, but it has no influence on the operation of the whole circuit because the corresponding output enters the AND gate AND2. Thus, a signal received from the terminals M enters the divider DIV with the respective bits M0–M11 corresponding to the bits B0–B11. When the control terminal SQU is supplied with the low level signal, the output of the AND gate AND3 becomes the low level, which enters the group of exclusive logic OR gates EOR4, so that these gates EOR4 operate as a buffer. In addition, the group of gates G5 turn "off" because the control input terminals of these gates G5 are supplied with the low level signal. Further, since the inverter I3 is supplied with the low level signal, its output becomes the high level, which is applied to the control input terminals of the group of gates G6, so that these gates G6 turn "on". Thus, the outputs D1–D11 of the divider DIV enter the address inputs A0–A10 of the read only memory ROM, respectively. In addition, the least significant bit D0 of the divider DIV falls into the open status. Further, since the group of exclusive logic OR gates EOR4 are supplied with the low level and operate as the buffer, the outputs O0–O10 of the read only memory ROM are delivered from the terminal C.

The inverter I1 receives the input from the control terminal SAT or the low level signal and delivers its output to the gates of the group of gates G1, so that the group of gates G1 turn "on". Since at this time, the group of gates G2 are "off", the bits N0–N11 of a signal received from the input terminal N, except the most significant bit N11, enter the inputs A1–A11 of the divider DIV through the group of exclusive logic OR gates EOR1, respectively. The input A0 is supplied with the low level through the corresponding one of the exclusive logic OR gates EOR1. One input of the AND gate AND1 is supplied with the high level signal from the control terminal SIP, and the other input thereof with the most significant bit N11 of the signal of the input terminal N. Therefore, the group of exclusive logic OR gates EOR1 operate as a buffer when the most significant bit N11 of the input terminal N is at the low level, and they operate as an inverter when the bit N11 is at the high level.

In a case where the signal NX inputted from the input terminals N is smaller than ½ of one cycle T, the read only memory ROM is sequentially accessed at NX≦MX. Thus, a cosine wave of half wavelength is outputted from the terminal C during this period, namely, during 0<NX≦MX. At NX>MX, all the outputs of the divider DIV become the high level. This is because, as stated before, the outputs of the divider DIV provide values below the decimal point, and the circuit is so arranged that all the outputs become the high level in the case of at least one. That is, since all the outputs are the high level at NX>MX, the outputs of the read only memory ROM become the final values of ½ wavelength stored in the read only memory ROM. Further, in a case where NX>T/2 holds, the most significant bit N11 becomes the high level. As a result, the output of the AND gate AND1 becomes the high level, which enters the group of exclusive logic OR gates EOR1, so that these gates operate as an inverter. When the inverted value NX' of the input value of the input terminals N except the most significant bit N11 is NX'≧MX, the calculated result of the divider DIV is one or more, and hence, all the outputs of the divider DIV become the high level. Thus, the outputs of the read only memory ROM during this period become the final values of the half wavelength of the cosine wave, and they are delivered from the terminal C. Besides, when NX'<MX holds, NX' decreases as NX increases gradually. Therefore, the read only memory ROM is accessed in the sequence reverse to that for NX≦MX in the foregoing case of NX<T/2.

In consequence, for MX<NX<T−MX, the outputs become constant, and in the other ranges of NX<MX and T−MX<NX, the waveform stored in the read only memory ROM is outputted.

Figure 10:
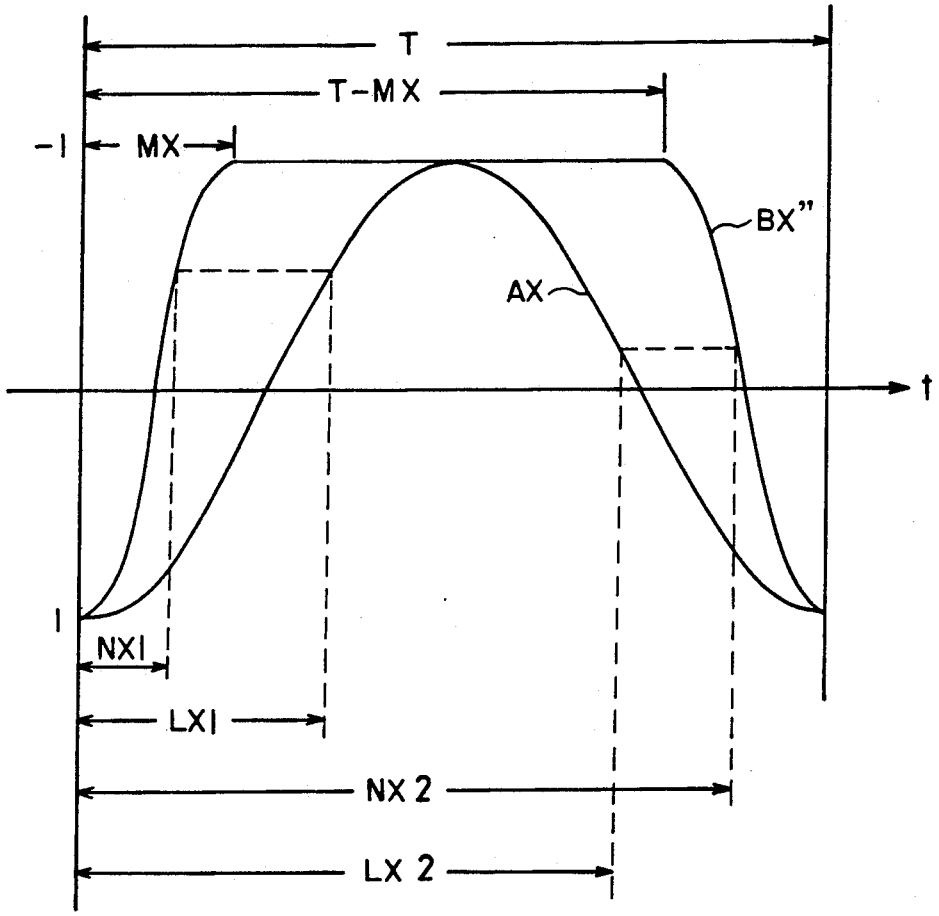

FIG. 10 shows a waveform corresponding to the above. The axis of abscissas represents the time t, and the axis of ordinates the normalized value of an amplitude. A waveform AX corresponds to a case where the modulation depth information MX is MX=T/2, and a waveform BX" a case where it is MX<T/2. At the NX values of NX1 and NX2 which satisfy NX<MX and T−MX<NX respectively, the addresses LX1 and LX2 of the read only memory ROM at the corresponding times become:

$$LX1=NX1/MX\cdot T/2 \quad (6)$$

$$LX2=\overline{\overline{NX2'}/MX\cdot T/2} \quad (7)$$

Here, NX2' denotes a value at the time at which the most significant bit N11 of NX2 is assumed zero. In addition, the address is fixed at MX<NX<T−MX. The values at this time are the final values of the cosine wave of ½ wavelength stored in the read only memory ROM.

Figure 11A:
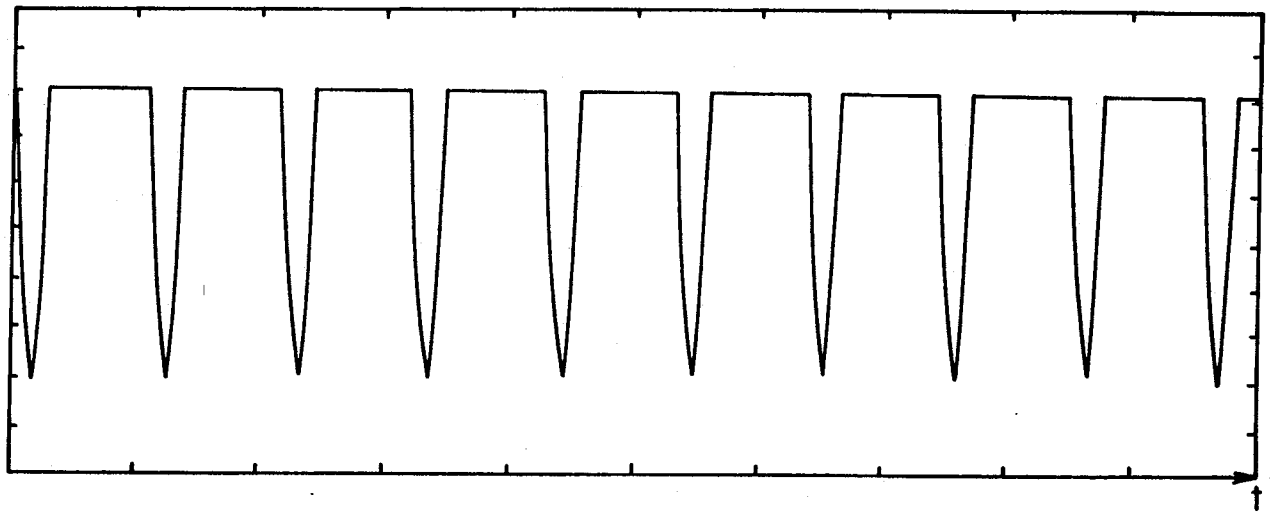
Figure 11B:
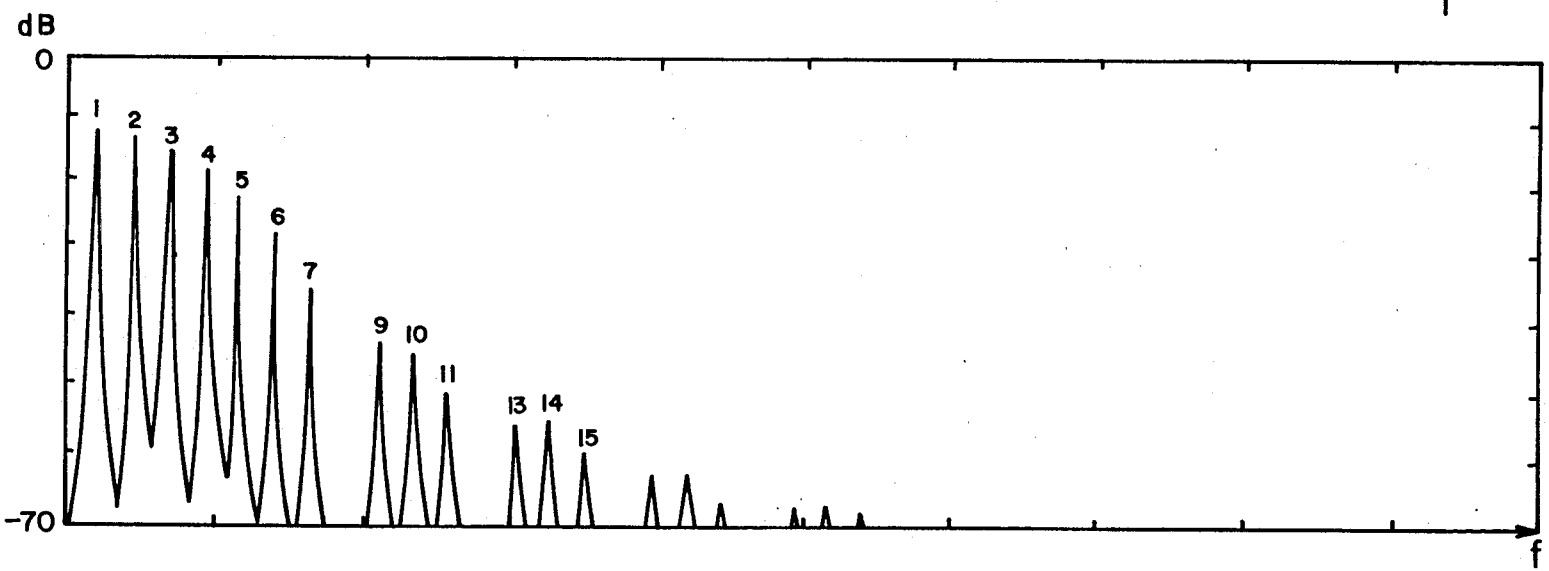

FIGS. 11(A) and 11(B) show the output waveform and its spectrum at the time at which the modulation depth is 25% in the foregoing operation in the embodiment of the present invention, respectively. The axis of abscissas in FIG. 11(A) represents the time t, while the axis of ordinates represents the amplitude. The axis of abscissas in FIG. 11(B) represents the frequency f, while the axis of ordinates represents the amplitude at the corresponding frequency. In a case where, under this condition, the modulation depth is 100%, i.e., MX=T/2 holds, the cosine wave is provided to afford the waveform and the spectrum shown in FIGS. 6(A) and 6(B) respectively. However, when the modulation depth is less than 100% as illustrated in FIGS. 11(A) and 11(B), higher harmonics are generated, and the spectrum differs from that in the foregoing case of setting the control terminal SAT or the control terminal SQU at the high level and does not include higher harmonics of such high orders as orders 8, 12, 16, . . . .

Figure 12:
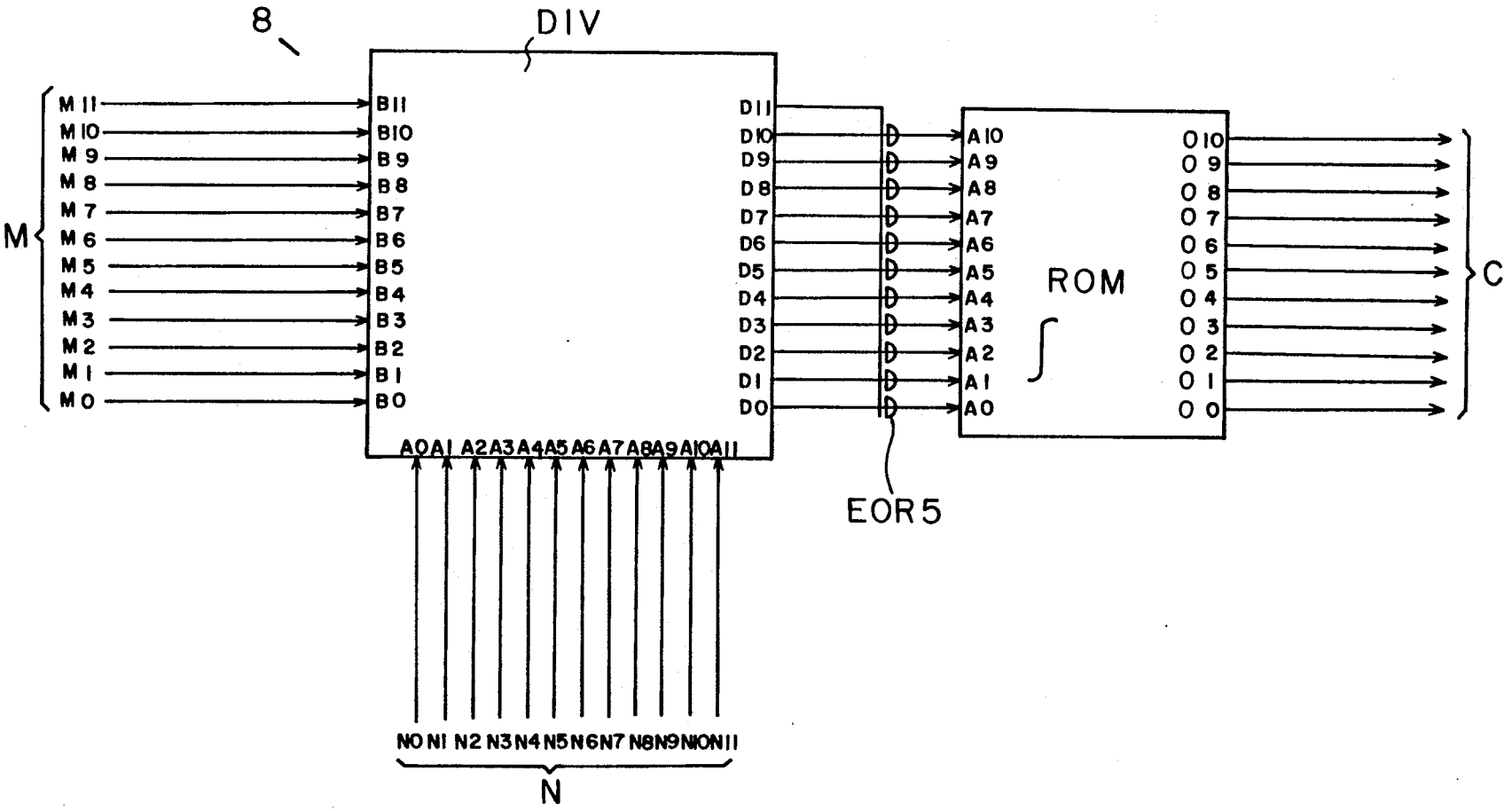

FIG. 12 is a detailed circuit diagram showing the second arrangement of the waveform synthesizer circuit of the embodiment of the present invention illustrated in FIG. 2. Input terminals N and M correspond to the inputs A and B of the waveform synthesizer circuit 8 in FIG. 1, respectively. The input group N is supplied with the output of the phase angle computing circuit 3 in FIG. 1, for example, 12-bit phase angle data N0–N11, while the input group M is supplied with the output of the adder circuit 6 in FIG. 1, for example, 12-bit modulation depth data M0–M11. The phase angle data N0–N11 applied to the input terminals N enter the input terminals A (A0–A11) of a divider DIV, respectively. The modulation depth data M0–M11 applied to the input terminals M enter the input terminals B (B0–B11) of the divider DIV, respectively. The calculated outputs D0–D10 of the divider DIV enter the corresponding input terminals on one side, of a group of exclusive logic OR gates EOR5, and enter the respective address input terminals A0–A10 of a read only memory ROM through the group of exclusive logic OR gates EOR5. In addition, the calculated output D11 of the divider DIV enters the input terminals on the other side, of the group of exclusive logic OR gates EOR5. The outputs O0–O10 of the read only memory ROM are delivered from the terminal group C of the waveform synthesizer circuit 8, to enter the envelope multiplier circuit 7 in FIG. 1.

The waveform synthesizer circuit in FIG. 12 operates as stated below. T denotes the length of one cycle of a waveform (in the present embodiment, T is $2^{12}$ as a binary number), and MX denotes the modulation depth information received from the input terminal M (MX≦T holds). In a range in which the phase angle address value NX applied to the input terminals N from the phase angle computing circuit 3 in FIG. 1 statisfies NX≦MX, the readout addresses of the read only memory ROM are sequentially calculated and found so that the K cycle(s) (K=1, 2, . . . integer) of a cosine wave may become MX, and for a range in which the phase angle address value NX satisfies T≧NX>MX(T≧NX≧MX), the address data of the read only memory ROM is fixed so that the amplitude value may become "1".

Now, the detailed operations of the circuit in FIG. 12 will be described with reference to FIGS. 13 and 14.

Figure 13:
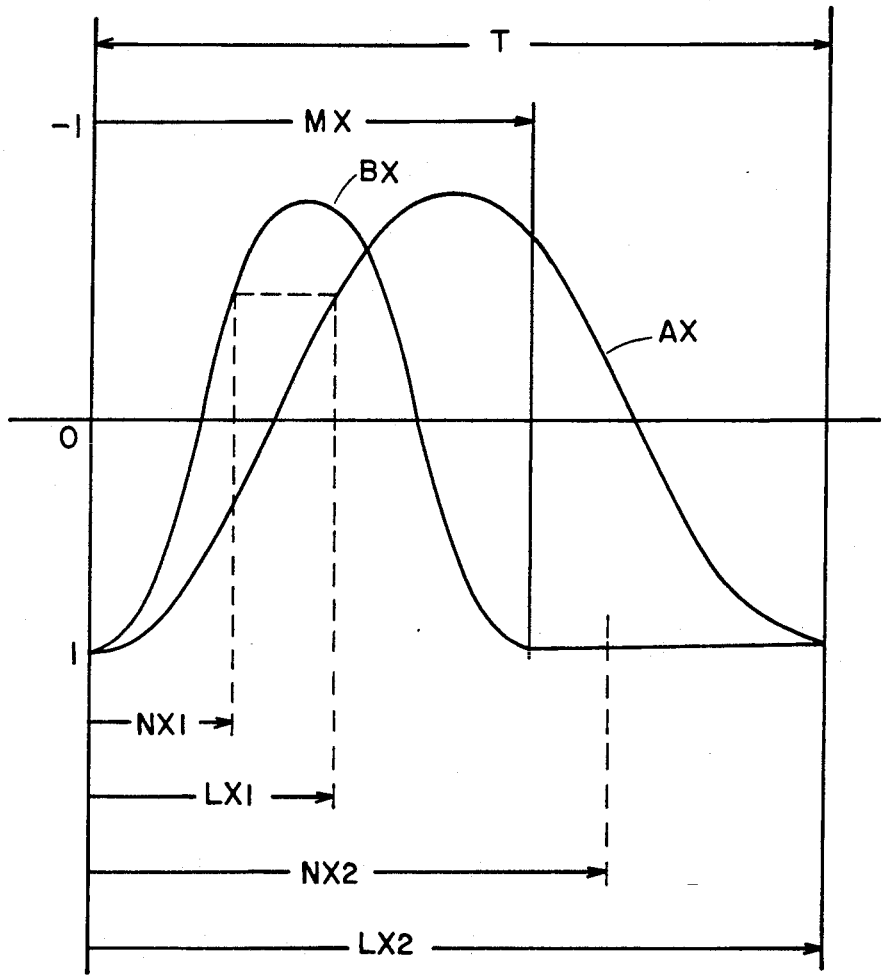

FIG. 13 shows waveforms in the case where one cycle of a cosine wave corresponds to the modulation depth information MX. The waveform AX corresponds to a case of MX=T, while the waveform BX a case of MX<T. The axis of abscissas represents the time t, and the axis of ordinates the normalized value of an amplitude. On the other hand, FIG. 14 shows waveforms in the case where two cycles of a cosine wave correspond to the modulation depth information MX. The waveform AX corresponds to a case of MX=T, while the waveform BX a case of MX<T. (The significances of the axes of abscissas and ordinates are the same as in FIG. 13.)

On the basis of the phase angle address value NX from the phase angle computing circuit 3 in FIG. 1, the following operation is executed for obtaining a new calculated phase angle address value LX in accordance with the modulation depth information MX. Letting T denote the length of one cycle of the original waveform, one cycle of the waveform may be equalized to the length of MX as illustrated in FIG. 13. LX1 (LX2) is evaluated for NX1 (NX2), and becomes the address value of an actual waveform table. The input phase angle data NX1 and the phase angle address LX1 have the following relationship:

$$MX:T=NX1=LX1$$

Therefore, the new phase angle address LX1 is obtained from:

$$LX1=(NX1/MX)\cdot T$$

Figure 14:
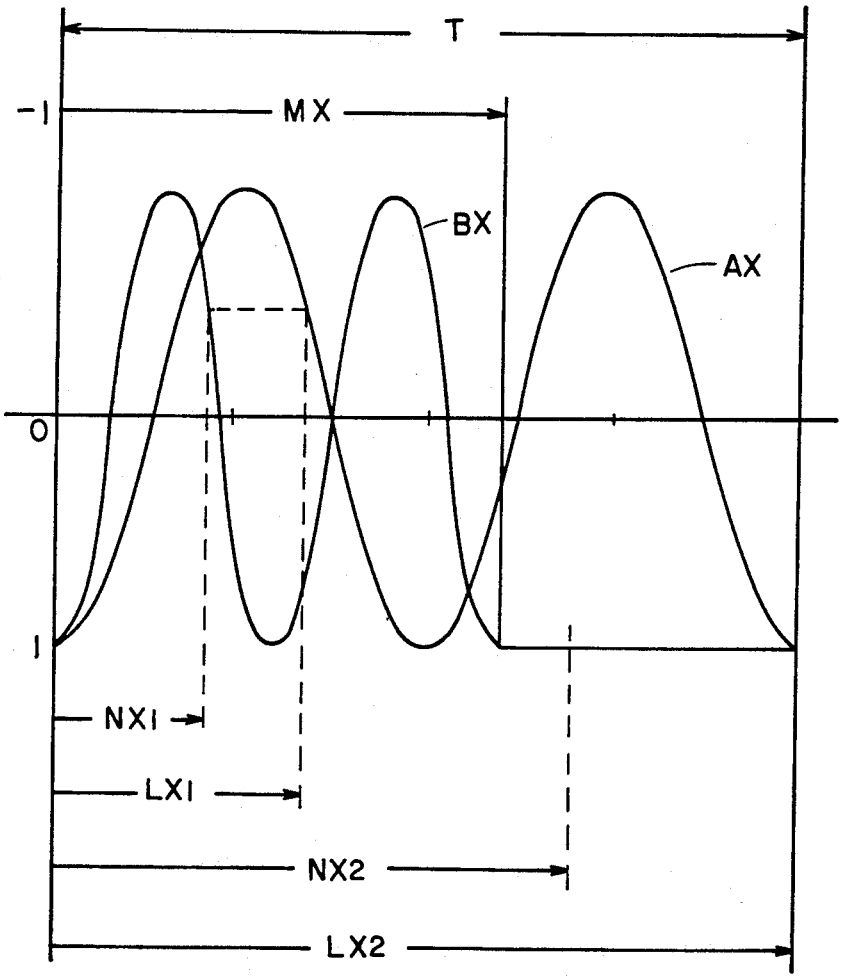

In the case of FIG. 14, two cycles of the waveform may be equalized to the length of MX. The following relationship holds:

$$MX:T=NX1:LX1$$

Accordingly, the new phase angle address value LX1 is obtained from:

$$LX1=(NX1/MX)\cdot T$$

Here, letting NX' denote the original address signal, namely, the phase angle address value afforded from the phase angle computing circuit 3, the phase angle address value NX expressed herein becomes:

$$NX=2NX'$$

In general, when the K cycle(s) (K=1, 2, . . . integer of a waveform is/are equalized to the length of MX, the relationship of:

$$NX=K\cdot NX'$$

holds, and the new phase angle address value LX is obtained for the input phase angle data N, from the following:

$$LX=(NX'/MX)\cdot KT$$

FIG. 12 shows the above calculating formula in the form of a circuit. Here, the read only memory ROM stores amplitudes of half-cycles, e.g., 2048 steps (11 bits), for example, cosine waveforms of 11 bits. The reason why each waveform is stored for the half cycle here, is that one cycle of the cosine waveform is obtained by folding back the waveform of the half cycle, so when the readout address value has exceeded an address corresponding to the half cycle, addresses may be accessed in the order reverse to the order in which addresses have been readout till then. Thus, the storage capacity of the read only memory ROM can be saved. In this case, stored waveforms of one cycle or ¼ cycle can be similarly employed by contriving the arrangement of an arithmetic unit, but such embodiments shall be omitted.

Now, the case of FIG. 13 or the case of synthesizing the waveform in which one cycle of the cosine wave corresponds to the modulation depth information MX, is broadly divided into two cases. First, let's consider the case where the phase angle address value NX entering the input terminal A of the divider DIV is related as $0<NX\leqq MX$ to the modulation depth information MX entering the input terminal B of the divider DIV. Subject to a subdivided condition of $NX\leqq\frac{1}{2}MX$ in this case, the new phase angle address value LX is delivered from the output terminals D0–D10 of the divider DIV in accordance with the foregoing operation, $LX=(NX/MX)\cdot T$. Herein, the divider DIV executes only the operation of NX/MX and does not multiply T. The reason is as follows. The output terminals D0–D11 provide values (binary numbers) below a decimal point as the result of NX/MX, and indicate the values of the twelfth-first decimal places respectively. Among these outputs, the bits D0–D10 are directly connected to the terminals A0–A10 of the zeroth-tenth places of the address inputs of the read only memory ROM through the group of exclusive logic OR gates EOR5. Thus, the value is shifted by 12 bits in terms of the binary number, and T or $2^{12}$ as the binary number is equivalently multiplied. Under the current condition of $0<NX\leqq\frac{1}{2}MX$, the output terminal D11 is at a low level. Therefore, the other inputs of the group of exclusive logic OR gates EOR5 become the low level, and the group of exclusive logic OR gates EOR5 function as a mere buffer. In this way, the read only memory ROM is sequentially accessed with the new calculated phase angle address values LX, and the amplitude values of the half waveform of the cosine wave stored in the read only memory ROM ar produced from the output terminals O0–O10 of the read only memory ROM.

Next, under a condition of $NX>\frac{1}{2}MX$ in the same case of $NX\leqq MX$, the output terminal D11 of the divider DIV becomes a high level due to a carry, and the other inputs of the exclusive logic OR gates EOR5 become the high level. Thus, the group of exclusive logic OR gates EOR5 function as an inverter, and the address input terminals A0–A10 of the read only memory ROM are supplied with a value $\overline{LX}=T-LX$ resulting from the inversion of the value LX. As the NX value increases successively in the range of $\frac{1}{2}MX<NX\leqq MX$, the LX value decreases. Therefore, the addresses of the read only memory ROM are accessed in the order reverse to that in the case of $0<NX\leqq\frac{1}{2}MX$, and the amplitude values of the folded half waveform are produced from the output terminals O0–O10 of the read only memory ROM. In the above way, the amplitude values of the cosine wave for one cycle are first outputted from the read only memory ROM by the use of the phase angle address values LX (and $\overline{LX}$) calculated anew in the range of $0<NX\leqq MX$.

Secondly, in a case where $NX<MX\leqq T$ holds, that is, where the output NX/MX of the divider DIV is at least one, the circuit is arranged so that all the output terminals D0–D11 of the divider DIV may become the high level. Since the output terminal D11 becomes the high level, the other inputs of the group of exclusive logic OR gates EOR5 become the high level, and these gates function as an inverter. Thus, all the address input terminals A0–A10 of the read only memory ROM are supplied with "0", and the amplitude value of a waveform corresponding thereto is provided from the output terminals O0–O10 of the read only memory ROM. In the above way, the new waveform of one cycle shown in FIG. 13 is synthesized.

Further, in the case of FIG. 14 where two cycles of a cosine wave are produced in correspondence with the modulation depth information, the relationship of $LX=(MX'/MX)\cdot 2T$ holds among the original phase angle address value NX', modulation depth information MX, new phase angle address value LX and one cycle T of a waveform in the read only memory ROM, as stated before. Regarding the connection between the outputs of the divider DIV and the address inputs of the read only memory ROM in FIG. 12, therefore, the outputs of the divider DIV are shifted toward the upper bits by one bit as compared with those in the case of FIG. 12 and are then applied to the address inputs of the read only memory ROM, whereby 2T is multiplied. That is, the output terminals D0–D9 of the divider DIV may be connected to the address input terminals A1–A10 of the read only memory ROM through the group of exclusive logic OR gates EOR 5, respectively.

In this case, the terminal A0 is supplied with the low level through the corresponding exclusive logic OR gate EOR5, the terminal D10 is connected to the other inputs of the group of exclusive logic OR gates EOR5, and the terminal D11 is neglected. Owing to such connection, the rate at which the phase angle address values advance the addresses becomes double that in the case of FIG. 13, and the amplitude values of the half waveform of the cosine wave stored in the read only memory ROM are produced from the output terminals O0–O10 of the read only memory ROM during 0<NX- $<\frac{1}{4}MX$. The output terminal D10 of the divider DIV becomes the high level at $NX<\frac{1}{4}MX$. During $\frac{1}{4}MX<NX\leqq\frac{1}{2}MX$, therefore, the circuit operates similarly to the case of FIG. 13. The value $\overline{LX}=T-LX$ with LX inverted by the group of exclusive logic OR gates EOR5 is applied to the address input terminals of the read only memory ROM. As the NX value increases under the condition of $\frac{1}{4}MX<NX\leqq\frac{1}{2}MX$, $\overline{LX}$ decreases. The addresses of the read only memory ROM are accessed in the order reverse to that under the condition of $0<NX\leqq\frac{1}{4}MX$, and the amplitude values of the half waveform folded back are produced from the output terminals O0–O10 of the read only memory ROM. In this way, the amplitude values of the cosine waveform in the read only memory ROM corresponding to one cycle are outputted during $0<NX\leqq\frac{1}{2}MX$. When $NX=\frac{1}{2}MX$ has been reached, all the output terminals D0–D10 of the divider DIV are brought to the low level again by a carry. Therefore, the group of exclusive logic OR gates EOR5 return to the function of the mere buffer (because the terminal D10 becomes the low level), and all the addresses of the read only memory ROM are accessed from "0" again. During $\frac{1}{2}MX<NX\leqq MX$, an operation similar to that during $0<NX\leqq\frac{1}{2}MX$ is repeated so as to deliver the amplitude values of the cosine waveform in the read only memory ROM corresponding to one cycle. Owing to the operations thus far described, the amplitude values of the cosine waveform in the read only memory ROM corresponding to two cycles are outputted during $0<NX\leqq MX$.

During $MX<NX\leqq T$, likewise to the case of FIG. 13, the output terminals D0–D11 of the divider DIV become the high level, and the outputs of the terminals D0–D9 are inverted by the group of exclusive logic OR gates EOR5, whereby all the address input terminals A0–A10 of the read only memory ROM become "0", and the amplitude value "1" of the waveform corresponding thereto is outputted. The new waveform of one cycle shown in FIG. 14 is synthesized by the foregoing operations. While, in the above, the waveform shown in FIG. 14 has been obtained by altering the connective relation between the divider DIV and the read only memory ROM, waveforms corresponding to, e.g., one cycle may well be stored in the read only memory ROM.

The waveform generated by the second detailed circuit arrangement of FIG. 12 agrees with the waveform in the case of setting the control terminals SAT and SQU at the low level and the control terminal SIP at the high level in FIG. 3, though they differ in phase. That is, the changes of the spectra with respect to the modulation depth data M are similar. In contrast, the waveform in FIG. 14 (in a circuit diagram, the outputs D0–D9 of the divider DIV are respectively connected to the address input terminals A1–A10 through the group of exclusive logic OR gates EOR5) becomes quite different from the waveforms in the foregoing cases.

FIG. 15 is a circuit diagram of a read only memory portion in the case where the stored waveforms of the read only memory ROM in FIGS. 3 and 12 are changed. Cosine waves of $\frac{1}{4}$ cycle are stored in the first half of addresses of the illustrated read only memory ROM', while the polarity-inverted data items of the cosine waves of the subsequent $\frac{1}{4}$ cycle are stored in the latter half. An address line connected to the most significant address bit A10 of the read only memory ROM' is connected to the first inputs of a group of exclusive logic OR gates EOR6 in common. Further, it is connected to the most significant address bit A10 and carry input Cin of an adder circuit ADD. The outputs O0–O9 of the read only memory ROM' are respectively connected to the address bits A0–A9 of the adder circuit ADD. As stated before, the whole circuit depicted in FIG. 15 corresponds to the read only memory ROM in FIG. 3. When the address signal A10 is the low level, the group of exclusive logic OR gates EOR6 operate as a buffer. Since the low level is applied to the most significant bit A10 and carry input Cin of the adder circuit ADD, the adder circuit ADD provides the low level from the most significant bit S10 thereof and the first-half data of the read only memory ROM' from the other outputs S9–S0 thereof. On the other hand, when the address signal A10 is the high level, the group of exclusive logic OR gates EOR6 operate as an inverter to invert the outputs of the read only memory ROM'. Further, since the high level is applied to the carry input Cin and the most significant bit A10 of the adder circuit ADD, the amplitude value at that time is equivalently shifted by $\frac{1}{2}$ of the amplitude of the cosine wave. Thus, the circuit of FIG. 15 equivalently stores the same values as those of $\frac{1}{2}$ cycle of the cosine wave stored in the read only memory ROM in FIG. 3. The read only memory ROM' in FIG. 15 does not require the most significant bit of the memory output, and is therefore effective to reduce its capacity.

Although, in each of the foregoing embodiments of the present invention, the divider circuit has been employed, it can be replaced with a multiplier circuit. Further, specific waveforms are synthesized using a plurality of waveform generator circuits embodying the present invention, whereby various waveforms can be produced. Regarding such synthesis, various waveforms can also be produced by changing the phases of the fundamental waves. Besides, by changing the modulation depth signal or waveform varying signal with time, a signal with which a waveform changes with time correspondingly can be produced. Accordingly, a waveform whose higher harmonic component changes with time can be produced very easily.

Further, although the embodiments of the present invention are constructed so as to generate the fundamental wave shapes of three sorts, namely, of a sawtooth wave, a rectangular wave and an impulse-like wave, it is also allowed to generate only one wave. Further, although the waveform stored in the read only memory ROM in each of the embodiments of the present invention is the cosine wave, it may well be a sine wave, a triangular wave, or the like.

The circuits in the foregoing embodiments of the present invention give rise to the effect of distorting only the time axis of the waveform. FIG. 16 shows another arrangement of the waveform synthesizer circuit 8 in the embodiment of the present invention illustrated in FIG. 1. This arrangement changes, not only the time axis of a waveform, but also the amplitude value thereof with time during one cycle.

As shown in FIG. 16, the waveform synthesizer circuit 8 is composed of multiplier circuits 90 and 12, a waveform memory 10, and an envelope generator 11. The phase angle received from the input terminal A enters the multiplier circuit 90. Besides, the tone color control signal or higher harmonics control signal is received from the input terminal B. They are multiplied in the multiplier circuit 90, and the resulting output of this multiplier circuit accesses the address of the waveform memory 10. The waveform memory 10 provides the output of a waveform value assigned by the output of the multiplier circuit 90. The provided output enters the multiplier circuit 12. Meanwhile, the phase angle received from the input terminal A is also applied to the envelope generator 11. This envelope generator 11 produces an envelope signal corresponding to the inputted phase angle. The envelope signal produced from the envelope generator 11 is a signal for changing an amplitude value in the waveform memory within one cycle, and it enters the multiplier circuit 12. The output of the waveform memory 10 enters the multiplier circuit 12, and is multiplied with the aforementioned envelope signal therein. The resulting product is delivered to the output terminal C.

The envelope multiplier circuit 7 in FIG. 1 is a circuit for changing the envelope over the range of at least one cycle of the waveform, whereas the multiplier circuit 12 in FIG. 16 is a circuit for changing the amplitude value within one cycle.

That is, the present embodiment consists in that, as illustrated in FIG. 16, the phase angle is modified by the multiplier circuit 90, while at the same time the waveform value produced from the waveform memory 10 is changed within one cycle by the multiplier circuit 12.

FIG. 17 is a first circuit diagram which illustrates the arrangement of the waveform synthesizer circuit of the embodiment of the present invention shown in FIG. 16, in more detail. An input terminal N or inputs N0–N11 is/are connected to the inputs A0–A11 of a multiplier circuit MPY1. In addition, an input terminal M is connected to the inputs B0–B11 of the multiplier MPY1. The outputs Q0–Q7 of the multiplier circuit MPY1 are respectively connected to the address inputs A0–A7 of a waveform memory, namely, read only memory ROM. The outputs O0–O7 of the read only memory ROM enter the inputs B0–B7 of a multiplier circuit MPY2. Also, the terminals N4–N11 are respectively connected to the inputs A0–A7 of the multiplier circuit MPY2 through inverters I4–I11. The outputs Q0–Q7 of the multiplier circuit MPY2 are provided from the output terminal C. The input terminal group N corresponds to the input terminal A in FIG. 16, and the input terminal M to the input terminal group B. That is, the input terminal N is supplied with the output of the phase angle computing circuit 3 in FIG. 1, for example, 12-bit phase angle data N0–N11, while the input terminal M is supplied with the output of the adder circuit 6 in FIG. 1, for example, 12-bit data M0–M11.

The value received from the input terminal N, namely, the phase angle address value NX is multiplied by the modulation depth information MX received from the input terminal M, by means of the multiplier circuit MPY1. The multiplier circuit MPY1 has the function of multiplying the bits, and executes the operation of (input data of A0–A11)×(input data of B0–B11)$\div 2^{12}$. That is, $NX \times MX \div 2^{12}$ is executed, and the less significant 8 bits Q0–Q2 of the operated result enter the respective address inputs A0–A7 of the waveform memory ROM. The waveform memory ROM stores one cycle of a cosine waveform, the amplitude value of which consists of 8 bits. The address value NX is variously changed depending upon the modulation depth information MX received from the input terminal M, in the multiplier circuit MPY1, and then accesses the address of the waveform memory ROM. Therefore, the amplitude data O0–O7 to be delivered from the output terminals of the waveform memory ROM become a value whose time axis changes depending upon the modulation depth information MX. Further, the outputs enter the multiplier circuit MPY2 and are multiplied therein with the inverted values of the values of the bits N4–N11 of the data received from the input terminal N. The multiplier circuit MPY2 executes an 8-bit multiplication, which is (input data of A0–A7)×(input data of B0–B7)$\div 2^8$. Owing to the multiplier circuit MPY2, the amplitude value changes depending upon the phase angle address value NX this time. The outputs Q0–Q7 of the multiplier circuit MPY2 are delivered from the output terminal C. The envelope generator 11 in FIG. 16 corresponds to the inverters I4–I11 in FIG. 17.

FIGS. 18 to 21 are waveform diagrams which show the output waveforms of the respective circuits dependent upon the modulation depth information MX. In each of these diagrams, (a) illustrates the phase angle address value NX, (b) the output Q of the multiplier circuit MPY1, (c) the output of the waveform memory ROM, (d) the input data values of the inputs A0–A7 of the multiplier circuit MPY2, and (e) the output of the multiplier circuit MPY2, i.e., the waveform data value outputted from the output terminal C. In addition, the modulation depth information MX in FIGS. 18 to 21 are "FF" (255), "17F" (383), "3FF" (1023) and "FFF" (4095), respectively. Here, " " denotes the hexadecimal notation, and ( ) the decimal notation.

Figure 18:
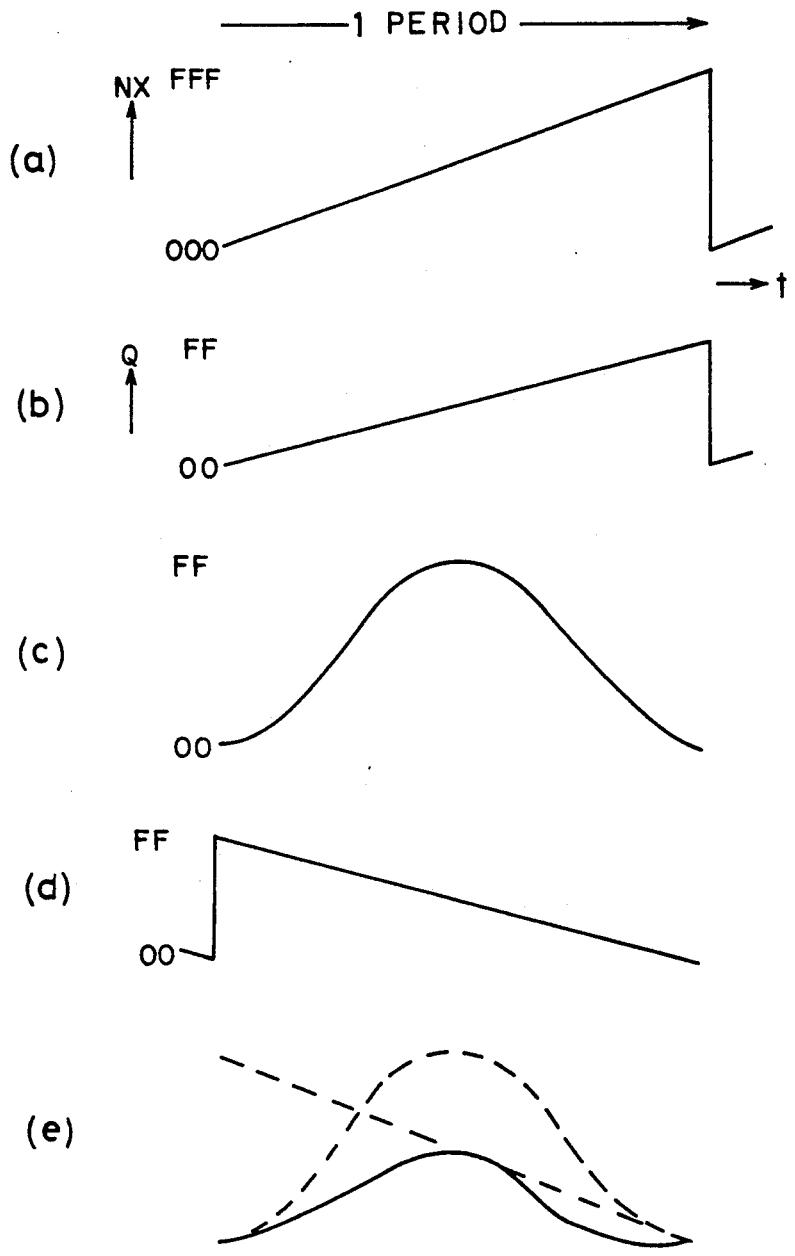

In FIG. 18, one cycle of the waveform (a) and that of the waveform (b) agree, and the phase change, in other words, the change of the time axis is not involved. As a result, the waveform outputted from the waveform memory ROM in which the cosine wave is stored becomes the cosine wave (c) of one cycle. The multiplier circuit MPY2 is supplied with the waveforms (c) and (d). The waveform (d) is a value obtained in such a way that the phase angle address value NX has the less significant bits (N0–N3) removed and is inverted by the inverters I4–I11. In this waveform (d), the time axis is reverse to the modulation depth information MX. Since the multiplier circuit MPY2 multiplies the waveforms (c) and (d), its output becomes as shown in (e). FIG. 18 corresponds to a case where merely the amplitude value has changed in correspondence with the phase, i.e., the time.

Figure 19:
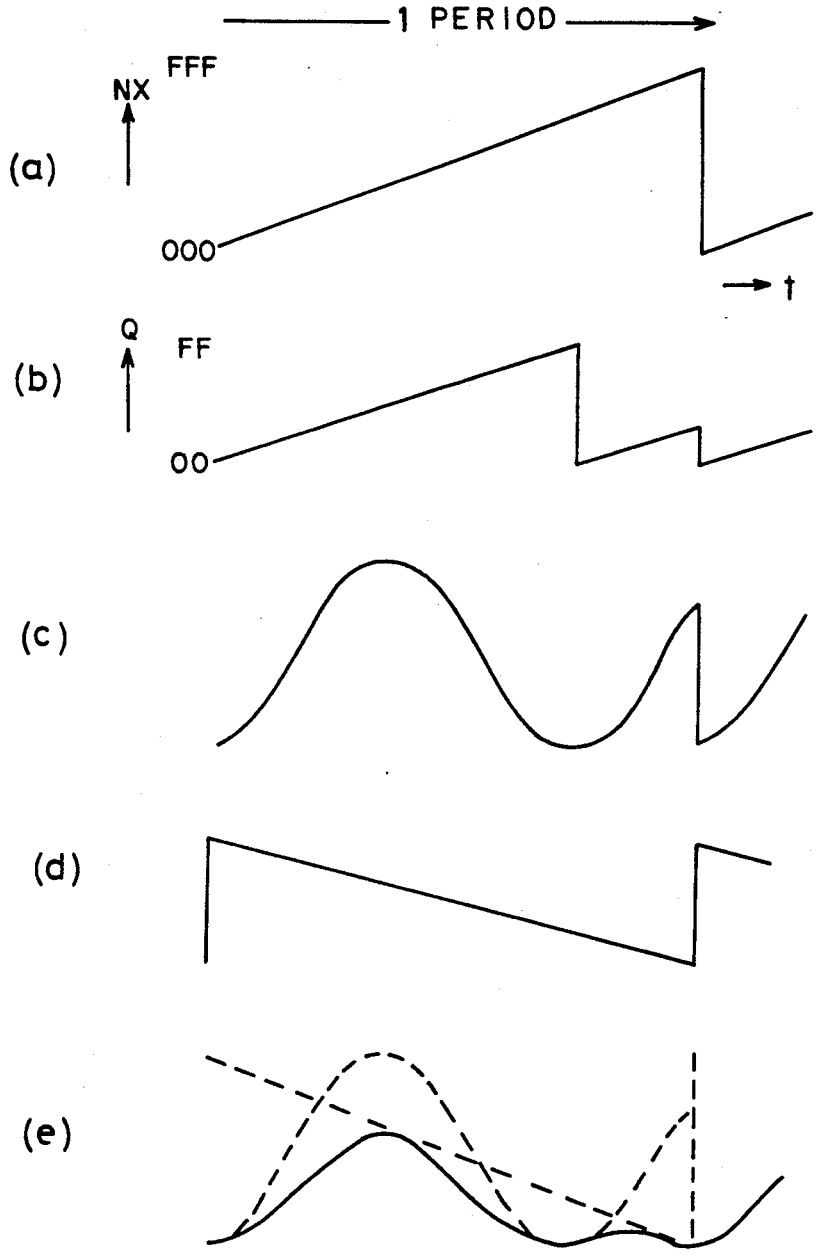
Figure 20:
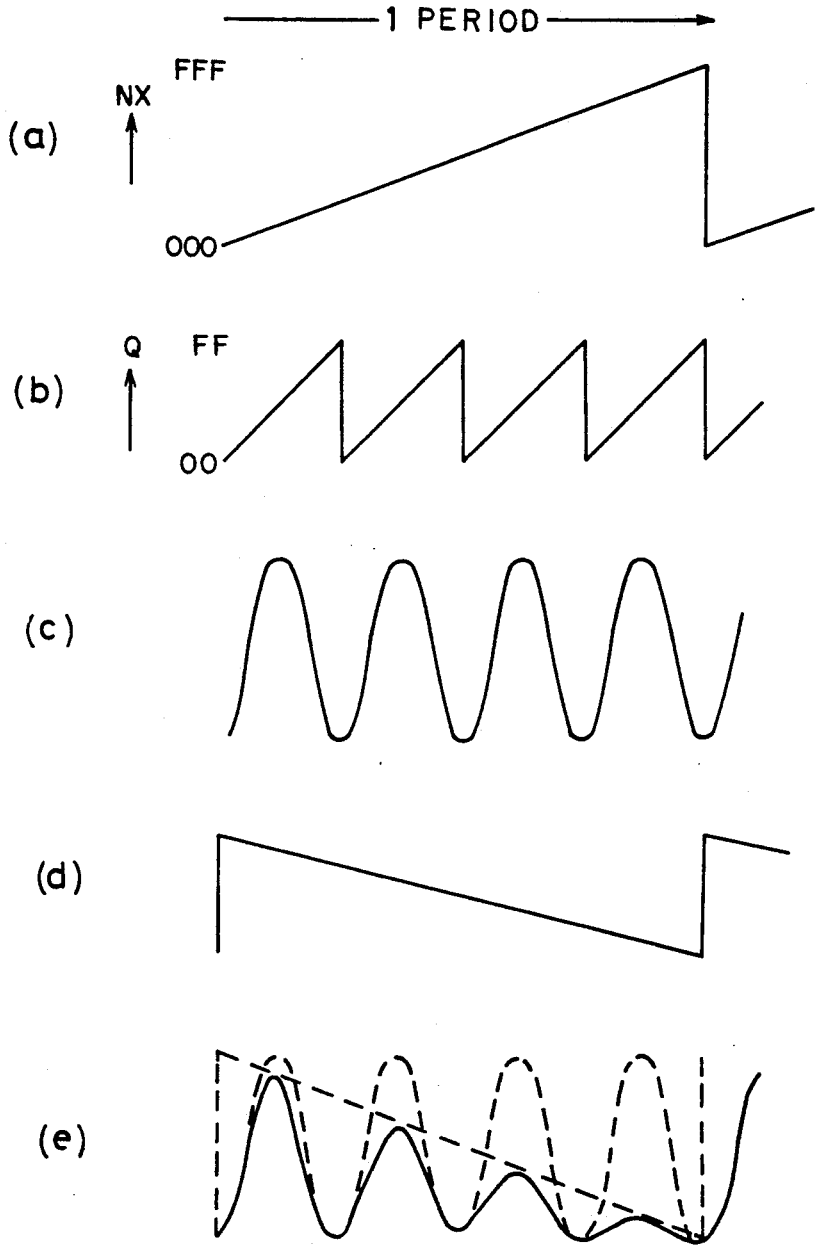
Figure 21:
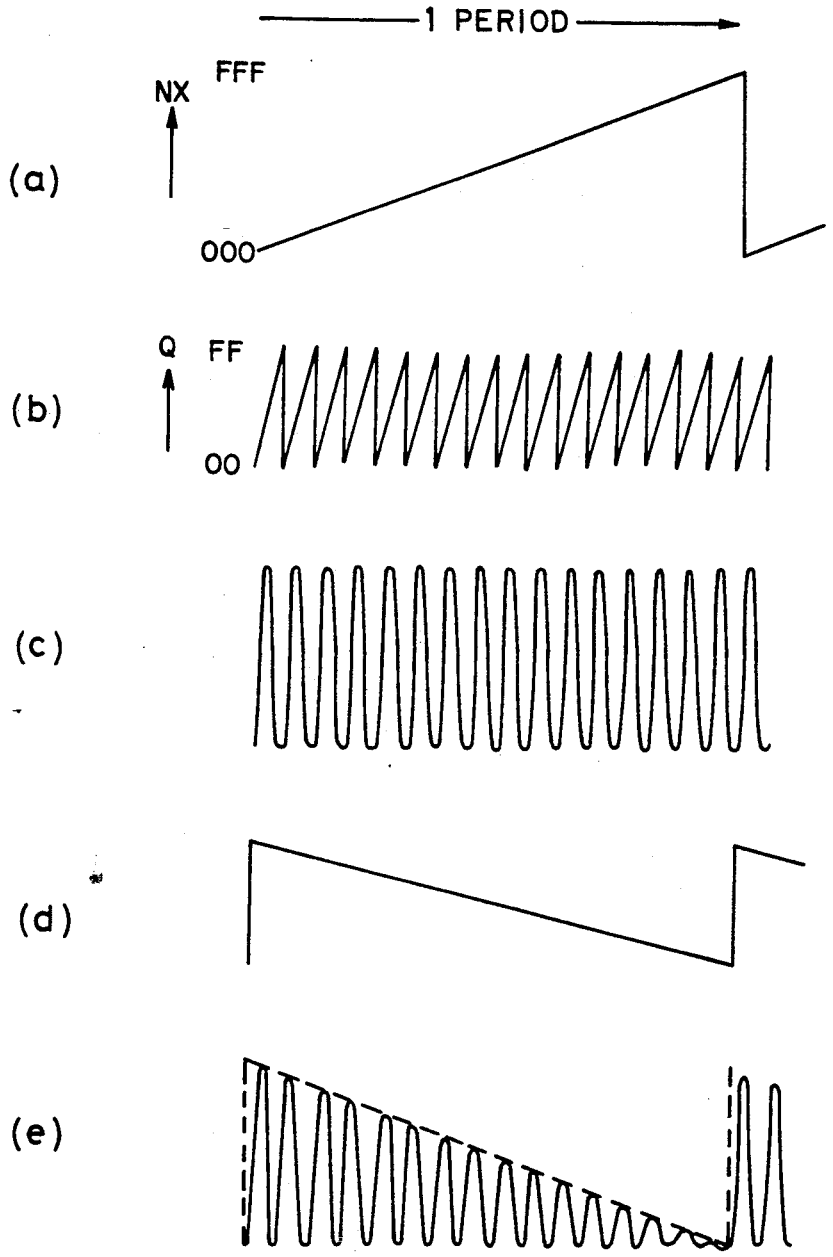

FIGS. 19 to 21 correspond to a case where the modulation depth information MX is greater than "FF". At this time, the address value for accessing the waveform memory ROM is repeated a plurality of times as shown in (b). An identical address is accessed within one cycle 1.5 times in FIG. 19, 4 times in FIG. 20, and 16 times in FIG. 21. Thus, the frequency of the waveform to be outputted from the waveform memory ROM becomes 1.5 times, 4 times and 16 times. Further, since the amplitude of such waveform is changed in correspondence with one cycle of the modulation depth information MX, the output becomes (e). The output of the waveform memory ROM in FIG. 19 starts from zero again at the specified value of the amplitude. Therefore, this waveform becomes discontinuous. Since, however, the amplitude value at that time becomes zero in the multiplier circuit MPY2, unnecessary higher harmonics are removed. In this way, in the frequency spectrum of each waveform provided from the multiplier circuit MPY2, the frequency which is 1.5 times, 4 times or 16 times higher than the fundamental frequency is emphasized.

FIG. 22 is a circuit diagram in the case where the envelope generator 11 in FIG. 16 is composed of exclusive logic OR gates. The same parts as in FIG. 17 shall not be repeatedly explained. The input bits N3–N10 of the input terminals N are respectively applied to the first inputs of the exclusive logic OR gates EOR7–EOR14. Further, the bit N11 is applied to the second inputs of the exclusive logic OR gates EOR7–EOR14. In the foregoing case of FIG. 17, the inputted phase angle address value NX is applied to the inputs A0–A7 of the multiplier circuit MPY2 correspondingly, that is, with a proportional relation, whereas in the case of FIG. 22, one cycle forms a triangular wave which is applied to the multiplier circuit MPY2.

Figure 23:
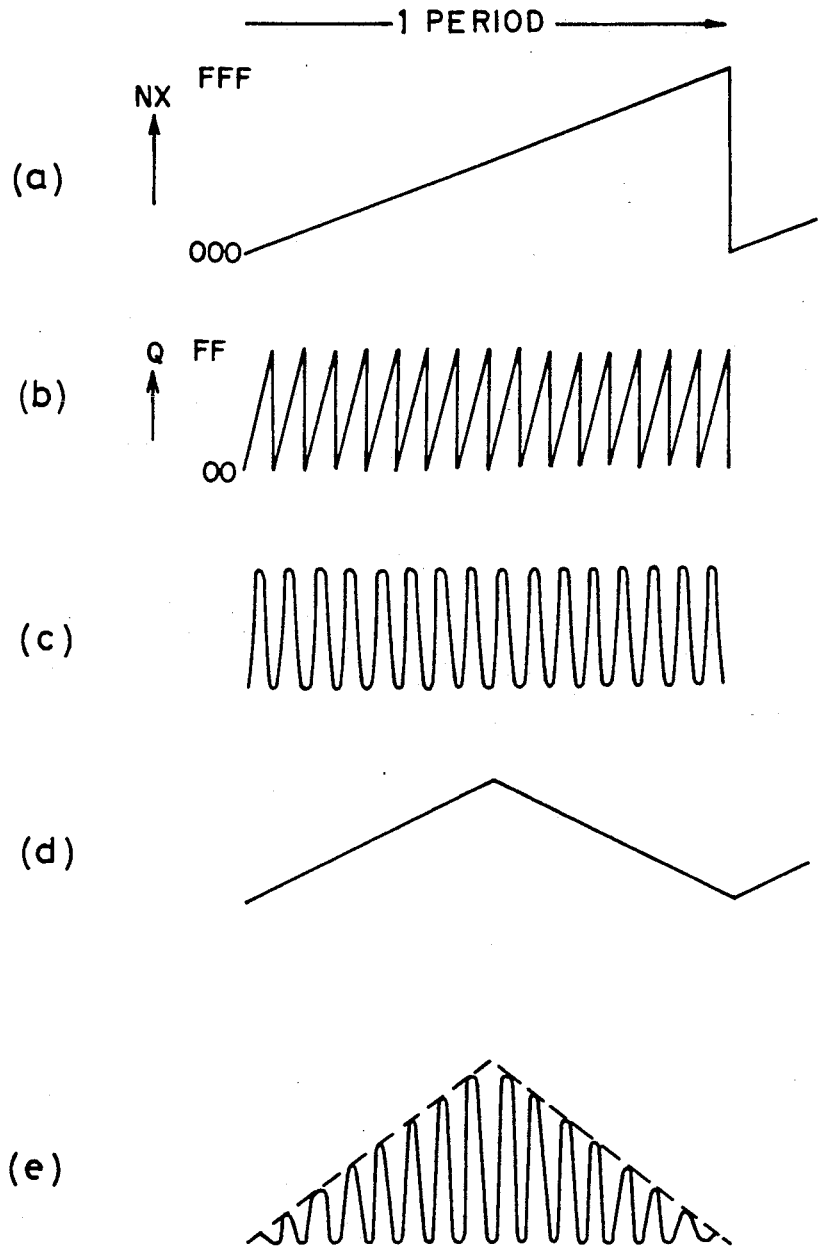

FIG. 23 is a waveform diagram which shows the waveforms of the respective circuits produced in the embodiment of FIG. 22. As in the cases of FIGS. 18 to 21, (a) illustrates the phase angle address value NX, (b) the output of the multiplier circuit MPY1, (c) the output of the waveform memory ROM, (d) the input data values of the bits A0–A7 of the multiplier circuit MPY2, and (e) the output of the multiplier circuit MPY2. The modulation depth information MX at this time is "FFF" (4095). As in FIG. 21, accordingly, the address value for accessing the waveform memory ROM is repeated a plurality of times, and an identical address is accessed 16 times within one cycle. That is, the waveform output of the waveform memory ROM is brought to a frequency 16 times higher. Further, the amplitude of such waveform is multiplied by the output data of the exclusive logic OR gates EOR7–EOR14, namely, the triangular waveform, so that the resulting output becomes (e). Accordingly, the frequency which is 16 times higher than the fundamental frequency is emphasized as in FIG. 21, but the rate of the higher harmonic components becomes different from that in the case of FIG. 21.

Figure 25:
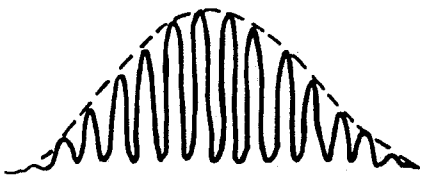

FIG. 24 is a circuit diagram in the case where the envelope generator 11 in FIG. 16 is formed of a waveform memory. The same parts as in FIG. 17 shall not be repeatedly explained. The input bits N4–N11 of the input terminal group N are applied to the address inputs of the envelope memory HROM which stores envelope data. The outputs of the memory HROM are applied to the inputs A0–A7 of the multiplier circuit MPY2. Assuming by way of example that the envelope waveform stored in the envelope memory HROM be a cosine wave, the amplitude value of the waveform changes cosinusodally in correspondence with one cycle. Further, if the modulation depth information MX is much greater than "FF" and is "FFF" by way of example, one cycle of the output waveform becomes as shown in FIG. 25. In this figure, the axis of abscissas represents the time t, and the axis of ordinates the amplitude. Since the waveform stored in the envelope memory HROM is the same as the cosine wave stored in the waveform memory, it is also possible to share the waveform memory ROM or the envelope memory HROM by time division so as to dispense with either memory.

Meanwhile, the waveform stored in the envelope memory HROM is not always the cosine wave. For example, in a case where the inverted values of the address inputs or the triangular wave are/is stored, the operating waveform becomes the same as in FIG. 17 or FIG. 22, and the output becomes the waveform (e) shown in FIGS. 18–21 or FIG. 23, respectively.

FIGS. 26(A1)-26(B1), . . . 26(F1), FIGS. 27(A1), 27(B1), . . . 27(F1) and FIGS. 28(A1), 28(B1), . . . 28(F1), and FIGS. 26(A2), 26(B2), . . . 26(F2), FIGS. 27(A2), 27(B2), . . . 27(F2) and FIGS. 28(A2), 28(B2), . . . 28(F2) are diagrams showing waveforms generated by the foregoing embodiments of FIG. 17, FIG. 22 and FIG. 24 and their spectra, respectively. The waveform and spectrum (A1) and (A2) correspond to a case where the modulation depth information MX is set at "FF", and those (B1) and (B2)–(F1) and (F2) correspond to cases where the phase angle address value NX is set at 1.5 times, 2 times, 4 times, 8 times and 16 times of "FF", respectively. As apparent from the corresponding spectra, a peak value is exhibited in the higher harmonic component of order 2 in the case of the address value of 2 times, and the peaks of higher harmonics are exhibited substantially at orders 4, 8 and 16 in the respective cases of the address values of 4, 8 and 16 times. Thus, these embodiments have made it possible to attain the so-called resonance effect.

In the embodiment of FIG. 16, the phase angle is changed by the use of the multiplier circuit MPY1. However, this is not restrictive, but a divider or a bit shaft circuit can also be employed by way of example. Further, the envelope generator 11 shown in FIG. 16 is not restricted to the inverters I4–I11, the exclusive logic OR gates EOR7–EOR14 or the envelope memory HROM, but it may well be a circuit of another arithmetic function or a bit shift circuit. Besides, by changing the modulation depth signal with time, a signal with which a waveform changes with time correspondingly can be produced. Accordingly, a waveform whose high harmonic component changes with time can be produced very easily, and a resonating higher harmonic component changes with time. Although the waveform stored in the foregoing waveform memory or read only memory is the cosine wave, it may well be a sine wave, a triangular wave or the like.

As described above, according to the present invention, it becomes possible to generate a waveform whose spectrum has a smoothly changing envelope, by means of simple digital circuitry, and also to produce the waveform of a rectangular wave, sawtooth wave or the like free from higher harmonics of higher orders. Furthermore, the manner in which the higher harmonics are contained, in other words, the shapes of the higher harmonic waves can be simply changed, and such shapes can be changed with time.

Moreover, according to the present invention, it becomes possible to generate a musical sound which has a peak at a specified higher harmonic wave of the spectrum of a musical sound waveform. Further, the peak position of the higher harmonic wave can be changed depending upon a modulation depth signal, and it becomes possible to generate a musical sound which brings forth an effect similar to the resonance effect of a voltage control filter VCF in an analog music synthesizer.

What is claimed is:

1. An electronic musical instrument, comprising:

storage means for storing waveform information;

address signal production means for producing a single address signal which changes at a uniform rate corresponding to a frequency of the waveform to be produced over one cycle of a waveform, to read out the waveform information stored in said storage means [;] *by accessing said waveform information corresponding to a half-cycle or said waveform during a predetermined time interval;* modulating signal production means for producing a modulating signal [;] , *said modulating signal deter-*

*mining a selected time interval, different from said predetermined time interval, for accessing said waveform information stored in said storage means and corresponding to said half cycle of the waveform;* modification means coupled to said address signal production means and to said modulating signal production means for modifying the single address signal produced from said address signal production means, into a modified address signal according to the modulating signal supplied from said modulating signal production means without using a feedback loop from said storage means, *and which accesses said waveform information corresponding to a first half cycle of the waveform during said selected time interval determined by said modulating signal, and also accesses said waveform information corresponding to a latter half cycle of the waveform during at least a portion of a remaining time interval between termination of said selected time interval and the end of the cycle of said waveform,* the changing rate of said modified address signal varying in *said* one cycle of the waveform; and accessing means coupled to said modification means for accessing *the waveform information stored in* said storage means by the use of the modified address signal delivered from said modification means to generate a waveform [signal which has a distorted waveform according to] *that, relative to a waveform produced with the single address signal changing at said uniform rate, is distorted in accordance with* the modulating signal produced by the modulating signal production means, and has the frequency determined by the single address signal generated by the address signal production means.

2. The electric musical instrument according to claim 1, wherein said modification means includes means for modifying said single address signal by switching said single address signal and an inverted value of said single address signal within said one cycle of the waveform.

3. An electronic musical instrument according to claim 1, wherein said modulating signal production means produces a modulating signal which changes with the lapse of time.

4. An electronic musical instrument according to claim 1, wherein said address signal production means delivers at the uniform rate, phase angle information which defines a phase angle of the waveform.

5. An electronic musical instrument according to claim 1, wherein said storage means stores sine waves or cosine waves as the waveform information.

6. An electronic musical instrument according to claim 1, wherein said storage means stores waveforms which correspond to half-cycles or quarter-cycles of cosine waves.

7. An electronic musical instrument according to claim 1, wherein said modification means includes arithmetic means, which has its functional operation altered in at least one range within one cycle of the waveform, so as to produce the modified address signal from the address signal of said address signal production means.

8. An electronic musical instrument according to claim 7, wherein said modification means includes at least one switching terminal, and said arithmetic means can also have said functional operation altered by a signal received from said switching terminal.

9. An electronic musical instrument according to claim 3, wherein said modification means includes arithmetic means, which has its functional operation altered in at least one range within one cycle of the waveform, so as to produce the modified address signal from the address signal of said address signal production means.

10. An electronic musical instrument according to claim 4, wherein said modification means includes arithmetic means, which has its functional operation altered in at least one range within one cycle of the waveform, so as to produce the modified address signal from the address signal of said address signal production means.

11. An electronic musical instrument according to claim 5, wherein said modification means includes arithmetic means, which has its functional operation altered in at least one range within one cycle of the waveform, so as to produce the modified address signal from the address signal of said address signal production means.

12. An electronic musical instrument according to claim 6, wherein said modification means includes arithmetic means, which has its functional operation altered in at least one range within one cycle of the waveform, so as to produce the modified address signal from the address signal of said address signal production means.

13. An electronic musical instrument according to claim 7, wherein said modification means further includes comparison means, and said functional operation of said arithmetic means is altered by an output of said comparison means.

14. An electronic musical instrument according to claim 13, wherein said arithmetic means is supplied with the address signal and the modulating signal, has its functional operation altered by the comparison output and delivers a modified address signal.

15. An electronic musical instrument according to claim 7, wherein said arithmetic means is a divider circuit which divides the address signal by the modulating signal.

16. An electronic musical instrument according to claim 13, wherein said arithmetic means includes an exclusive logic OR circuit at its output, and a logic of said exclusive logic OR circuit is turned into one of an inverter and a buffer by the comparison output.

17. An electronic material instrument according to claim 13, wherein said arithmetic means includes an exclusive logic OR circuit at its input, and a logic of said exclusive logic OR circuit is turned into one of an inverter and a buffer by the comparison output.

18. An electronic musical instrument, comprising:

storage means for storing waveform information;

address signal production means for producing a single address signal which changes at a uniform rate corresponding to a frequency of the waveform to be produced over one cycle of a waveform, to read out the waveform information stored in said storage means;

modulating signal production means for producing a modulating signal;

modification means coupled to said address signal production means and to said modulating signal production means for modifying the single address signal produced from said address signal production means, into a modified address signal according to the modulating signal supplied from said modulating signal production means without using a feedback loop from said storage means; and said modification means supplying said modified address signal to said storage means so as to deliver at least one cycle of the stored waveform information in a predetermined portion of one cycle of an output waveform to be produced defined on the basis of the modulating signal, and to deliver a predetermined fixed value as output waveform information in a remaining portion of the one cycle of said output waveform to be produced.

19. The electric musical instrument according to claim 18, wherein said modification means includes means for modifying said single address signal by switching said single address signal and an inverted value of said single address signal within said one cycle of the waveform.

20. An electronic musical instrument according to claim 18, wherein said modulating signal production means produces a modulating signal which changes with lapse of time.

21. An electronic musical instrument according to claim 18, wherein said address signal production means delivers at a uniform rate, phase angle information which defines a phase angle of the waveform.

22. An electronic musical instrument according to claim 18, wherein said storage means stores sine waves or cosine waves as the waveform information.

23. An electronic musical instrument according to claim 18, wherein said storage means stores waveforms which correspond to half-cycles or quarter-cycles of cosine waves.

24. An electronic musical instrument according to claim 18, wherein said modification means includes a divider circuit which divides the address signal by the modulating signal, and a plurality of gates each first input terminal of which is supplied with a most significant bit output of said divider circuit and second input terminals of which are respectively supplied with outputs of said divider circuit other than the most significant bit output, outputs of said gates forming the modified address signal.

25. An electronic musical instrument according to claim 18, wherein said modification means includes a plurality of gates each first input terminal of which is supplied with a most significant bit output of the address signal and second input terminals of which are respectively supplied with outputs of the address signal other than the most significant bit output, and a divider circuit which divides an output signal of said plurality of gates by the modulating signal, an output of said divider circuit forming the modified address signal.

26. An electronic musical instrument according to claim 24, wherein said plurality of gates are exclusive logic OR gates.

27. An electronic musical instrument according to claim 25, wherein said plurality of gates are exclusive logic OR gates.

28. An electronic musical instrument according to claim 18, wherein said modification means generates the waveform information by reading out the waveform storage means for at least one cycle in a range in which the address signal received from said address signal production means is smaller than the modulating signal, and by delivering the waveform information of a maximum value in a range in which the received address signal is larger than the modulating signal.

29. An electronic musical instrument, comprising:

storage means for storing waveform information;

address signal production means for producing a single address signal which changes at a uniform rate corresponding to a frequency of the waveform to be produced over one cycle of a waveform, to read out the waveform information stored in said storage means;

modulating signal production means for producing modulating signal;

modification means coupled to said address signal production means and to said modulating signal production means for modifying the single address signal produced from said address signal production means, into a modified address signal according to the modulating signal supplied from said modulating signal production means without using a feedback loop from said storage means; and said modification means supplying said modified address signal to said storage means for producing a first portion of a first half cycle of an output waveform by reading out a half cycle of the stored information for a condition in which the single address signal is smaller than the modulating signal, for producing a first predetermined value as output waveform information in a remaining portion of said first half cycle of said output waveform, for reading out the remaining half cycle of said stored waveform information for a condition in which the single address signal is smaller than the modulating signal in a first portion of a latter half cycle of said output waveform, and for producing a second predetermined value as output waveform information in a remaining portion of said latter half cycle of said output waveform.

30. An electronic musical instrument according to claim 29, wherein said modulating signal production means produces a modulating signal which changes with lapse of time.

31. An electronic musical instrument according to claim 29, wherein said address signal production means delivers at a uniform rate, phase angle information which defines a phase angle of the waveform.

32. An electronic musical instrument according to claim 29, wherein said storage means stores sine waves or cosine waves as the waveform information.

33. An electronic musical instrument according to claim 29, wherein said storage means stores waveforms which correspond to half-cycles or quarter-cycles of cosine waves.

34. An electronic musical instrument according to claim 29, wherein said modification means includes a divider circuit which divides the address signal received from said address signal production means and with a most significant bit expected, by the modulating signal, and output terminals of said storage means are respectively connected to first input terminals of a plurality of gates, a second input terminal of which is supplied with the most significant bit of the address signal.

35. An electronic musical instrument according to claim 34, wherein said plurality of gates are exclusive logic OR gates.

36. The electric musical instrument according to claim 29, wherein said modification means includes means for modifying said single address signal by operating on said single address signal and the modulation signal in a first half cycle of said one cycle, and means for performing an operation of producing said second predetermined value by deleting the most significant bit from said single address signal and the modulating signal in the latter half cycle of said one cycle.

37. An electronic musical instrument, comprising:

storage means for storing waveform information;

address signal production means for producing a single address signal which changes at a uniform rate corresponding to a frequency of the waveform to be produced over one cycle of a waveform modulating signal production means for producing a modulating signal which serves to modify and read out the waveform information stored in said storage means;

modification means coupled to said address signal production means and to said modulating signal production means for modifying the single address signal into a modified address signal which defines an address of more than one cycle of the waveform, while said single address signal defines an address of only one cycle of the waveform, said modification means including multiplying means for multiplying the modulating signal delivered from said modulating signal production means and the single address signal delivered from said address signal production means so as to generate the modified address signal; and means for accessing said storage means by the use of the modified address signal delivered from said modification means.

38. An electronic musical instrument according to claim 37, wherein said storage means stores sine waves or cosine waves as the waveform information.

39. An electronic musical instrument according to claim 37, wherein said storage means stores waveforms which correspond to half-cycles or quarter-cycles of cosine waves.

40. An electronic musical instrument according to claim 37, wherein said address signal production means delivers at a uniform rate, phase angle information which defines a phase angle of the waveform.

41. An electronic musical instrument according to claim 37, wherein said modulating signal production means produces a modulating signal which changes with the lapse of time.

42. An electronic musical instrument, comprising:

storage means for storing waveform information;

address signal production means for producing a single address signal which changes at a uniform rate corresponding to a frequency of the waveform to be produced over one cycle of a waveform for reading out the waveform information stored in said storage means;

modification means for modifying the single address signal into a modified address signal which defines an address of more than one cycle of the waveform, while said single address signal defines an address of only one cycle of the waveform;

accessing means coupled to said modification means for accessing said storage means by the use of the modified address signal delivered from said modification means;

envelope signal production means coupled to said address signal production means for producing an envelope signal from the single address signal produced by said address signal production means said envelope signal having a waveform which is changed repeatedly according to the signal address signal; and imparting means for imparting the envelope signal produced by said envelope signal production means to the waveform information read out from said storage means in one cycle of the waveform.

43. An electronic musical instrument according to claim 42, wherein said envelope signal production means is an inverter which inverts the address signal of said address signal production means.

44. An electronic musical instrument according to claim 42, wherein said envelope signal production means is a plurality of exclusive logic OR circuits each first input of which is a most significant bit signal in the address signal of said address signal production means, and whose other inputs are respective bit signals of the address signal except the most significant bit signal.

45. An electronic musical instrument according to claim 42, wherein said envelope signal production means includes a waveform memory which is addressed by the address signal of said address signal production means.

46. An electronic musical instrument according to claim 42, wherein said imparting means includes a multiplier circuit which multiplies the waveform information and the envelope signal.

*47. An electronic musical instrument, comprising:*

*storage means for storing waveform information;*

*address signal production means for producing a single address signal which changes at a uniform rate corresponding to a frequency of the waveform to be produced over one cycle of a waveform to read out the waveform information stored in said storage means;*

*modulating signal production means for producing a modulating signal;*

*modification means coupled to said address signal production means and to said modulating signal production means for modifying the single address signal produced from said address signal production means into a modified address signal according to the modulating signal supplied from said modulating signal production means without using a feedback loop from said storage means, the changing rate of said modified address signal varying in said one cycle of the waveform; and*

*accessing means coupled to said modification means for accessing said storage means by the use of the modified address signal delivered from said modification means to generate a waveform signal which has a distorted waveform according to the modulating signal produced by the modulating signal production means, and has the frequency determined by the single address signal generated by the address signal production means;*

*wherein said modification means includes means for modifying said single address signal by switching said single address signal and an inverted value of said single address signal within said one cycle of the waveform.*

*48. An electronic musical instrument, comprising:*

*storage means for storing waveform information;*

*address signal production means for producing a single address signal which changes at a uniform rate corresponding to a frequency of the waveform to be produced over one cycle of a waveform to read out the waveform information stored in said storage means;*

*modulating signal production means for producing a modulating signal;*

*modification means coupled to said address signal production means and to said modulating signal production means for modifying the single address signal produced from said address signal production means into a modified address signal according to the modulating signal supplied from said modulating signal production means without using a feedback loop from said storage means, the changing rate of said modified*

*address signal varying in said one cycle of the waveform; and*

*accessing means coupled to said modification means for accessing said storage means by the use of the modified address signal delivered from said modification means to generate a waveform signal which has a distorted waveform according to the modulating signal produced by the modulating signal production means, and has the frequency determined by the single address signal generated by the address signal production means;*

*wherein the storage means stores waveforms which correspond to half-cycles or quarter-cycles of cosine waves, and said modification means includes arithmetic means which has its functional operation altered in at least one range within one cycle of the waveform, so as to produce the modified address signal from the address signal of said address signal production means.*

*49. An electronic musical instrument, comprising:*

*storage means for storing waveform information;*

*address signal production means for producing a single address signal which changes at a uniform rate corresponding to a frequency of the waveform to be produced over one cycle of a waveform to read out the waveform information stored in said storage means;*

*modulating signal production means for producing a modulating signal;*

*modification means coupled to said address signal production means and to said modulating signal production means for modifying the single address signal produced from said address signal production means into a modified address signal according to the modulating signal supplied from said modulating signal production means without using a feedback loop from said storage means, the changing rate of said modified address signal varying in said one cycle of the waveform; and*

*accessing means coupled to said modification means for accessing said storage means by the use of the modified address signal delivered from said modification means to generate a waveform signal which has a distorted waveform according to the modulating signal produced by the modulating signal production means, and has the frequency determined by the single address signal generated by the address signal production means;*

*wherein said modification means includes arithmetic means which has its functional operation altered in at least one range within one cycle of the waveform, so as to produce the modified address signal from the address signal of said address signal production means.*

*50. An electronic musical instrument according to claim 49, wherein said modification means includes at least one switching terminal, and said arithmetic means can also have said functional operation altered by a signal received from said switching terminal.*

*51. An electronic musical instrument according to claim 49, wherein said arithmetic means is a divider circuit which divides the address signal by the modulating signal.*

*52. An electronic musical instrument according to claim 49, wherein said modification means further includes comparison means, and said functional operation of said arithmetic means is altered by an output of said comparison means.*

*53. An electronic musical instrument according to claim 52, wherein said arithmetic means is supplied with the address signal and the modulating signal, has its functional operation altered by the comparison output and delivers a modified address signal.*

*54. An electronic musical instrument according to claim 52, wherein said arithmetic means includes an exclusive logic OR circuit at its output, and a logic of said exclusive logic OR circuit is turned into one of an inverter and a buffer by the comparison output.*

*55. An electronic material instrument according to claim 52, wherein said arithmetic means includes an exclusive logic OR circuit at its output, and a logic of said exclusive logic OR circuit is turned into one of an inverter and a buffer by the comparison output.*

*56. An electronic musical instrument, comprising:*

*storage means for storing waveform information;*

*address signal production means for producing a single address signal which changes at a uniform rate corresponding to a frequency of the waveform to be produced over one cycle of a waveform to read out the waveform information stored in said storage means;*

*modulating signal production means for producing a modulating signal which changes with the lapse of time;*

*modification means coupled to said address signal production means and to said modulating signal production means for modifying the single address signal produced from said address signal production means into a modified address signal according to the modulating signal supplied from said modulating signal production means without using a feedback loop from said storage means, the changing rate of said modified address signal varying in said one cycle of the waveform; and*

*accessing means coupled to said modification means for accessing said storage means by the use of the modified address signal delivered from said modification means to generate a waveform signal which has a distorted waveform according to the modulating signal produced by the modulating signal production means, and has the frequency determined by the single address signal generated by the address signal production means;*

*wherein said modification means includes arithmetic means which has its functional operation altered in at least one range within one cycle of the waveform, so as to produce the modified address signal from the address signal of said address signal production means.*

*57. An electronic musical instrument, comprising:*

*storage means for storing waveform information;*

*address signal production means for producing a single address signal which changes at a uniform rate corresponding to a frequency of the waveform to be produced over one cycle of a waveform to read out the waveform information stored in said storage means;*

*modulating signal production means for producing a modulating signal;*

*modification means coupled to said address signal production means and to said modulating signal production means for modifying the single address signal produced from said address signal production means into a modified address signal according to the modulating signal supplied from said modulating signal production means without using a feedback loop from said storage means, the changing rate of said modified address signal varying in said one cycle of the waveform; and*

*accessing means coupled to said modification means for accessing said storage means by the use of the modified address signal delivered from said modification*

*means to generate a waveform signal which has a distorted waveform according to the modulating signal produced by the modulating signal production means, and has the frequency determined by the single address signal generated by the address signal production means;*

*wherein said address signal production means delivers, at the uniform rate, phase angle information which defines a phase angle of the waveform; and*

*wherein said modification means includes arithmetic means which has its functional operation altered in at least one range within one cycle of the waveform, so as to produce the modified address signal from the address signal of said address signal production means.*

*58. An electronic musical instrument, comprising:*

*storage means for storing waveform information;*

*address signal production means for producing a single address signal which changes at a uniform rate corresponding to a frequency of the waveform to be produced over one cycle of a waveform to read out the waveform information stored in said storage means;*

*modulating signal production means for producing a modulating signal;*

*modification means coupled to said address signal production means and to said modulating signal production means for modifying the single address signal produced from said address signal production means into a modified address signal according to the modulating signal supplied from said modulating signal production means without using a feedback loop from said storage means, the changing rate of said modified address signal varying in said one cycle of the waveform; and*

*accessing means coupled to said modification means for accessing said storage means by the use of the modified address signal delivered from said modification means to generate a waveform signal which has a distorted waveform according to the modulating signal produced by the modulating signal production means, and has the frequency determined by the single address signal generated by the address signal production means;*

*wherein said storage means stores sine waves or cosine waves as the waveform information; and*

*wherein said modification means includes arithmetic means which has its functional operation altered in at least one range within one cycle of the waveform, so as to produce the modified address signal from the address signal production means.*

* * * * *

UNITED STATES PATENT AND TRADEMARK OFFICE

CERTIFICATE OF CORRECTION

PATENT NO. : Re. 34,481

DATED : December 21, 1993

INVENTOR(S) : ISHIBASHI, Masanori et al.

It is certified that error appears in the above-indentified patent and that said Letters Patent is hereby corrected as shown below:

Title page, Item [56] References Cited, under

"U.S. PATENT DOCUMENTS" insert:

--4,018,121 4/1977 Chowning--;

beneath the list of "FOREIGN PATENT DOCUMENTS" insert:

--OTHER PUBLICATIONS

"The Synthesis of Complex Audio Spectra by Means of Frequency Modulation" Journal of Audio Engineering Soc., Sept. 1973, Vol. 21, No. 7.

Max V. Mathews, "The Technology of Computer Music", The MIT Press, 1969, pp. 115-120, 126-138--.

Signed and Sealed this

First Day of October, 1996

Bruce Lehman

*Attest:*

BRUCE LEHMAN

*Attesting Officer*

*Commissioner of Patents and Trademarks*